(12) United States Patent
Gupta et al.

(10) Patent No.: US 8,527,003 B2
(45) Date of Patent: Sep. 3, 2013

(54) SYSTEM AND APPARATUS FOR HIGH DATA RATE WIRELESS COMMUNICATIONS

(75) Inventors: Dev V. Gupta, Concord, MA (US); Kenneth Wood, Hadley, MA (US); Abbie Mathew, Westford, MA (US)

(73) Assignee: Newlans, Inc., Acton, MA (US)

( * ) Notice: Subject to any disclaimer, the term of this patent is extended or adjusted under 35 U.S.C. 154(b) by 1299 days.

(21) Appl. No.: 11/801,421

(22) Filed: May 9, 2007

(65) Prior Publication Data

US 2008/0002652 A1  Jan. 3, 2008

Related U.S. Application Data

(63) Continuation of application No. PCT/US2005/040924, filed on Nov. 10, 2005.

(60) Provisional application No. 60/714,393, filed on Aug. 31, 2005, provisional application No. 60/658,018, filed on Mar. 2, 2005, provisional application No. 60/637,076, filed on Dec. 17, 2004, provisional application No. 60/627,045, filed on Nov. 10, 2004.

(51) Int. Cl.
*H04B 1/38* (2006.01)

(52) U.S. Cl.
USPC .......... 455/557; 455/127.4; 455/42; 455/501; 348/384.1; 370/240

(58) Field of Classification Search
USPC .................................................. 455/557–559
See application file for complete search history.

(56) References Cited

U.S. PATENT DOCUMENTS

| | | | | |
|---|---|---|---|---|
| 5,910,960 A | * | 6/1999 | Claydon et al. | 714/784 |
| 6,101,174 A | * | 8/2000 | Langston | 370/312 |
| 2003/0063683 A1 | * | 4/2003 | MacFarlane Shearer et al. | 375/295 |
| 2003/0147655 A1 | * | 8/2003 | Shattil | 398/182 |
| 2003/0214926 A1 | * | 11/2003 | Choi et al. | 370/335 |
| 2005/0152561 A1 | * | 7/2005 | Spencer | 381/77 |
| 2006/0024069 A1 | * | 2/2006 | Roberts et al. | 398/198 |

* cited by examiner

*Primary Examiner* — Meless N Zewdu
*Assistant Examiner* — Michael Nguyen
(74) *Attorney, Agent, or Firm* — Hamilton, Brook, Smith & Reynolds, P.C.

(57) ABSTRACT

A system and apparatus including a wireless network architecture that provides broadband data network coverage over an expandable geographic area. A media access control layer is also provided that facilitates access to the broadband wireless network. A high-frequency wireless modem enables high data rate access to the wireless network in a spectrally-efficient manner using SSB modulation. A wideband millimeter-wave antenna includes a cosecant-squared reflector enabling signal propagation between network elements thereby enabling seamless wireless communications. A millimeter-wave polarizer, and a septum polarizer each convert between linear and circular polarization. A cross-shaped horn antenna adapted for circularly polarized signals can also be used in combination with the septum polarizer. A combined horn antenna is fed using a microstrip patch antenna.

18 Claims, 56 Drawing Sheets

RAISED COSINE WAVE FORM

DRB - SSB - DUAL PILOT TRANSMITTER

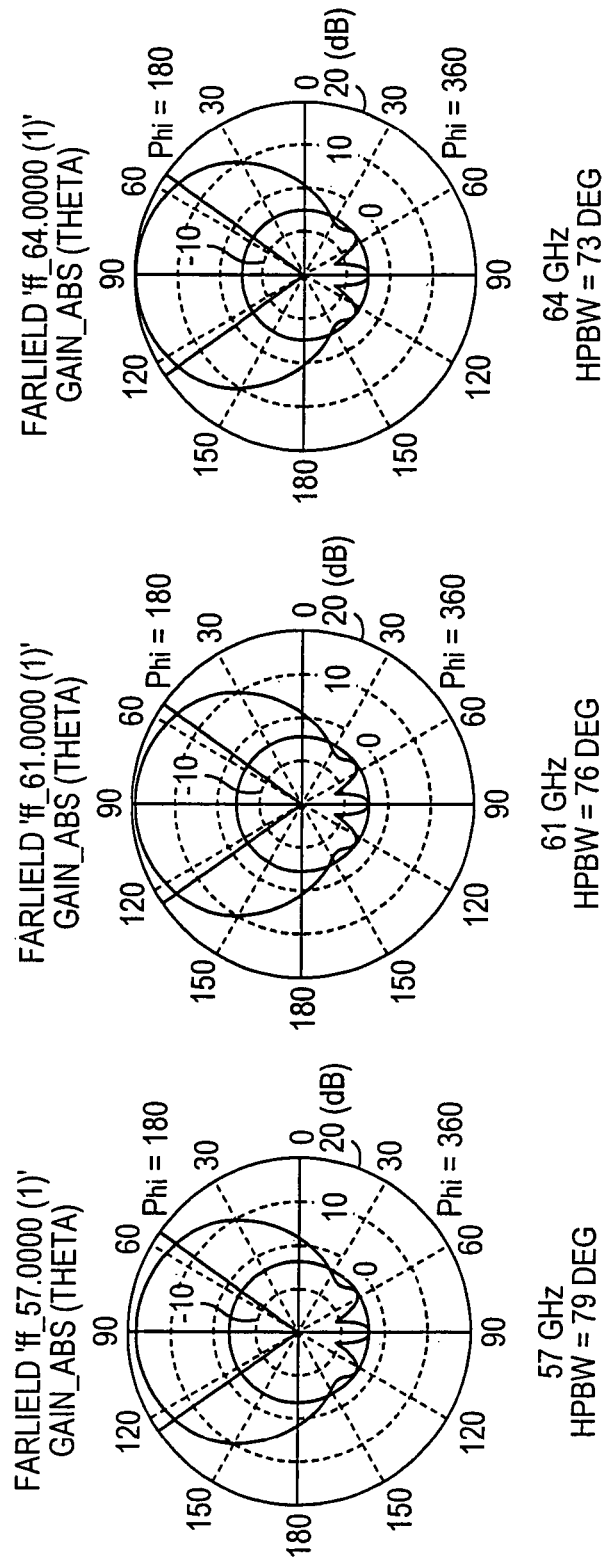

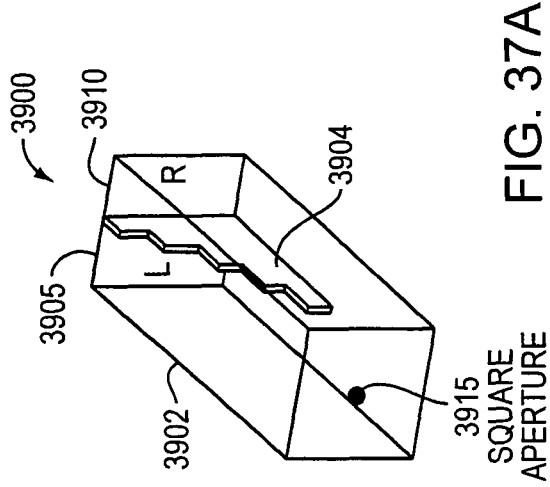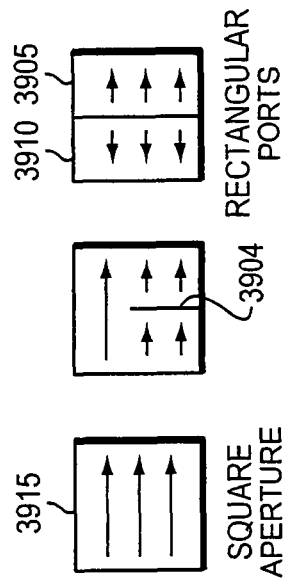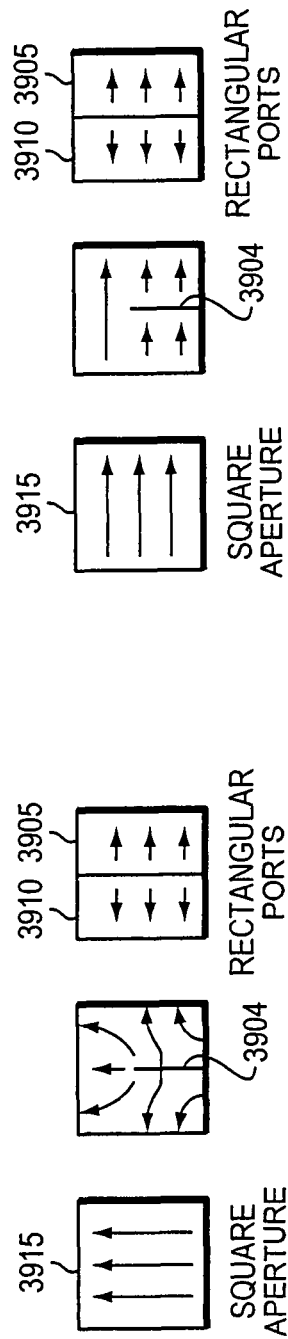

RHCP FAR FIELD PATTERN CUTS

LHCP FAR FIELD PATTERN CUTS

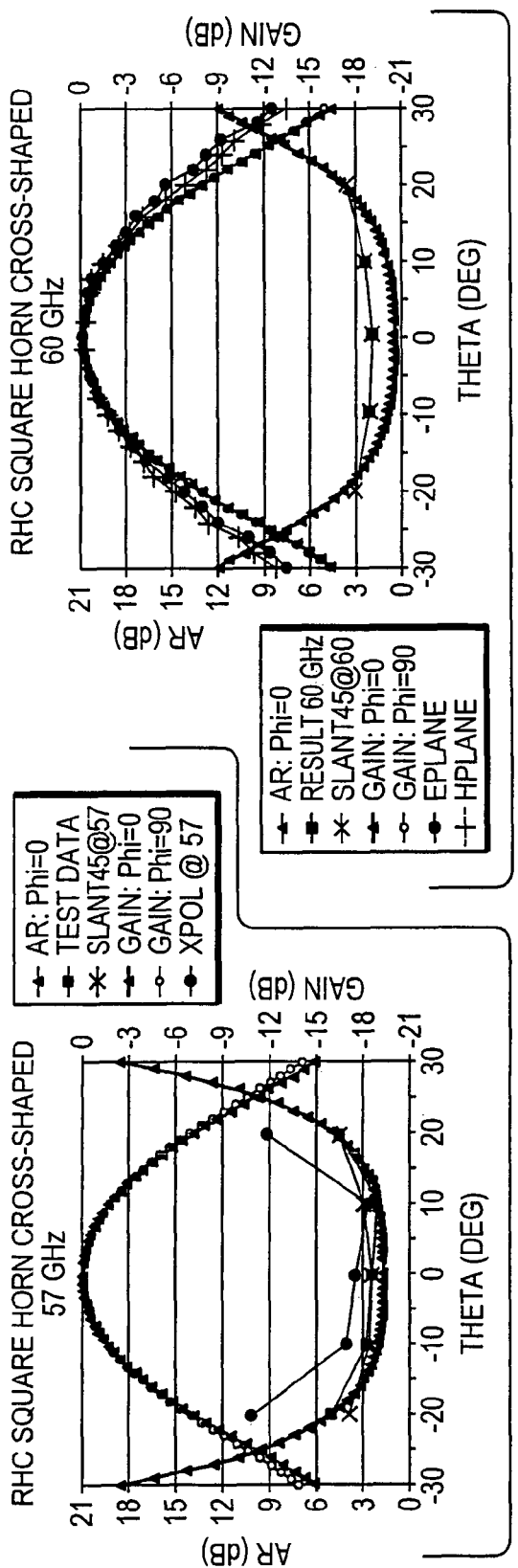
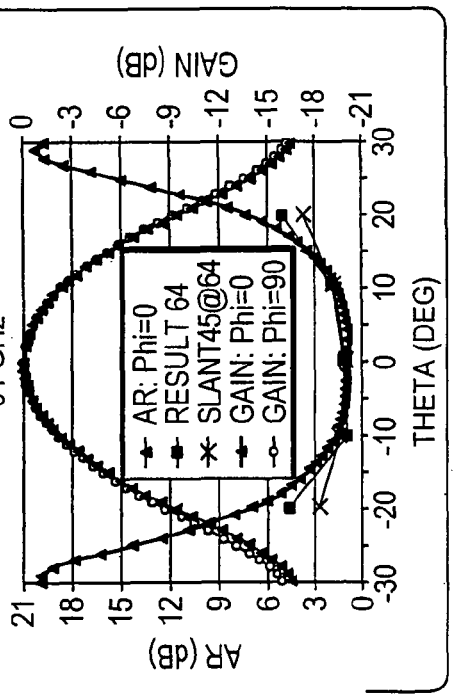
FIG. 41A
FIG. 41B
FIG. 41C

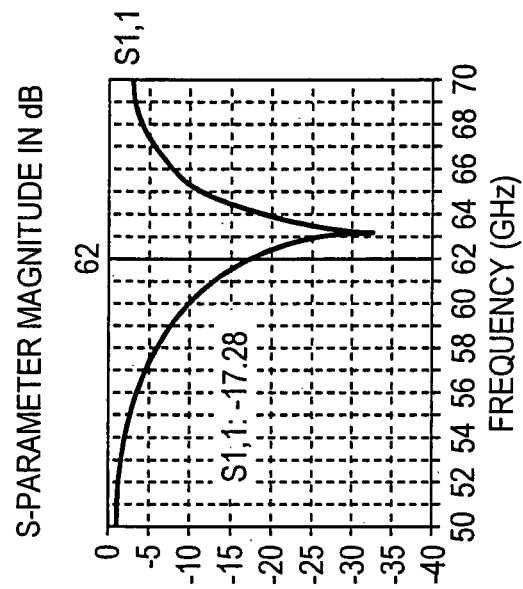
FIG. 44C
RETURN LOSS
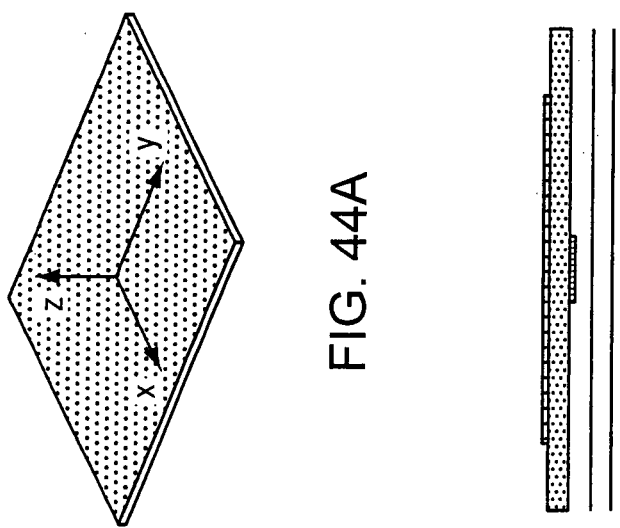
FIG. 44A
FIG. 44B
DUROID, 5 mil THICK
AIR GAP, 5 mil
LINE WIDTH = 19.5 mil (~50)

SUSPENDED CIRCULARLY POLARIZED PATCH ANTENNA
WITH INVERTED MICROSTRIP FEED

NON-OPTIMIZED SIMULATION
61 GHz

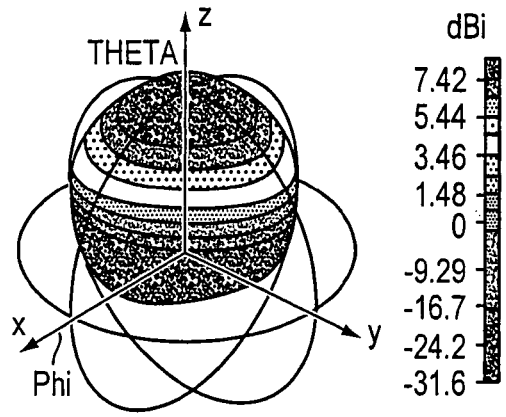

TYPE          = FARFIELD
APPROXIMATION = ENABLE (kR >> 1)
MONITOR       = ff_61.0000 (1)
COMPONENT     = RIGHT POLARIZATION
OUTPUT        = DIRECTIVITY
FREQUENCY     = 61

FIG. 45A

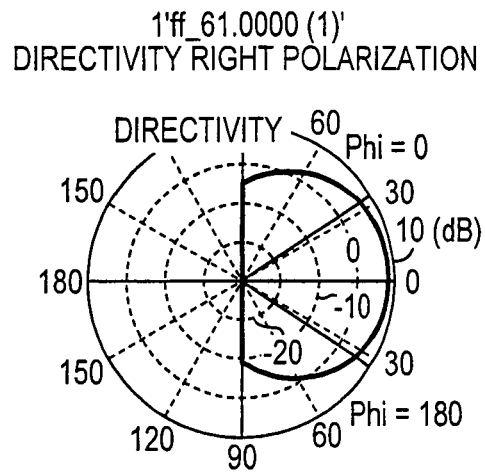

FREQUENCY            = 61
MAIN LOBE MAGNITUDE  = 8.4 dBi
MAIN LOBE DIRECTION  = 0.5 DEG
ANGULAR WIDTH (3 dB) = 69.4 DEG

FIG. 45B

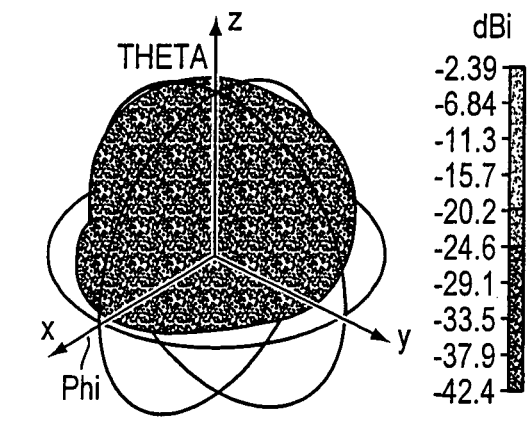

TYPE          = FARFIELD
APPROXIMATION = ENABLE (kR >> 1)
MONITOR       = ff_61.0000 (1)
COMPONENT     = LEFT POLARIZATION
OUTPUT        = DIRECTIVITY
FREQUENCY     = 61

FIG. 45C

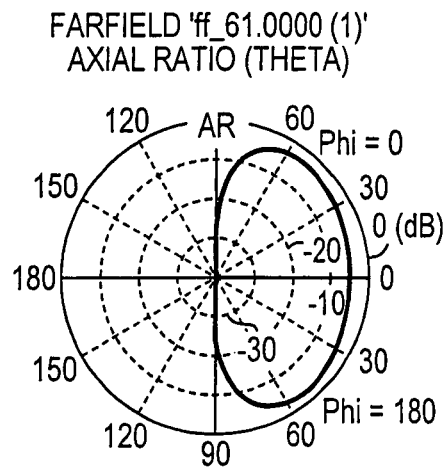

FREQUENCY           = 61
MAIN LOBE MAGNITUDE = -4.2 dB

FIG. 45D

SUSPENDED CIRCULARLY POLARIZED PATCH ANTENNA
WITH INVERTED MICROSTRIP FEED

NON-OPTIMIZED SIMULATION
62 GHz

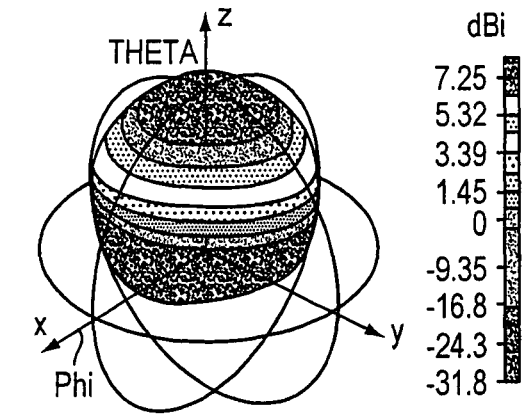

TYPE = FARFIELD
APPROXIMATION = ENABLE (kR >> 1)
MONITOR = ff_62.0000 (1)
COMPONENT = RIGHT POLARIZATION
OUTPUT = DIRECTIVITY
FREQUENCY = 62

FIG. 45E

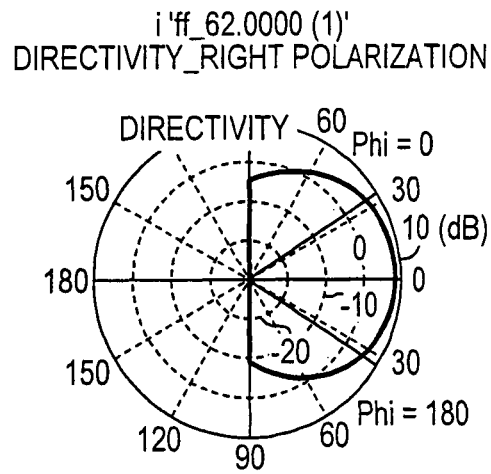

i 'ff_62.0000 (1)'
DIRECTIVITY_RIGHT POLARIZATION

FREQUENCY = 62
MAIN LOBE MAGNITUDE = 8.2 dBi
MAIN LOBE DIRECTION = 1.0 DEG
ANGULAR WIDTH (3 dB) = 69.1 DEG

FIG. 45F

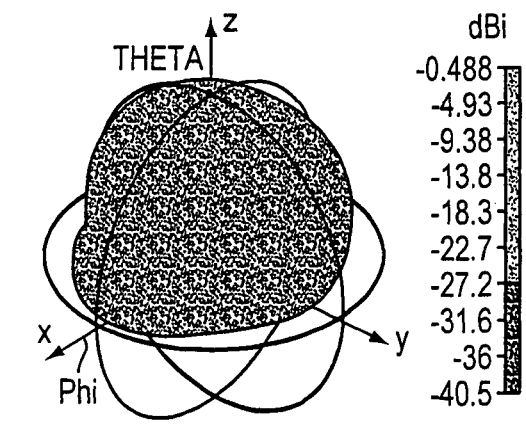

TYPE = FARFIELD
APPROXIMATION = ENABLE (kR >> 1)
MONITOR = ff_62.0000 (1)
COMPONENT = LEFT POLARIZATION
OUTPUT = DIRECTIVITY
FREQUENCY = 62

FIG. 45G

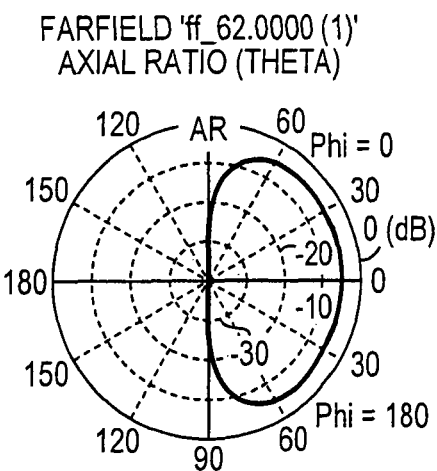

FARFIELD 'ff_62.0000 (1)'
AXIAL RATIO (THETA)

FREQUENCY = 62
MAIN LOBE MAGNITUDE = -5.3 dB

FIG. 45H

DIRECTIVITY 61 GHz

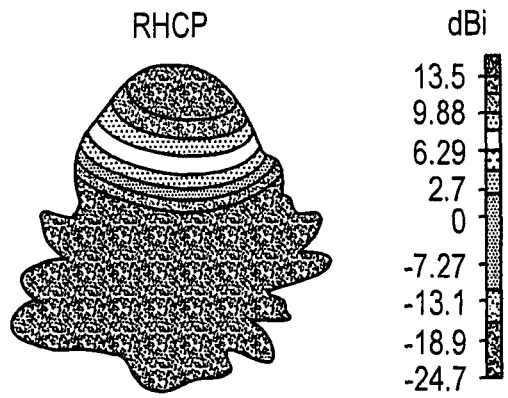

```
TYPE          = FARFIELD
APPROXIMATION = ENABLE (kR >> 1)
MONITOR       = ff_61.0000 (1)
COMPONENT     = RIGHT POLARIZATION
OUTPUT        = DIRECTIVITY
FREQUENCY     = 61
```

FIG. 48A

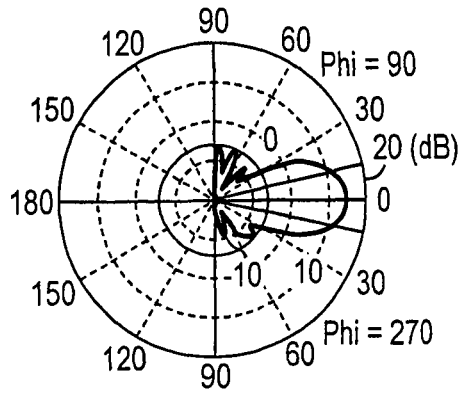

```
FREQUENCY             = 61
MAIN LOBE MAGNITUDE   = 15.3 dBi
MAIN LOBE DIRECTION   = 1.0 DEG
ANGULAR WIDTH (3 dB)  = 25.8 DEG
SIDE LOBE LEVEL       = -21.1 dB
```

FIG. 48B

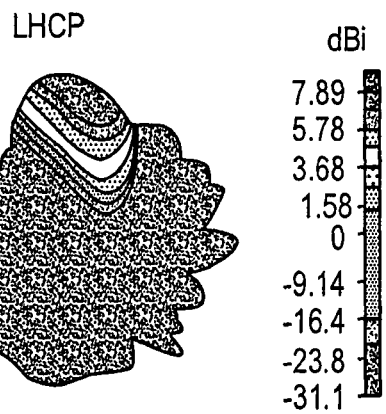

```
TYPE          = FARFIELD
APPROXIMATION = ENABLE (kR >> 1)
MONITOR       = ff_61.0000 (1)
COMPONENT     = LEFT POLARIZATION
OUTPUT        = DIRECTIVITY
FREQUENCY     = 61
```

FIG. 48C

DIRECTIVITY 62 GHz

RHCP

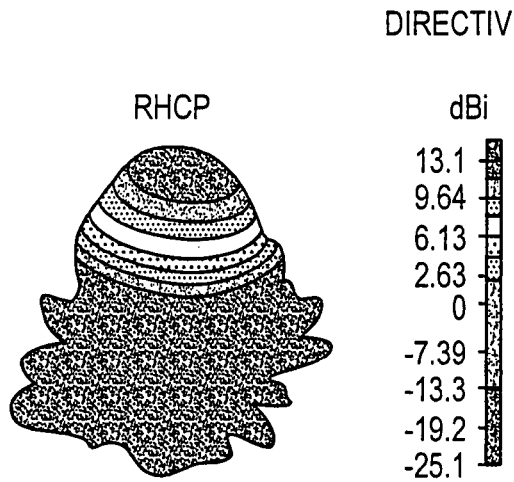

dBi
13.1
9.64
6.13
2.63
0
-7.39
-13.3
-19.2
-25.1

TYPE = FARFIELD
APPROXIMATION = ENABLE (kR >> 1)
MONITOR = ff_62.0000 (1)
COMPONENT = RIGHT POLARIZATION
OUTPUT = DIRECTIVITY
FREQUENCY = 62

FIG. 48D

LHCP

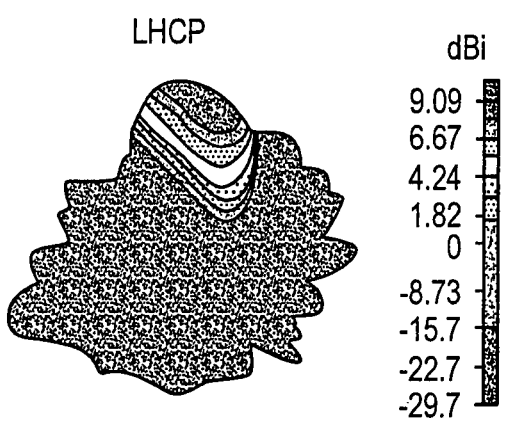

dBi
9.09
6.67
4.24
1.82
0
-8.73
-15.7
-22.7
-29.7

TYPE = FARFIELD
APPROXIMATION = ENABLE (kR >> 1)
MONITOR = ff_62.0000 (1)
COMPONENT = LEFT POLARIZATION
OUTPUT = DIRECTIVITY
FREQUENCY = 62

FIG. 48F

RHCP
i 'ff_62.0000 (1)'
DIRECTIVITY_RIGHT POLARIZATION

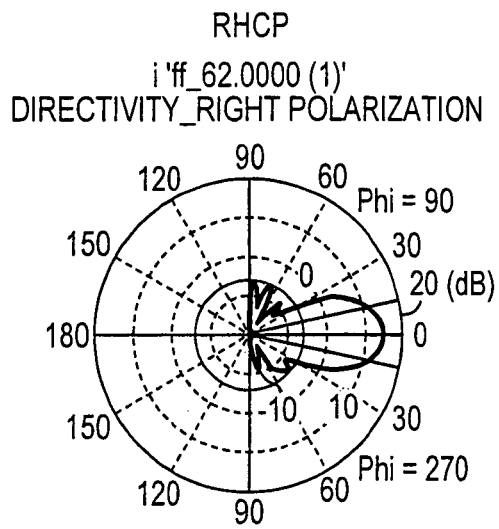

FREQUENCY = 62
MAIN LOBE MAGNITUDE = 14.9 dBi
MAIN LOBE DIRECTION = 0.0 DEG
ANGULAR WIDTH (3 dB) = 26.0 DEG
SIDE LOBE LEVEL = -20.4 dB

FIG. 48E

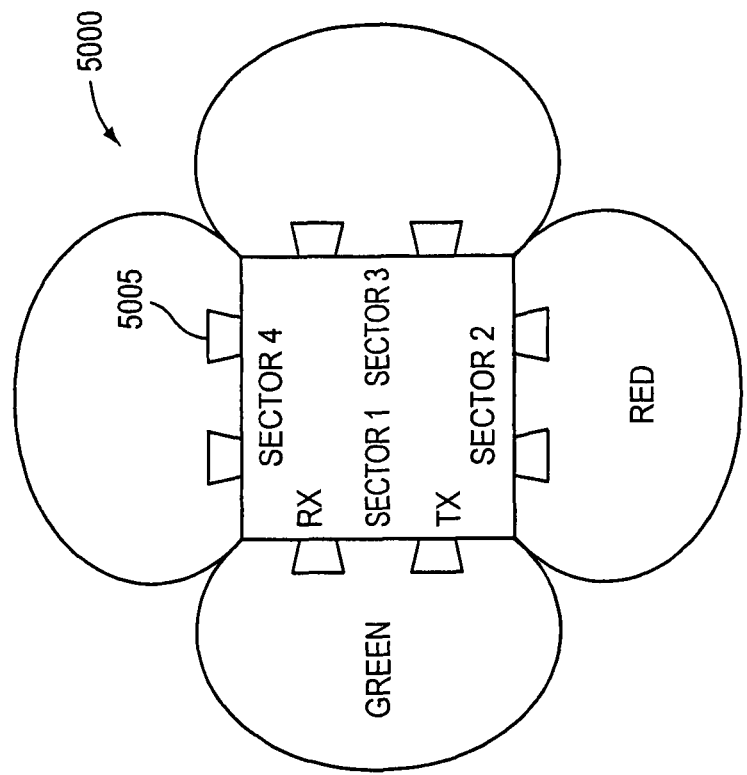
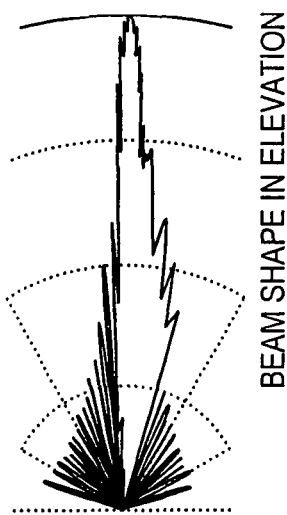
FIG. 50

SYSTEM AND APPARATUS FOR HIGH DATA RATE WIRELESS COMMUNICATIONS

RELATED APPLICATIONS

This application is a continuation of International Application No. PCT/US2005/040924, which designated the United States and was filed on Nov. 10, 2005, published in English, which claims the benefit of U.S. Provisional Application No. 60/714,393, filed on Aug. 31, 2005, U.S. Provisional Application No. 60/658,018, filed on Mar. 2, 2005, U.S. Provisional Application No. 60/637,076, filed on Dec. 17, 2004 and U.S. Provisional Application No. 60/627,045, filed on Nov. 10, 2004. The entire teachings of the above applications are incorporated herein by reference.

BACKGROUND

Wireless communications have become a popular and essential communications medium both nationally and globally. Over the past twenty years, the number of users of Public Land Mobile Networks (PLMN) or cellular telephone networks has grown to over a billion subscribers using networks that provide geographic coverage throughout the world. While these networks primarily provide voice communications, they also enable relatively low rate data communications (e.g., 9.6-140 kbps).

As these wireless networks have become more integrated with land-line data networks such as the Internet, the desire and demand to extend the features available within the land-line Internet to wireless devices has increased dramatically. World Wide Web (WWW) access, games, multimedia messaging including pictures and sound, music, enterprise applications, and streaming video are among the service capabilities desired using wireless data devices. Unfortunately, the limited data rates of the supporting wireless networks have resulted in unacceptably slow performance when using these services or other data applications.

Recently, PLMN providers have launched CDMA2000 Evolution Data Only (EVDO) networks that provide up to 2 Mbps and Third Generation GSM (3GSM) that provide approximately 300 kbps data rates. Also, the IEEE has standardized Wireless Local Area Network (WLAN) technology including the 802.11 b and 802.11 g standards that provide 11 Mbps or 54 Mbps data rates respectively. The IEEE is working on a new standard referred to as the 802.11 n that will provide data rate greater than 100 Mbps. These newer data standards and networks provide significantly higher data throughput in order to meet the increased demand for wireless data that is needed to enable certain data applications and Internet services within wireless devices. Other wireless data networks also exist including satellite, Specialized Mobile Radio (SMR), private/trunked, Cellular Digital Packet Data (CDPD), fixed wide area networks (WAN), metropolitan area networks (MAN), and personal area networks (PAN) using the Bluetooth protocol or Ultra Wideband (UWB) technology.

PLMN networks are generally referred to as cellular networks because they employ a frequency re-use architecture in which wireless access channels are grouped into geographically-located cells and sectors. The size of each cell depends on the output power of the network base station transceiver associated with each cell. Each access channel uses a certain frequency band in one geographic cell that is re-used in another cell, geographically separated from the first cell, by another access channel where the likelihood of interference is minimized. These networks also use a centralized switch or server to enable a wireless device to move from cell to cell while maintaining a persistent data connection. In the United States, cellular and Personal Communications Service (PCS) networks operate in the licensed commercial 824-849 MHz, 869-894 MHz, 901-941 MHz and 1850-1990 MHz. Access data channels, however, are bandwidth limited to 12.5-150 KHz and 25 MHz, depending on the service offered.

WLAN networks employ wireless access points that communicate with multiple wireless devices simultaneously via a set of fixed access channels. Typically, these networks use contention protocols such as Carrier Sense Multiple Access Collision Avoidance (CSMA-CA) to enable multiple users to share the same wireless access channels emanating from a transceiver access point. These WLAN networks are generally referred to as wireless Ethernet networks because the access mechanism is similar to conventional Ethernet networks. While WLAN networks may be centrally controlled, they are often used by individuals as wireless bridge or router connections to a local area network (LAN). WLAN networks may operate in the 900 MHz, 2.4 GHz and 5.5 GHz unlicensed bands. The 802.11b is limited to a data rate of 11 Mbps, while 802.11b and 802.11g are limited to 54 Mbps. The 802.11n, which is under development, is expected to have a data rate of greater than 100 Mbps.

Two high data rate PAN standards under development are 802.15.3a and 802.15.3c. The former has two competing proposals, namely MB-OFDM and DS-UWB, while the latter is based on the 60 GHz technology. MB-OFDM and DS-UWB have maximum data rate of about 480 Mbps and 1 Gbps respectively at a distance of about 3 meters. The 60 GHz technology is expected to have greater data rate and distance.

While these newer wireless data networks provide improved data throughput for users, the desire for even greater throughput is already creating the demand for higher data rate wireless networks that support advanced data application such as high-resolution video conferencing, HDTV connectivity, broadcast video, video-on-demand, online training, distance learning, peer-to-peer collaboration, file transfers, data mining, database applications (e.g., CRM, ERP), and e-mail with attachments. Furthermore, high data rate wireless networks are arguably less costly than cable or copper to install and maintain by an enterprise or user. Concerns regarding reliability, security, quality of service, and coverage of high data rate wireless networks, however, must be addressed.

SUMMARY

The embodiments of this invention include a wireless network architecture that provides broadband data network coverage over an expandable geographic area, a media access control (MAC) layer to facilitate secure access to the broadband wireless network, a high frequency wireless modem that enables high data rate access to the wireless network, and antenna configurations that enable seamless communications within the wireless network architecture.

The invention relates to digital communications modem including a pulse-shaping filter capable of receiving an information signal having a baud rate of at least about 1 gigabit per second. The modem also generates a filtered pulse train that has a reduced bandwidth being substantially less than the baud rate. An encoder receives the filtered pulse train and generating an encoded signal having one of two orthogonal relationships. The modem also includes a combiner receiving two encoded signals having different orthogonal relationships and combining them, with the resulting combined encoded signal having a signal bandwidth substantially within the reduced bandwidth. The modem includes a modulator modulating a carrier signal with the combined encoded signal, such that the spectrum of the modulated signal substantially less than half of the baud rate of the received information signal.

Preferably, the modem is combined with a frequency translator that translates the encoded information signal to a millimeter-wave frequency band between about 30 GHz and about 300 GHz. In some embodiments, the frequency of operation is between about 50 GHz and about 70 GHz.

The modem can include a pulse-shaping filter, such as a raised cosine filter. The pulse-shaping filter can be implemented as part of a matched filter, the other part of the matched filter provided within a remote receiver.

In some embodiments, the encoder includes a dual-rail binary (DRB) encoder. For example, the DRB encoder includes a Hilbert Transformer. The modem can also include a sideband suppressor, such as a filter, that substantially suppresses one of two sidebands of the modulated signal. This can be used with single side band (SSB) or vestigial side band (VSB) modulator.

Preferably, the modem uses a first pilot signal source having a center frequency of about half the baud rate. In some embodiments, the modem also uses a second pilot signal source having a center frequency corresponding to the inverse of twice the baud period (i.e., ½ T) at baseband. Preferably, the second pilot signal is provided with a well-defined power level that cam be used for AGC at a receiver.

An antenna includes an antenna housing defining a flared aperture adapted to provide an azimuthal beamwidth of at least about 45 degrees. In some embodiments the azimuthal beamwidth is at least 80 degrees, and even 90 degrees. An offset feed port offset with respect to the flared aperture to avoid blockage thereof. The antenna also includes a reflective surface disposed above the offset feed port and behind the flared aperture providing a line-of-sight reflection between the offset feed port and the flared aperture. The antenna provides a far-field gain of at least 21 dBi over a frequency bandwidth of at least about 10% when operating at millimeter-wave frequencies. For example, the reflective surface can be provided with a cosecant-squared shape. In some embodiments, the far-field gain is circularly-polarized having at least about 15 dB of cross-polarization separation. Also, the far-field gain is substantially ripple-free across the azimuthal beamwidth.

A linear-to-circular polarization filter includes a dielectric sheet having a thickness of about $3\lambda r/2$, $\lambda r$ being the wavelength of an electromagnetic wave propagating within the dielectric. The sheet defines on one side a first series of elongated parallel slots. Similarly, the sheet defines a second series of elongated slots on the opposite side of the sheet, such that the first and second series of slots are substantially aligned with respect to each other. The polarization filter transforms a linearly-polarized electromagnetic wave at one side of the dielectric sheet to a substantially circularly-polarized wave at the other side. Preferably, the linear-to-circular polarization filter is adapted to operate within the millimeter-wave frequency band, when the dielectric material has a relative dielectric constant of less than about 3.

A circularly-polarized antenna includes a square-wave input port and a housing coupled at a proximal end to the input port. The housing defines a horn antenna flared along a longitudinal axis, the horn antenna having a cross-shaped aperture. The antenna produces a far-field pattern having an aspect ratio of less than about 3 over a 10% operational frequency bandwidth. Preferably, the antenna is adapted to within the millimeter-wave band, providing a far-field gain greater than about 15 dBi.

In some embodiments, a linear-to-circular polarizer is coupled between the input port and a rectangular waveguide, the polarizer converting between circularly-polarized fields at the input port and linearly-polarized fields within the waveguide. The linear-to-circular polarizer can include a rectangular waveguide housing having a first end and a second end, the second end being coupled to the square-wave input port; and a septum disposed within the housing and terminating at the first end only, the septum producing a circularly-polarized field at the square-wave input port responsive to linearly-polarized fields at the first end.

An antenna system includes several directional antennas, each antenna providing coverage to a respective portion of the antenna system beamwidth and a switch coupled to each of the several directional antennas, switching on as at least one of the directional antennas to communicate within the response portion of the antenna system beamwidth.

A method of wireless networking includes wirelessly communicating network traffic within the millimeter-wave band and applying circular polarization to wireless network transmissions, the circular polarization improving the wireless communications in the presence of multipath.

A linear-to-circular polarizer includes a rectangular waveguide housing and a septum disposed within the housing, the septum terminating at a first end of the housing only. The septum partitions a first aperture at the first end of the housing into a first port and a second port. A second end of the housing defines a second aperture providing a third port and a fourth port, the third and fourth ports being distinguished according to the respective linear polarizations of the field at the second aperture. A circularly-polarized field excited at the second aperture produces linearly-polarized fields at the first aperture.

The linear-to-circular polarizer device can be operated as a polarization diplexer simultaneously producing linearly-polarized fields at the first aperture responsive to a right-hand circularly-polarized field excited at the second aperture and orthogonal linearly-polarized fields at the first aperture responsive to a left-hand circularly-polarized field excited at the second aperture. Preferably, the polarizer is dimensioned for operation within the millimeter-wave frequency band.

A hybrid antenna includes a tapered crossed-waveguide horn having an input port at the narrow end of the taper and a patch antenna coupled to the input port. Electromagnetic energy is allowed to couple between the printed patch antenna and the crossed-waveguide horn. The patch antenna can be circularly polarized, resulting in circularly-polarized radiation.

In some embodiments, the crossed-waveguide horn is formed from a metallized injection molded part. The patch antenna can include a dielectric substrate having a conducting patch on a side of the substrate facing the horn. A microstrip feed is disposed on an opposite side of the substrate with respect to the conducting patch, electromagnetic energy coupling efficiently between the microstrip feed and the conducting patch. The hybrid antenna is capable of providing an operational bandwidth of at least about 10% at frequencies within the millimeter-wave band.

A wireless networking system provides a communication capability for remote users operating wirelessly within the extremely-high-frequency (EHF) band. The networking system includes a wireless cell defining a geometric shape and a number of wireless access points, each adapted to communicate wirelessly with a remote user within the EHF band using a wireless networking protocol. The plurality of wireless access points can be distributed about the area of the wireless cell and or along its perimeter. In some embodiments, the wireless communications provide a bit error rate of less than $10^{-6}$.

In some embodiments, the geometric shape of a cell is a rectangle, with a respective wireless access points placed at each-of its corners and capable of covering a respective 90-degree sector of the cell. Network extenders can be deployed within the cell between opposing pairs of the plurality of wireless access points to extend the range of wireless access therebetween. Preferably, each of the number of wireless access points is adapted to communicates with the remote user in a channel having a bandwidth of at least 1 GHz. The network can employ a wireless protocol, such as a wireless Ethernet protocol (e.g., IEEE 802.11; IEEE 802.15; and IEEE 802.16).

A method for wirelessly networking several remote users using a networking protocol operating within the extremely-high-frequency (EHF) band includes providing a communication channel within the EHF band between at least one of the plurality of remote users and the wireless access point. The communication channel is segmented into a number of frames, each defining a frame marker identifying a respective one of the frames. The remote user requests a channel bandwidth during a bandwidth request phase. The requested bandwidth is allocated during a bandwidth allocation phase, if available. Data is communicated downstream a wireless access point to a remote user using the allocated channel bandwidth. Data is also communicated upstream data from the remote user to the wireless access point using the allocated channel bandwidth. Allocation of the requested bandwidth is accomplished using a network element, such as a management server.

The requesting step further includes determining whether the bandwidth request phase is being used by another remote user. If not, the request is made. However, if in use, the requester waits for a period of time before a reattempt is made. The method of claim 60, wherein the downstream transmissions are variable, depending on traffic. Packet numbers can be assigned to different remote users and the order of packet transmissions can also be altered based on a link parameter.

A method of providing a digital communications capability with a remote network user wirelessly within the extremely-high-frequency (EHF) band includes receiving from a remote wireless source a signal. The received signal includes a first pilot signal at a first pilot frequency, a second pilot signal at a second pilot frequency, and modulated data. The frequency of the first pilot signal is determined and used to determining the frequency of the second pilot to a frequency accuracy substantially greater than the first. The second pilot frequency can then be used to detect the modulated data. A signal amplitude of one of the first and second pilot signals can be determined at the receiver and used to adjust gain within the receiver using automatic gain control. Preferably, one of the first and second pilot signals is transmitted at an amplitude known to the receiver.

A communication system includes a wireless modem for communicating between a remote station and at least one of a group of wireless access points. A circularly-polarized antenna is coupled to the modem, and a sectorized antenna is provided to limit wireless communications between the remote station and a subset of the plurality of wireless access points. Preferably, the wireless communications operates within the millimeter-wave frequency band. For example, the wireless communications operate between about 50 and about 80 GHz.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 31A-31D illustrate simulated far-field gain patterns for an exemplary WAP antenna at three different frequencies, respectively;

FIG. 37A is a perspective diagram of a septum polarizer;

FIGS. 37B and 37C show the polarization performance of the polarizer of FIG. 37A responsive to E and H fields;

FIGS. 41A-41C illustrate the gain and aspect ratio for the antenna of FIG. 40A at three different frequencies, respectively;

FIGS. 44A-44B illustrate a suspended circularly-polarized patch antenna with an inverted microstrip feed;

FIG. 44C illustrates the return loss performance of the device of FIGS. 44A and 44B;

FIGS. 45A-45H illustrate exemplary performance parameters of the device of FIGS. 44A and 44B;

FIGS. 48A through 48F illustrate exemplary performance parameters of the device of FIGS. 47A and 47B;

FIG. 50 is an exemplary STA antenna and its corresponding elevation pattern;

DETAILED DESCRIPTION

Certain embodiments of this invention include a wireless network architecture that provides broadband data network coverage over an expandable geographic area, a media access control (MAC) layer to facilitate access to the broadband wireless network, a high frequency wireless modem that enables high data rate access to the wireless network, and antenna configurations that enable seamless communications within the wireless network architecture.

Wireless Network Architecture

Figure 1:
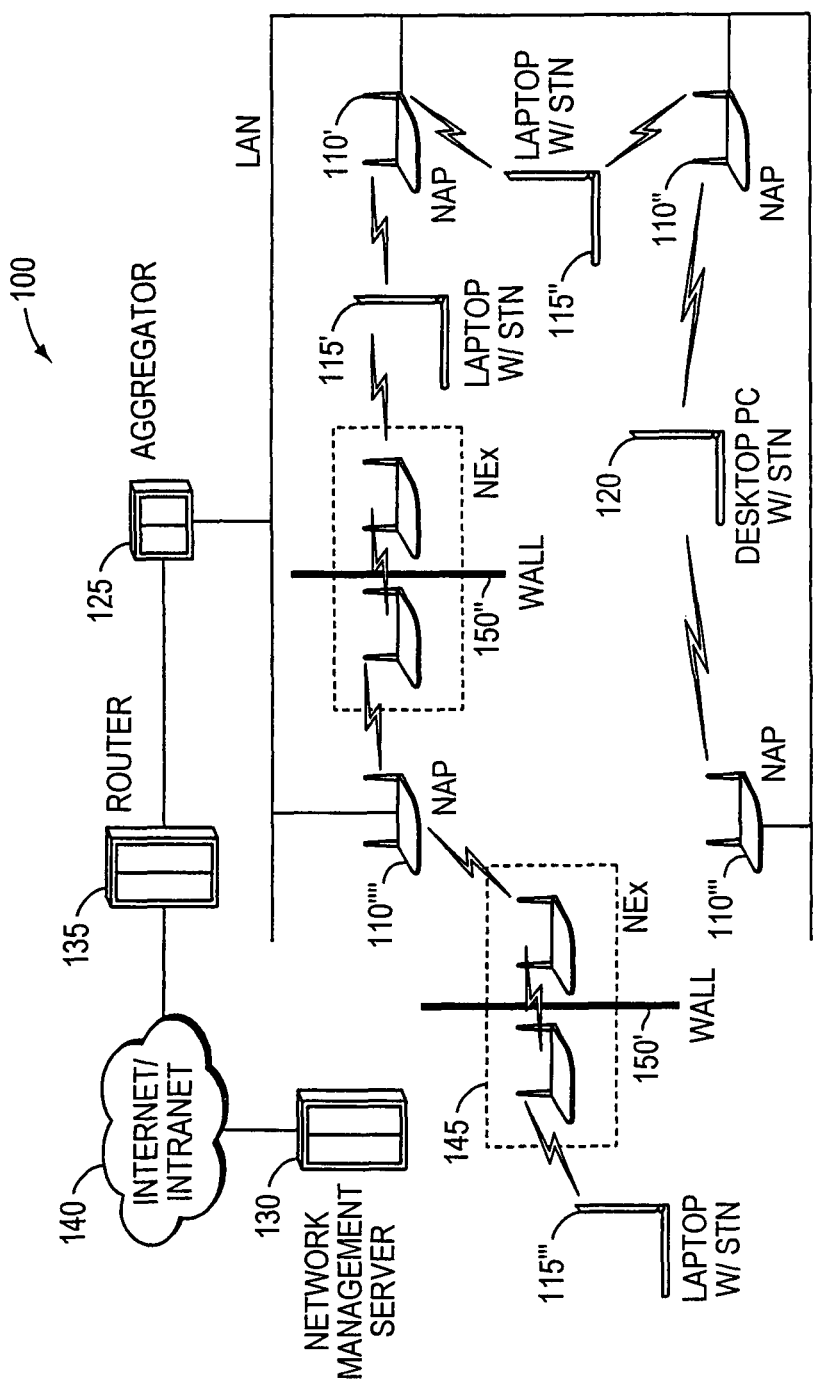
FIG. 1 shows the network components of an embodiment of the high data rate wireless network.

One embodiment of this invention features a wireless network 100 that reliably, securely, and efficiently provides high data rate connections for wireless devices. In the embodiment of FIG. 1, several Wireless Access Ports (WAP) 110a, 110b, 110c, 110d and wireless devices 115a, 115b, 115c, e.g., mobile stations (STA) connected to or integrated within a laptop or desktop personal computer (PC) 120, utilize 60 GHz wireless modems to exchange digital information within a millimeter wireless LAN (mmwLAN) 100. An aggregator 125 aggregates network traffic to and from each WAP 110. The aggregator 125 interfaces with a Network Management Server 130 via a router 135 and the Internet or a local Intranet 140. Because high frequency communications are susceptible to rapid attenuation, the wireless network 100 may utilize Network Extenders 145 to extend the propagating distance of WAP or STA signals through objects such a walls 150', 150". Further details regarding the wireless network embodiment are described as follows.

Figure 2A:
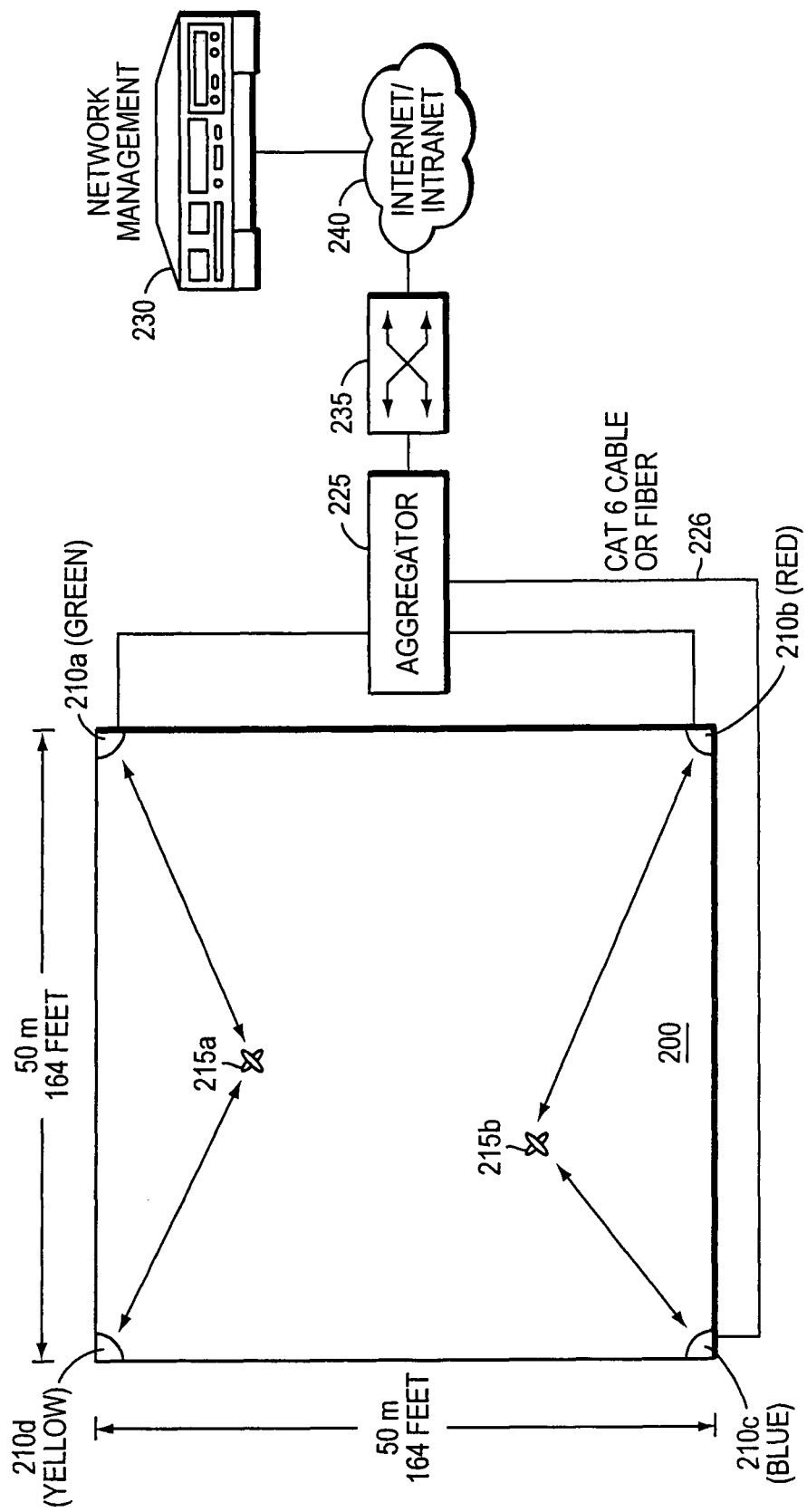
FIGS. 2A-2B show embodiments of the micro-cell architecture wherein the STA connects with the two strongest WAPs in its vicinity.
Figure 3:
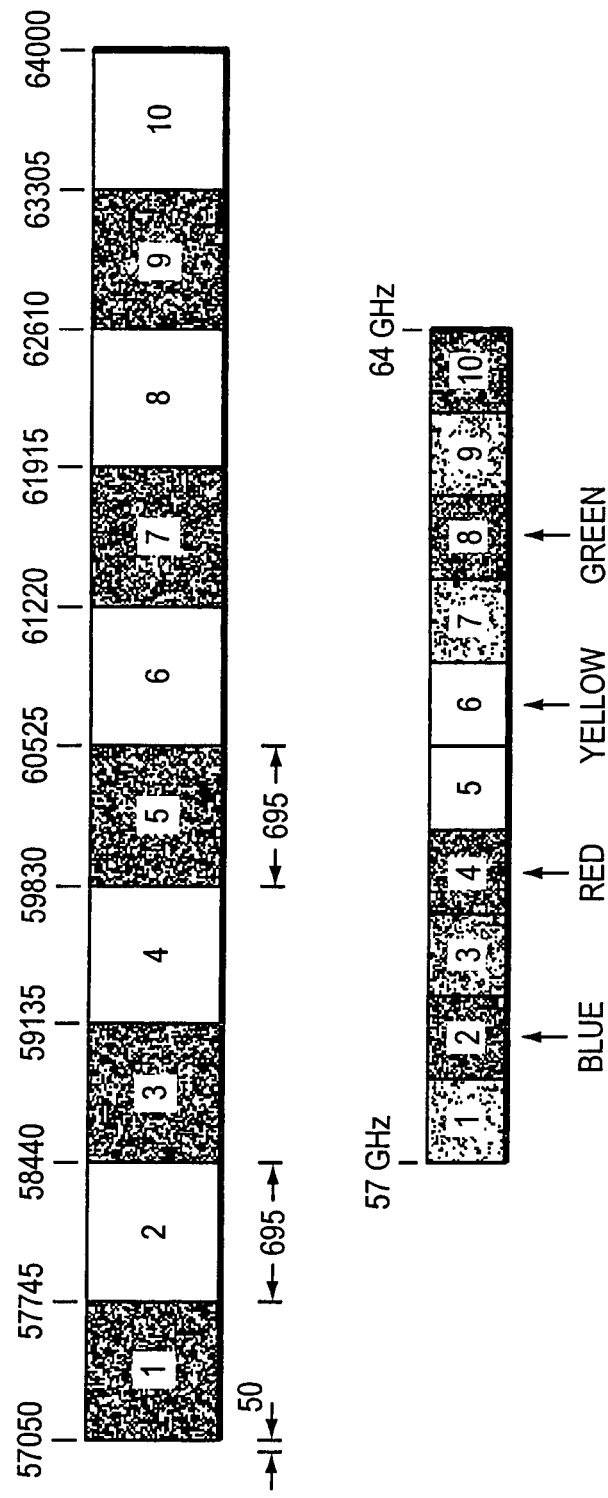
FIG. 3 shows exemplary frequency assignments of an embodiment in the 60 GHz range.

Referring to FIG. 2A, the square-shaped (or rectangular-shaped) communications cell 200 utilizes four WAPs 210a, 210b, 210c, 210d dispersed to each corner of the cell 200 with each assigned a unique frequency band according to FIG. 3. Each frequency band occupies a respective 695 MHz channel with each channel producing a data rate of 1.2 Gbps. A unique color code reference can be designated for each WAP 210 to illustrate the frequency diversity within each cell. An exemplary MMW spectrum allocation for Canada and the U.S. is illustrated in FIG. 3 for the 57-64 GHz band. Thus, the blue, red, yellow, and green color-coded bands occupy the 57.745-58.440, 59.135-59.830, 60.525-61.220, and 61.915-62.610 GHz frequency spectrum respectively. Additionally, in one embodiment, the WAP 210 associated with each red, green, blue, and yellow band is located in the same location within a cell as illustrated in FIG. 2A. The four-WAP arrangement may be implemented at any frequency subject to the propagation characteristics at that frequency. The size of the coverage region can be increased by using additional WAPS by ensuring that adjoining WAPs operate at a different channel.

Figure 2B:
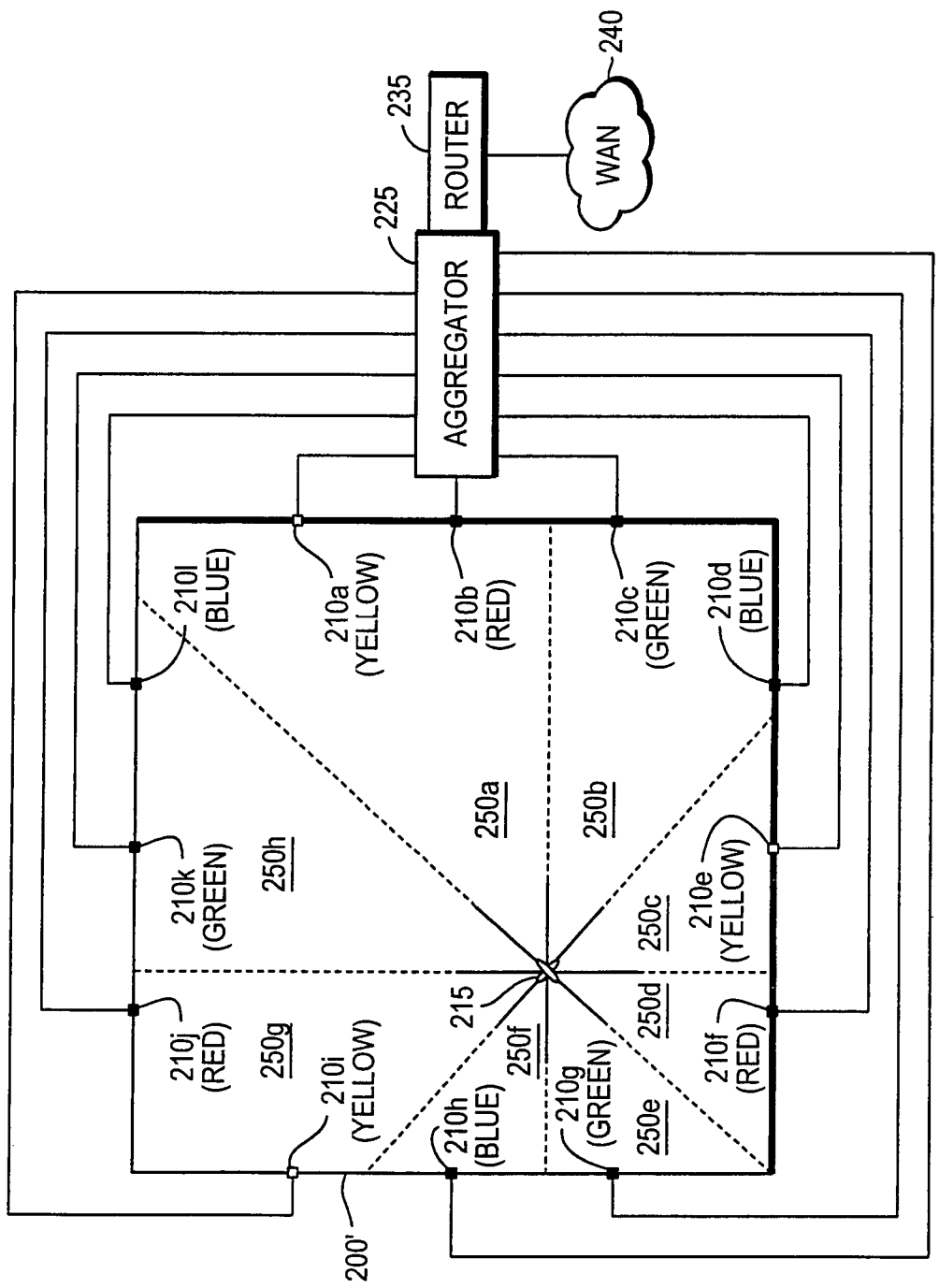

A STA 215 operator within the cell 250 can receive signals from the four WAPs 210a, 210b, 210c, 210d. In some embodiments, the STA 215 identifies the best two WAPs 210 and communicates to those two (e.g., at 2 to 4 Gbps). By illuminating a cell 200 into multiple frequencies (i.e., colors) provides the resulting network with frequency and space diversity. FIG. 2B illustrates a 12-WAP 210 configuration. The WAPs 210 can be distributed about a perimeter of the cell 200'. Each of the WAPs 210 transmits on a respective one of a number of channels. For example, four channels (or colors red, green, blue, yellow) are used among the 12 WAPs 210, some of the WAPs 210 using the same channels.

A STA 214 operating within the cell 200' provides sectorized-azimuthal coverage. For example, the STA 215 includes eight sectors 250a-250h covering 360° in azimuth.

Figure 4:
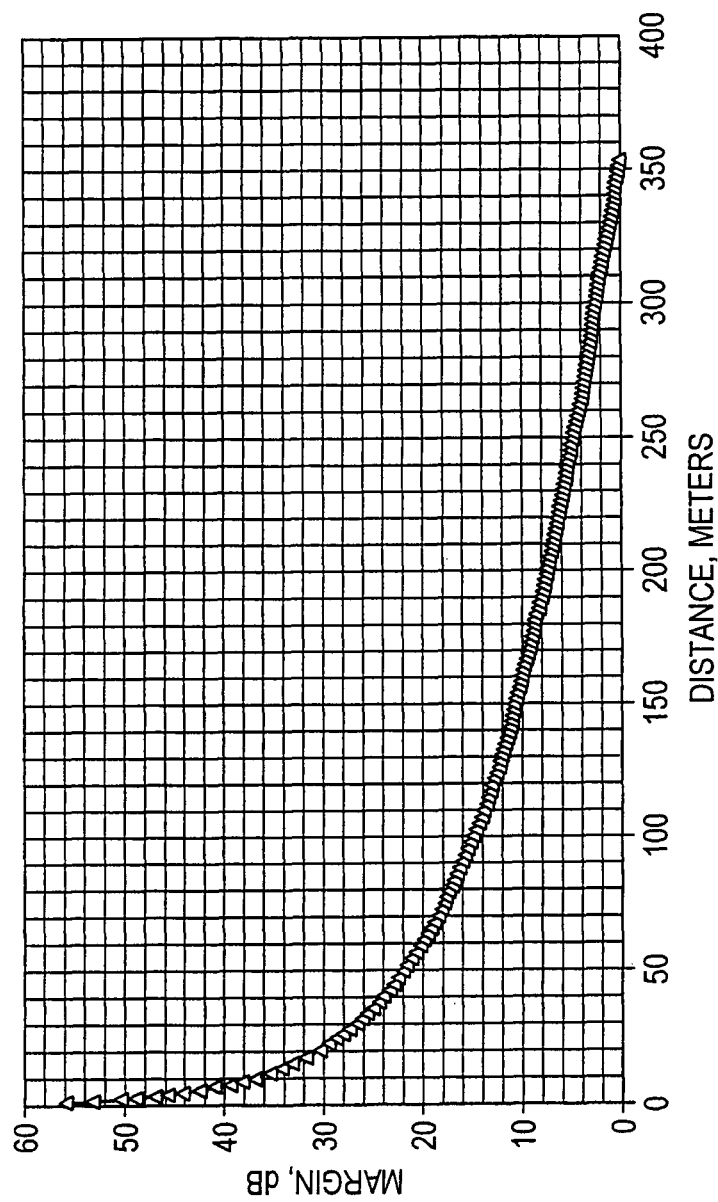
FIG. 4 illustrates the attenuation of a signal of an exemplary mmwLAN embodiment over distance.

Based on the attenuation characteristics illustrated in FIG. 4 for a system operating at approximately 60 GHz, each WARP 210 can be positioned approximately 50 meters from its adjacent WARP 210 along the perimeter of a square cell 200'. This results in at least 20 dB margin given a STA antenna gain of 15 dBi, a WAP antenna gain of 24 dBi and an input power of 16 dBm In other embodiments utilizing different frequency spectrum, the optimal cell size may vary depending on the signal attenuation characteristics for that spectrum. A WARP 210 is a wireless access point functioning as a layer-2 device such as a network bridge to a LAN or the Internet. Each WARP 210 may be connected to an aggregator 225 using CAT-5e or CAT-6 cabling, or fiber 220. An aggregator 225 is typically a layer-2 device that manages the Stations (STA) 215a, 215b, removes duplicates packets, and load balances the traffic. At the same time, the STA 215 also interfaces with a network router 235, management server, or gateway. The aggregator 225 may utilize any standard network protocol such as Ethernet and interface with any network including a fiber-based network.

Each STA 215 may be a mobile or stationary client device that may be integrated within or interface with another device, such as a laptop, a PC, a television, a set-top box or home entertainment equipment, a printer, a server, a Personal Digital Assistant (PDA), a wireless telephone, or a Voice-over-IP (VoIP) device. Typically, the STA 215 scans its immediate area to identify the two strongest WAPs 210 within its vicinity. In one embodiment, the STA 215 determines which two WAPs 210 within a particular cell that provide the strongest two signals and initiates communications with both WAPs 210. In another embodiment, the aggregator 225, a central server, or another network element may designate which WAPs 210 can communicate with a particular STA 215.

Data can be transmitted and received to-and-from one or more WAPs 210 either simultaneously or in different time slots. Consequently, the probability of receiving any error at the STA 215 is significantly reduced. For example, the probability of losing one packet with such a configuration is typically 0.1% while the probability of losing two packets is reduced to approximately $10^{-6}$.

The network architecture requires placement of WAPs along the periphery of a 52.5 m×52.5 m region. The region is populated by stations (STAs) which have 8-sectorized beams. These STN antennas improve the outage probability by more than two orders of magnitude when compared to omni-directional ones. This improvement is attributed to the higher gain of the STA antennas and reduced multipath reflection delay spread y virtue of narrow beam width and circular polarization. A STA can receive multiple signals, each at different frequency, from multiple WAPs. The STN can transmit duplicate packets sequentially to the same or different WAPs in the same or different frequencies. This combination of space, frequency and time diversity mitigates fading and interference and improves reliability and availability.

Detailed analysis indicates that the outage probability in a 52.5 m×52.5 m region with four WAPs in each corner is guaranteed to be less than $10^{-4}$ which translates to an availability of 99.99% minimum. The analysis considers 109 randomly placed obstacles, each obstacle having a mean loss of 6 dB and a standard deviation of 3 dB.

When twelve WAPs populate the periphery of a 102 m×102 m region, the outage probability drops to less than $10^{-5}$ or 99.999% availability minimum. This scenario 10 considers 436 randomly placed obstacles with 6 dB and 3 dB of mean loss and standard deviation respectively.

An office environment with human traffic is demanding. This is because human shadowing loss tends to be around 20 dB. The analysis considered 99 m×99 m region with 192 humans randomly placed and twelve WAPs located along the periphery. The outage probability was less than $10^{-2.7}$ or availability of 99.8% minimum. However, when the STA retransmits the signal, time diversity, the outage probability improves to less than $10^{-5}$ or availability of 99.99% minimum.

Figure 5:
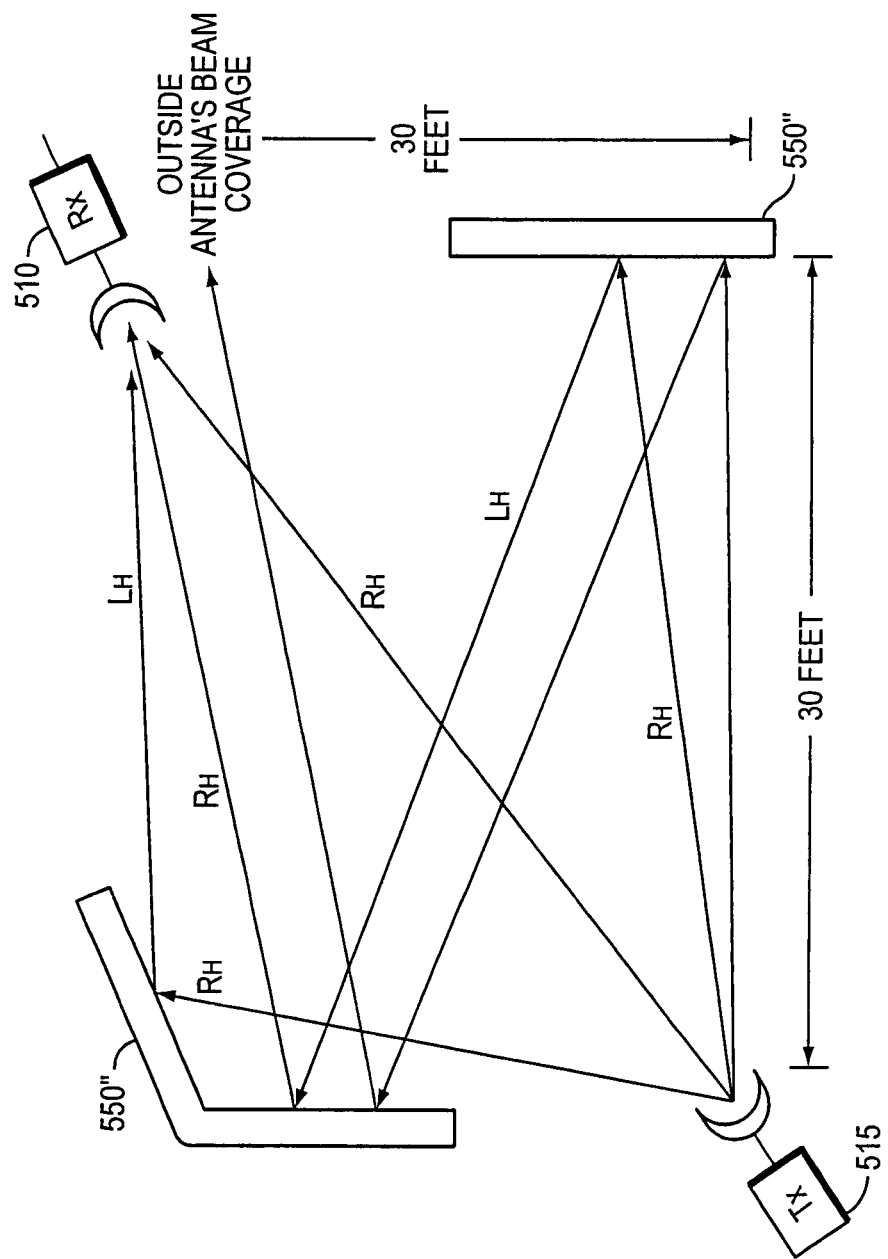
FIG. 5 shows the multipath effects of wireless transmissions.

Because the selected WAPs 210 operate at different frequencies, are positioned in different locations relative to the STA 215, and are likely different distances from the STA 215, the STA 215 utilizes the combination of frequency, space, and time diversity to ensure that a wireless connection is not lost or corrupted, resulting in a high degree of network availability. For instance, diversity typically reduces the impact of errors caused by interference due to, among other causes, the multipath effect illustrated in FIG. 5. Multipath refers to reflected versions of a transmitted signal arriving at a receiver with different respective delays due to the different path delays. Generally, such multipath is an undesired effect and represents noise at a receiver.

At least one way to reduce the effects of multipath is to use a sectorized antenna. A sectorized antenna communicates within a preferred range of directions and ignores directions out side of that range. Such operation will avoids all multipath that does not fall within the preferred range of directions. Another approach to reduce the effects of multipath is to use circularly polarized transmissions. As illustrated, odd numbers of reflections will change the sense of the polarization at a receiver. Thus a receiver configured to receive a right-hand polarized signal will ignore left-hand polarized reflections. Advantageously, sectorization can be combined with circular polarization for even greater performance enhancements.

Such a combination of diversity provides greater than 99.999% availability which may exceed commercial grade fiber or CAT 6 availability used as a backhaul for the wireless network. If only one WAP 210 is available, however, an STA 215 may interface with a single WAP 210 even though the probability of losing packets may increase.

Depending on modem capabilities and encoding techniques used which are discussed in more detail further herein, STA 215 data rates may reach 3.6 Gbps within a particular cell 200. Because each WAP 210 typically has a 1.2 Gbps channel, each cell 200 may support between 1.2-12 Gbps data rates depending on the number of WAPs 210 operating with a cell.

Figure 6:
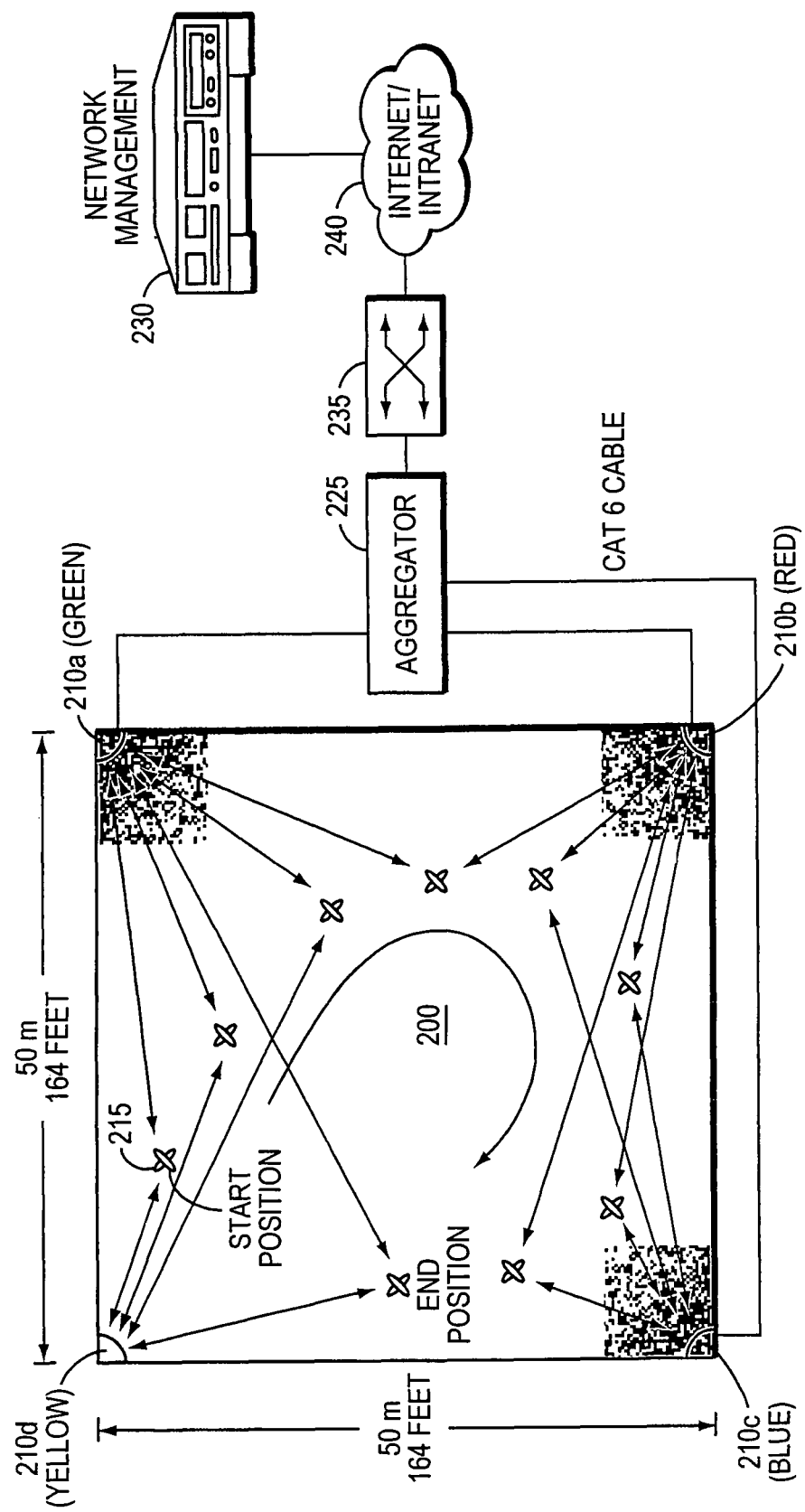
FIG. 6 shows how mobility is supported in a particular embodiment as an STA moved within a micro-cell.

FIG. 6 shows the WAP 210 handoff process as a mobile STA 215 moves in a clockwise direction within a particular cell 200. As the STA 215 moves, it constantly monitors the WAPs 210 ( four color-coded WAPs 210 in this case) to determine the signal strength. Based on the signal strength information and based on the instructions from the aggregator 225, the STA 215 will communicate with one or multiple WAPs 210. As illustrated in FIG. 6, the STA 215 begins in the start position connected to the yellow and green WAPs 210d, 210a, progresses around the cell 200 while connecting to the green and red WAPs 210a, 210b or the red and blue WAPs 210b, 210c, and eventually reconnects to the yellow and green WAPs 210d, 210a in the end position. The STA 215 may use a drop and connect technique to switch WAPs 210 or acquire the destination WAP 210 before dropping the carrier of the overpowered WAP 210.

Figure 7:
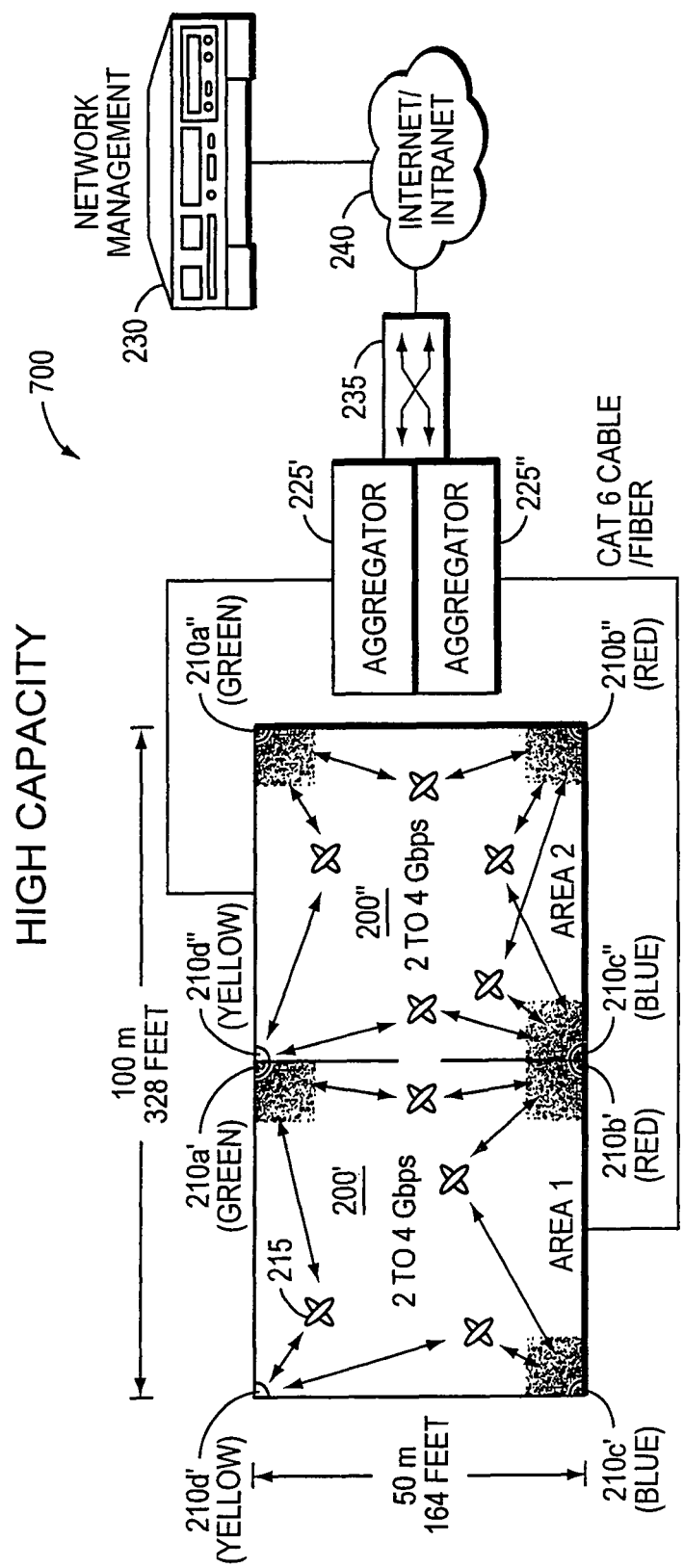
FIG. 7 shows an embodiment of an high capacity cell configuration in which two aggregators support two micro-cells.

While the coverage area of the exemplary cell 200 of FIG. 6 is limited to 250 m$^2$, the capacity and coverage area may be expanded by simply adding additional cells adjacent to each other. In FIG. 7 is shown an expanded cell architecture having two cells 200', 200" placed adjacent to each other to double the coverage area of the millimeter wave LAN. Because of the color-coded frequency diversity, the likelihood of interference between first and second cells 200', 200" is minimized. For instance, FIG. 7 shows that the green and red WAPs 210b', 210a' of the first cell 200' are adjacent to the yellow and blue WAPs 210c", 210d" of the second cell 200". Also, the transmitters and receivers of the green and red WAPs 210a', 210b' of the first cell 200' do not point in the direction of the transmitters and receivers and the green and red WAPs 210a", 210b" of the second cell 200". This configuration allows the same frequencies to be re-used within each cell 200 to greatly increase the overall network capacity while minimizing possible interference caused by using the same frequencies in each cell 200 or cell area. FIG. 7 also shows that multiple aggregators 225', 225" may coordinate with each other to handle the WAP operations within multiple cells 200 and the increased aggregate data throughput of the system 700.

Figure 8A:
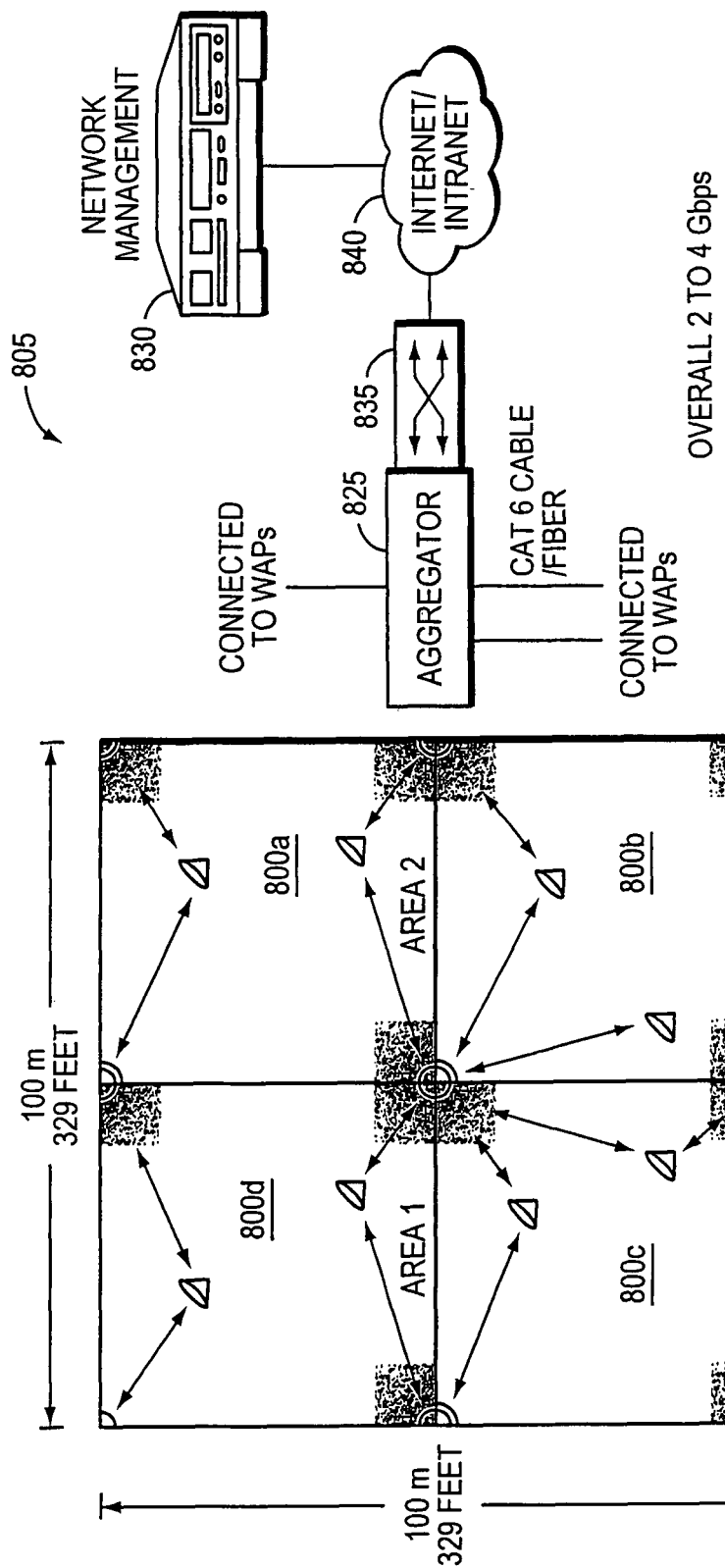
FIG. 8A shows an embodiment wherein a single aggregator supports multiple cells simultaneously.

In FIG. 8A, the number of cells are expanded to four 800a, 800a, 800c, 800d and area of coverage is expanded to 10,000 m$^2$. Depending on the throughput capability of the aggregator 825, the wireless network 805 may maintain a 2-4 Gbps data rate per cell 800 due to frequency re-use among all cells 800 or an overall 2-4 Gbps data rate among the four cells combined.

Figure 8B:
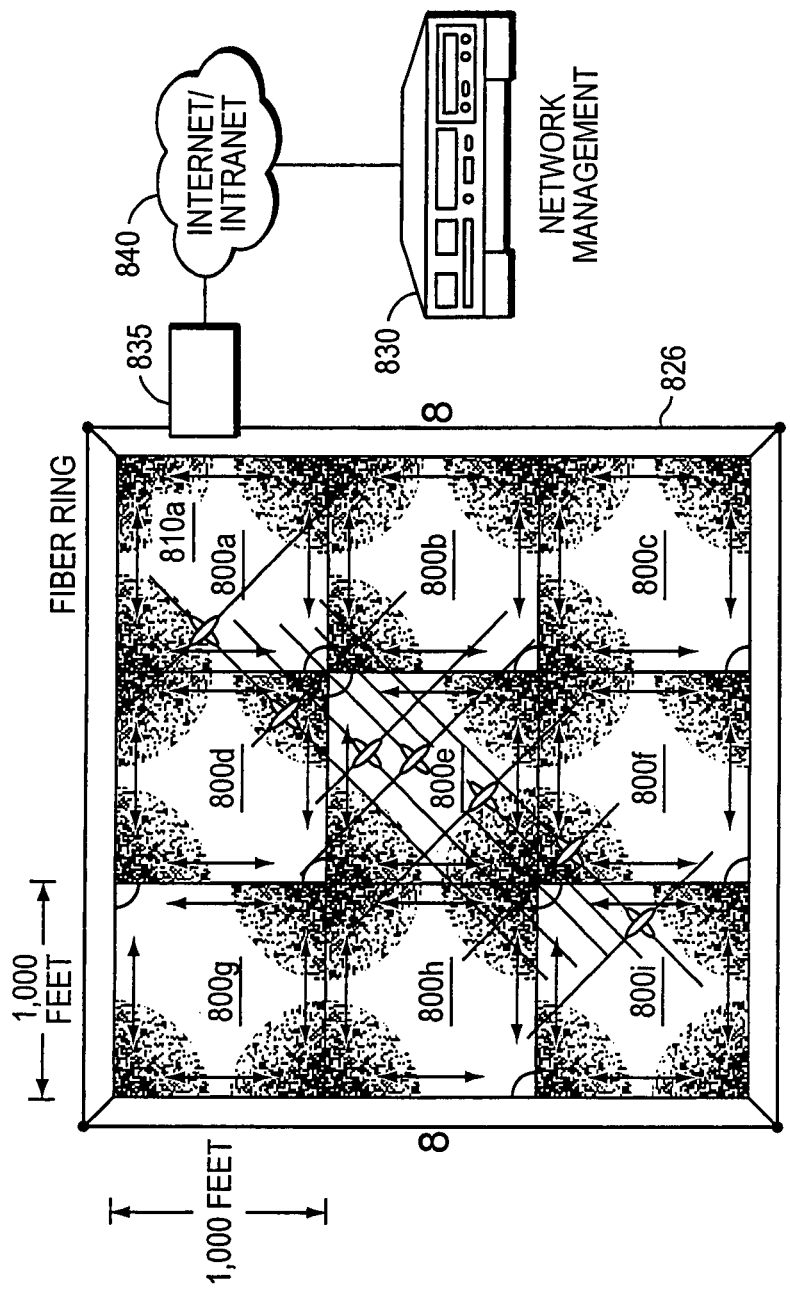
FIG. 8B shows an embodiment wherein multiple cells provide coverage over an extended area.

FIG. 8B provides a further example of a nine cell 800a-800i configuration that provides coverage over a much wider area to possibly support networking throughout a corporate or college campus. Each of the cells includes four WAPs 810 at its respective corners. Such extensive coverage is advantageous in providing outdoor coverage. Again, the color-coded frequency/WAP configuration within each cell continues to reduce possible interference between cells regardless of the number of cells. It is important to note that the number of cells and possible coverage area may be unlimited due to the frequency re-use and color-coded diversity technique employed within each cell.

Figure 9:
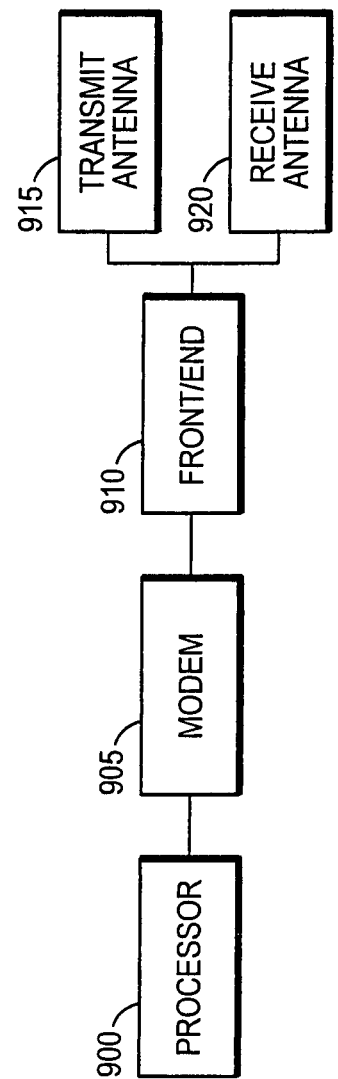
FIG. 9 is a functional block diagram of an embodiment of the wireless data system.

FIG. 9 is a block diagram that illustrates the components that are common to the WAP 210 and STA 215 elements. In particular, the components include processors 900 providing a Media Access Control (MAC) layer that facilitates access to the broadband wireless network, a high frequency wireless modem 905 that enables high data rate access to the wireless network, a front end 910 that may provide gain and/or filtering and transmit and receive antenna design and configurations 915, 920 that enables signal propagation between network elements to form a novel seamless wireless communications system. Each of the components are now described in further detail.

Media Access Control

Figure 10:
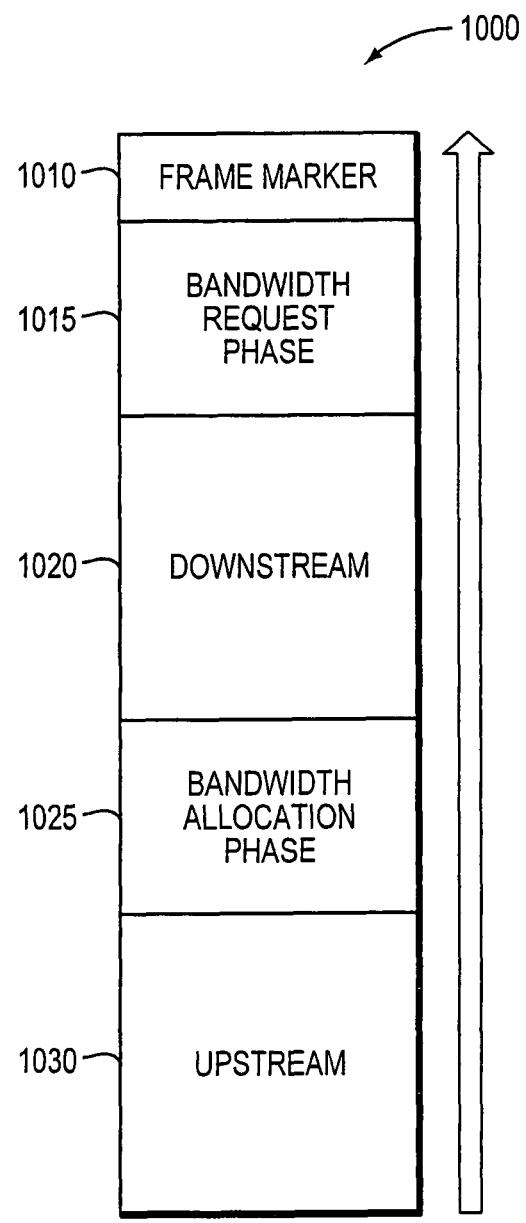
FIG. 10 illustrates an embodiment of the Media Access Control (MAC) layer.

In certain embodiments as shown in FIG. 10, a Media Access Control (MAC) layer may be employed to coordinated STA access to the WAPs and millimeter wave LAN network. To enable access control, each frequency band or channel, e.g., yellow, blue, red, or green WAP-to-STA 1 GHz channel, may be segmented into frames 1000 with each frame 1000 further including a Frame marker 1010, Bandwidth Request Phase 1015, Downstream data 1020, Bandwidth Allocation Phase 1025, and Upstream data 1030. The WAP 210, aggregator 225, or another network element typically exercises control as opposed to allowing an STA ad-hoc mode, however such mode may also be allowed.

The Frame marker 1010 may be a delimiter field that identifies the beginning of a frame 1000. The Bandwidth Request Phase segment 1015 may include STA 215 requests for data access. Because multiple STAs 215 may compete for access to the same channel, a contention protocol scheme such as CSMA-CA or the like that uses binary exponential back-off may be employed to ensure that each STA 215 has access to the Bandwidth Request Phase segment 1015. In other words, STA 215 request bandwidth in contention slots. If the slot is in use, a requesting STA 215 will wait a certain period of time based on an exponential back-off until attempting to transmit to the WAP 210 using that Bandwidth Request Phase segment 1015. The STA 215 may include Quality-of-Service (QoS) information in the request message.

The Bandwidth Allocation Phase segment 1025 may enable a WAP 210 to assign upstream data segments, downstream data segments, and their associated packet numbers to a particular STA 215. In other words, the WAP 210 may use the Bandwidth Allocation Phase segment 1015 to assign each connected STA 215 a unique slot within the carrier or frequency band data stream. In some embodiments, the WAP 210 assigns packet numbers to different STAs 215 for upstream transmissions. Depending the QoS, type of traffic, or other data criteria, the WAP 210 may use a scheduler to flexibly control the order of data packets sent to each STA 215.

Downstream data, i.e., data sent from a WAP 210 to one or more STAs 215, is typically delivered in the Downstream data segment 1020. The WAP 210 delivers data to the STAs 215. In some embodiments, the WAP 210 delivers data to the STAs 215. In some embodiments, the WAP provides variable-length downstream transmissions depending on traffic. Depending on the type of data traffic, the size of each downstream data packet may be varied to improve overall throughput efficiency. Downstream data may be transmitted contiguously. Upstream data, i.e., data sent from a STA 215 to the WAP 210, may be transmitted by a STA 215 according to a unique Upstream data segment slot assigned by the WAP 210.

Logically, the Bandwidth Request Phase segment 1015 is considered an upstream control channel that enables a STA 215 to request access to the network. Also, the Bandwidth Allocation Phase 1015 is considered a downstream control channel that enables a WAP 210 or other network controller to assign upstream and downstream data channels or segments to a particular STA 215 to enable network data exchange. While the upstream and downstream control channels may primarily handle initial STA 215 access to the network, bandwidth requests for existing data sessions may be enabled by allowing the STA 215 to append or "piggy back" request fields onto upstream packets in a previously-assigned upstream data segment or slot. The logical control channels may also support other essential network features such as STA 215 and/or network authentication or key distribution for subsequent authentication or data encryption.

For any wireless network where information is inherently vulnerable to interception, security is considered an important feature to prevent unauthorized access to the network or disclosure of information. Certain embodiments provide enhanced security features such as mutual authentication to prevent unauthorized STA access or to prevent a false WAP from attempting to access an STA. Private key, password, Public Key, Public Key Certificates, or Biometrics are among the mechanisms that may be used to enable STA authentication or mutual authentication between the STA and WAP or another network authentication element such as a RADIUS Authentication, Authorization, and Accounting (AAA) server.

Certain embodiments may support Extensible Authentication Protocol (EAP) or, more particularly, EAP over LAN (EAP-OL) or other 802.1x security mechanisms. Furthermore, secure and efficient cryptographic key distribution based on Kerberos, PKI, smart cards, Public keys, secret keys, tokens, or manual distribution, or other protocols such as IPsec, SSL, EAP or 802.1x may be employed to enable both authentication and data encryption. Block ciphers such as the Data Encryption Standard (DES), in any of its modes, may be used to encrypt control channels, data channels, or both channels. Publicly known or proprietary symmetric encryption algorithms including IDEA, Triple DES, RC4, RC5, AES (Rijdael), or the like may provide data privacy. Also, public key algorithms such as RSA may be used for privacy while Diffie-Hellman Key Exchange may be used for key distribution.

Encryption, scrambling, and other privacy techniques may be employed at multiple locations and network layers simultaneously to enhance network security. For example, AES encryption may be employed between the STA 215 and WAP 210 to provide data link protection over the air. Also, each WAP 210 may uniquely scramble signals on a per channel basis by assigning a unique seed to a STA 215 via the control channel. This per channel digital channel scrambling may be refreshed as often as desired by the WAP 210 depending on the per-channel policies regarding the security of certain users.

For example, the WAP 210, aggregator 225, or another network security element that supervises network access control may designate varying degrees of security depending on a user's privileges. Depending on the allowed privileges or sensitivity of access, the WAP 210 may periodically authenticate access, re-seed the access channel scrambling, and perform a new key exchange for AES encryption. Furthermore, the digital channel scrambling may be customizable to enable a network provider to incorporate a preferred scrambling or encryption technique.

In certain embodiments, such as when the frequency bands are in the 60 GHz range, techniques may be employed to limit the propagation of signals or confine the energy of such signal to limited areas, thereby reducing the possibility of interception or jamming. Other coding techniques such a code division multiple access (CDMA) may be employed to further prevent signal interception and jamming.

While most network MAC functionality may be employed at each WAP 210, it may also be employed at the aggregator 225, network router 235, gateway, or other network server such as a Remote Authentication Dial In User Service (RADIUS) Authentication, Authorization, and Accounting (AAA) server.

Wireless Modem
Special Requirements of the Millimeter Wave Band Modem

While the wireless network architecture and MAC features may support wireless networking at any range of frequencies, a wireless modem embodiment is described herein that supports wireless digital data communications between the STA and WAP in the mmwLAN frequency range, i.e., 50-90 GHz range. It should be noted, however, that the techniques employed to enable cost-effective modulation and demodulation in the mmwLAN range may also apply to wireless modem embodiments operating at other frequencies.

In order to produce data rates aggregating to over 10 Gbps over the millimeter wave bands at 50, 60, 70, 80 and 90 GHz which have bandwidths from 2 to 7 GHz, the modem needs to generate a bit rate density around 2 bps/Hz. To produce individual sub-channels of 1+Gbps, bands of least 500 MHz must be used per channel. The Nyquist sampling rate for such a bandwidth would exceed 1 gigasample-per-second. If converted by an A/D converter to 6-bits per sample, this would result in a bit rate of at least 6 Gbps which must be signal processed by a DSP. Such a signal processing architecture is well beyond the current state of the art. The modem proposed here uses Analog Signal Processing (ASP) techniques to accomplish this requirement.

Direct frequency synthesis from a crystal source produces a clean, stable signal. Unfortunately, frequencies for the millimeter wave band cannot be synthesized directly with a crystal. One has to begin with a lower frequency oscillator typically based on field-effect transistor (FET) technology or using a low-frequency crystal and then multiply the frequency up to the millimeter wave band in use. The phase noise performance resulting from such oscillators is not as good as can be achieved by a crystal oscillator alone since the process of multiplication also multiplies the phase noise by the same factor. Hence the currently-attainable millimeter-wave frequencies generated have a significant amount of phase noise. Consequently, design of the modem must use phase information with extreme care or it will only be able to achieve reasonable performance at high-received signal power levels.

The amplitude of the millimeter wave oscillator and the Local Oscillator (LO) leakage of the millimeter wave up-converter generally cannot be characterized very well and will drift in time. This makes the amplitude and DC in the IF (or baseband) modem signal unpredictable and susceptible to drift. If the modem signal has a DC component, DC wander would lead to errors. Slow Automatic Gain Control (AGC) and DC wander correction loops can be used to mitigate these effects in point-to-point modems. However, in a point-to-multipoint modem, one has to quickly turn the modem around to listen to different source for the duration of a packet, which may last a few microseconds. Hence slow AGC and DC wander correction circuits cannot be employed. The modem must, by design, deal with these problems.

The output power amplifier at the transmitter is one of the most expensive components used in a millimeter wave band modem and its cost grows exponentially with the power it has to deliver. Unfortunately, in order to keep the cost in line one has to drive the amplifier as hard as reasonably possible. This produces distortion in the signal in the form of compression. The modem design has to take such distortion into account. Most traditional modem designs require very good linearity in the power amplifier typically obtained by operating the amplifier at a power level that is reduced by 6-10 dB from the 1 dB compression point to keep the amplifier in the linear region.

To achieve the high bit rate density, the modulated IF and RF signals must preserve bandwidth by using a spectrally-efficient modulation, such as Single Side Band (SSB) or Vestigial Side Band (VSB) techniques. Circuits that are used to implement these techniques, however, are increasingly inaccurate at the band edges also as the operational bandwidth is increased. For these reasons the bandwidth is minimized and the energy at the band edges are reduced to as low a value as possible.

Lastly, the cost of ASP techniques (unlike DSP techniques) rises exponentially with complexity. For example, building adaptive equalizers using ASP techniques is very difficult, expensive and not reasonable (compared to DSP) beyond relatively simple cases. As another example, achieving clock recovery using an adaptive Costas loop results in fairly hard-to-implement circuits that drive up the cost. So the modem is preferably restricted to using simple methods for all the sub-functions.

Design of the Modem

The modem described here processes sub-channels of bandwidth exceeding 460 MHz to produce data rates beyond 1 Gbps. Thus the resulting bit rate density is approximately 2.2 bps/Hz. The baseband signal has substantially no energy at DC and again at half the baud rate. This allows the receiver to be AC connected thereby eliminating the need for DC wander correction circuits. It also allows for the injection of two low level pilots into the signal: one at DC; and the other at half the baud rate. The DC pilot maps into the sub-carrier frequency of the millimeter wave sub-band being employed. It undergoes the same phase change (including phase noise) as the modem signal. So it can be used to coherently demodulate the signal at the receiver either directly or more likely through an IF stage. Such demodulation allows one to considerably mitigate the phase noise effects as well.

The second pilot allows for using a rapid AGC at the receiver, since the second pilot's amplitude is well controlled at the transmitter relative to the signal. Also, when the coherent demodulation described above, is finished, this second pilot moves to the half-baud rate frequency as defined at the transmitter end. This allows the receiver to achieve very simple clock recovery. Since the second pilot undergoes the same phase translations as the signal, the rising and falling edges of the second pilot can be used for data recovery as well. In essence, the differential frequency between the two pilots allows us to bring transmitter timing to the receiver in spite of the frequency inaccuracy and the phase noise of the millimeter wave oscillators at the transmitter and the receiver.

This modem design essentially is a baseband scheme and does not use the phase information. It is also highly resistant to compression and can easily operate through 1 dB compression with minimal eye closure. While this is not intuitively obvious, it is easily verified by simulations.

In conclusion, the modem uses a coding technique described herein and called Dual-Rail Bipolar (DRB) combined with Single Sideband (SSB) transmission to achieve the high bit rate density and the spectral nulls at DC and half the baud rate where the dual pilots are inserted. DRB is a novel variant on the traditional technique called Bipolar Coding (or Alternate Mark Inversion (AMI)) used by T-carrier lines deployed by the phone company. The coding scheme allows for use of the dual pilot scheme described above. In concert, these three techniques (DRB, SSB, Dual-Pilot) can be used to meet all of the requirements outlined in the previous section.

Wireless Modem: Details

Wireless data communication systems such as IEEE 802.11, CDMA 2000, and 3GSM use digital communications as opposed to earlier AM or FM radios that rely solely on analog communications. Digital communications enable the transfer of information in the form of discrete 1s and 0s which usually correspond to approximately 5 volts and 0 volts respectively in a CMOS electronic circuit, e.g., Return-to-Zero (RZ) signals. The transmission of an information sequence results approximately in square waves with approximately 5-volt peaks and 0-volt valleys. Unfortunately, square waves have infinite bandwidth that results in time domain spreading of each square wave when filtered by the finite bandwidth of most real life channels.

While it is acceptable to transfer information as binary 1s and 0s, or square wave pulses, in an electronic circuit with essentially infinite bandwidth, Nyquist showed that, in a bandwidth limited environment (e.g., a wireless access channel), infinite bandwidth square wave pulses, after channel filtering create inter-symbol interference (ISI) whereby, due to time domain spreading, the energy of preceding square waves wash over the energy of subsequent square waves (See "Certain Topics in Telegraph Transmission Theory," Harry Nyquist, Trans. AIEE 47: pp. 627-644, 1928).

Thus, a receiver detects the combination of many symbols simultaneously, preventing retrieval of the original information. In other words, the received signal may be undetectable or appear to be noise.

In a wireless digital communications environment, information is propagated using electromagnetic energy in the form of carrier waves of a certain wavelength or frequency that are frequency or amplitude modulated with digital information. Modulation is generally a three-step process including: (i) baseband modulation where the binary information bits are shaped to minimize ISI in the limited spectrum; (ii) passband modulation where the baseband signal is further modulated to an intermediate frequency (IF) carrier; and (iii) The IF signal is modulated to the millimeter wave sub-band the signal is supposed to operate in, the radio frequency (RF) signal.

A wireless modem is used to both modulate carrier signals with outgoing baseband digital information and to demodulate received signals to recover incoming baseband digital information. Pulse amplitude modulation (PAM) is the most common baseband modulation technique wherein a sequence of information pulses is amplitude modulated into time-translated pulses. PAM is a form of linear modulation in which baseband data bits modulate an in-phase, i.e., cosine carrier. Other forms of modulated PAM include quadrature amplitude modulation (QAM) where doubling of the transmitted data rate is obtained by modulating the quadrature, i.e., sine carrier with independent data. Yet another example is phase shift keying (PSK) where multiple data bits can be coded into one of multiple phases of a carrier.

To eliminate the problem of ISI, Nyquist proposed that digital information signals be transmitted using band limited pulses of a form that create no ISI. Nyquist showed that such pulses have a bandwidth somewhat greater than ½ T where T is the baud period. The excess bandwidth is described by a factor $\alpha$ and the overall bandwidth of the pulses is $(1+\alpha)/2$ T. He showed that when properly designed, such pulses can be made to have a value of 1 at some time t* and undergo periodic zeros every T seconds before and after t*. It is clear that such "Nyquist" Pulses will produce no ISI at times t*+nT where 'n' is the set of integers. The only pulse at that time with a non-zero value will be the pulse carrying the $n^{th}$ data bit (this pulse will have a one value).

Figure 11:
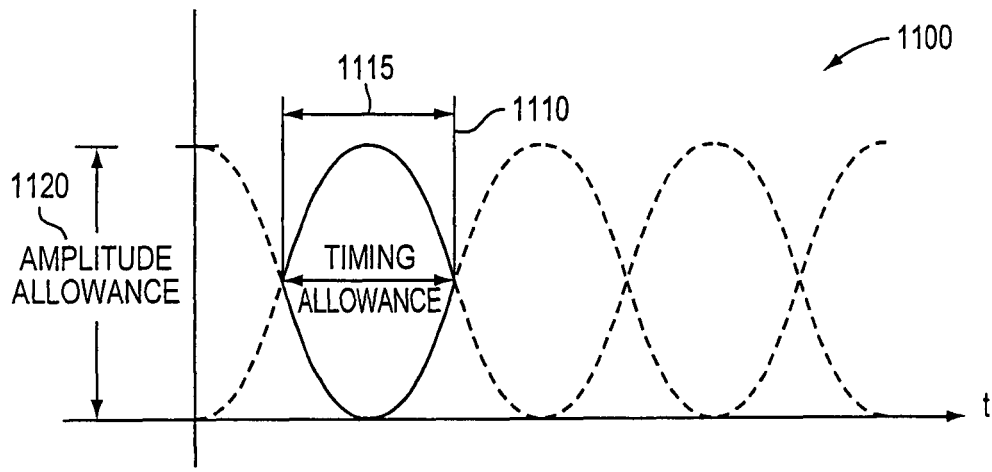
FIG. 11 illustrates a persistent trace of an oscilloscope configured to display an exemplary "eye" diagram.

By using an oscilloscope in persistent mode, the "eye" diagram according to FIG. 11 may be used to measure the amount of ISI within a signal. Overlapping traces 1100 of the signal produce an "eye" pattern. The width of the one of the openings corresponds to a timing allowance and the height or openness of one the eyes corresponds to an amplitude allowance. For a Nyquist pulse train, the "eye" diagram will appear well-defined and clean. For non-ideal pulses, the "eye" diagram will be less open with the horizontal (timing) and vertical (amplitude) space will close compared with the ideal pulse. The horizontal width of the "eye" diagram can be controlled using an equalizer to compensate for channel dispersion/distortion. The vertical width or height of the "eye" diagram is generally controlled by a pulse shaping filter and amount of noise in the communications channel.

Figure 12:
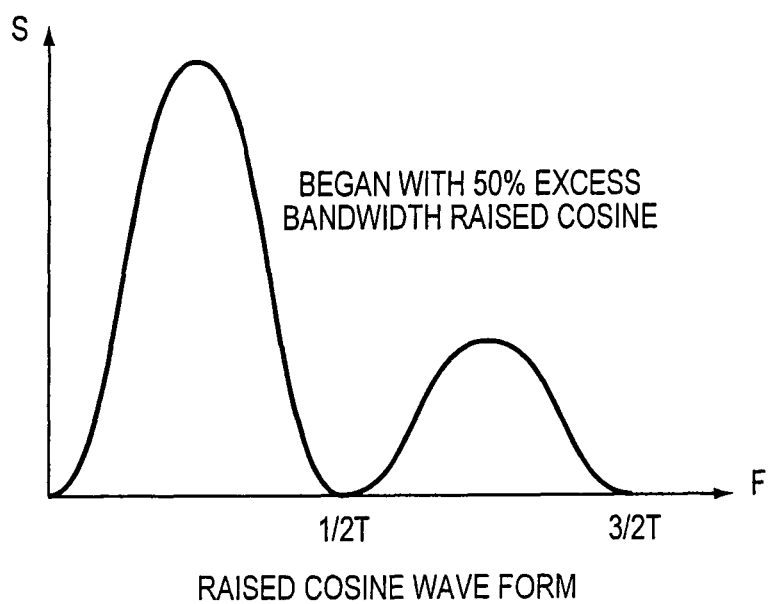
FIG. 12 shows a Raised Cosine Waveform.

Although it is impractical to achieve the Nyquist pulse in real systems, other types of pulse waveforms may be implemented using a pulse-shaping filter to minimize ISI. The raised cosine (RC) pulse is popular as it represents a Nyquist pulse with the shape of an offset cosine pulse that oscillates and decays rapidly. FIG. 12 illustrates an RC pulse with 50% excess bandwidth. The RC pulse also has zero crossings at multiples of T that eliminates ISI. The RC pulse's bandwidth may be varied between the minimum Nyquist bandwidth, R/2, and R where R is the symbol rate. As explained earlier, the amount that the bandwidth exceeds R/2 is known as the Excess Bandwidth a factor. The RC pulse width may be decreased by increasing the excess bandwidth. Typically, an RC pulse with 25 to 50% excess bandwidth is employed. The impulse response of an RC is defined as:

$$x(t) = \frac{\sin(\pi t/T)}{\pi t} \frac{\cos(\pi \alpha/T)}{1 - 4\alpha^2 t^2/T^2} \text{ Where } T = 1/R \quad (1)$$

Typically, to implement the RC response, RC filtering is split into two parts, with one part at the transmitter and the other at the receiver, to create a matched set of filters. When the RC filter is split into two parts in this manner, each part is known as the Root Raised Cosine (RRC) because the RRC is the square root of the RC frequency response in the frequency domain. When the two filter parts are combined in series at the transmitter and receiver, the result is the original RC filter. The advantage of using a RRC filter is that received information pulses have a low pass response that allows the data information to pass while attenuating high frequency noise. The matched filter pair also correlates the received signal with transmit pulse shape to improve the signal-to-noise ratio (SNR). Such RC filters are typically realized as Finite Impulse Response (FIR) filters in a DSP based system.

PAM also employs line coding such as RZ, Non-Return-to-Zero (NRZ), four level, Bipolar (Alternate Mark Inversion (AMI)), or Manchester coding to produce desired spectral properties in the modem signal such as eliminating a Direct Current (DC) component or to creating spectral nulls at desired frequency points.

In a PAM digital communications system, the date rate (DR) is proportional to the symbol rate and number of modulation levels.

$$DR = \frac{1}{T}\log_2 N \text{ where } R = 1/T \text{ and } N = \# \text{ of Modulation levels} \quad (2)$$

Using QAM, the number of bits/symbol may be increased, allowing the data rate to be doubled for a given bandwidth or symbol rate by modulating one DR worth of data on a "cosine" carrier and modulating another DR worth of data on a "sine" carrier in quadrature to the original "cosine" carrier. With QAM, a constellation of data points is created based on phase and amplitude. For example a 4-QAM constellation will have 4 points, each point associated with two data bits, while a 16-QAM constellation will have 16 -points, each point associated with 4 data bits. Because QAM increases the number of data points, the distance between these data points decreases resulting in a reduction of signal-to-noise ratio (SNR) at which satisfactory performance can be obtained. However, compared to PAM, the symbol rate R can be doubled with typically only a modest penalty on minimum SNR required.

A QAM signal is depicted as follows:

$$s(t)=x(t) \cos 2\pi f_c t + y(t) \sin 2\pi f_c t \quad (3)$$

To recover the baseband x(t) signal, a digital receiver relies on coherent demodulation by multiplying s(t) by cos 2π f_c t, resulting in the following:

$$s(t)\cos 2\pi f_c t = \frac{x(t)}{2} + \frac{\cos 4\pi f_c t}{2} + \frac{y(t)}{2}\sin 4\pi f_c t \quad (4)$$

Then a low pass filter is used to eliminate all but the baseband signal x(t). To recover y(t), s(t) is multiplied by sin 2π f_c t. A low pass filter then recovers y(t). Thus QAM provides the benefit of doubling the data rate, but the required coherent demodulation increases receiver complexity.

Single Sideband (SSB) is an alternative QAM. In SSB, instead of transmitting two redundant sidebands of the modulated PAM signal, one of the sidebands is suppressed at the transmitter without losing the transmitted information. SSB, however, requires more complexity at the receiver to recover the baseband information from the remaining sideband. SSB also requires coherent demodulation.

Figure 13:
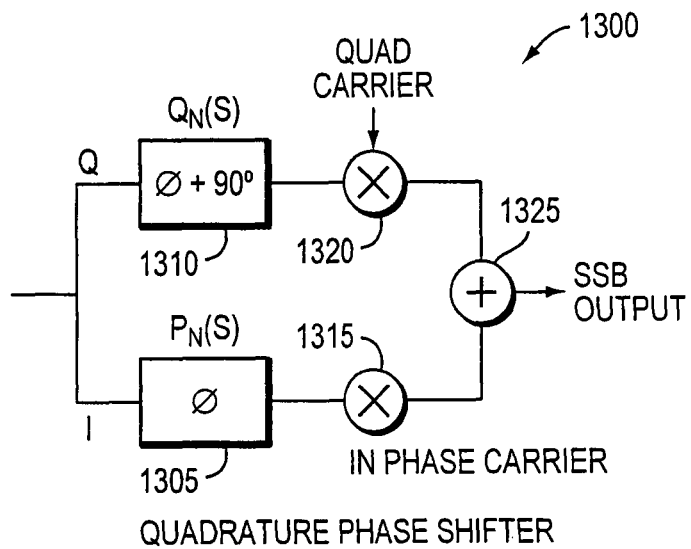
FIG. 13 is a block diagram of an exemplary quadrature phase shifter circuit.

A common method of generating SSB is by using a quadrature phase shifting Hilbert Transformer as shown in FIG. 13. In general, it is not possible to build one network, which can produce a 90 degree phase shift across a whole band of frequencies. However one can design two networks, a P-network and a Q-network such that the relative phase at the output of the two networks are approximately 90 degree separated across the required band. (See *IRE Transactions on Circuit Theory*, June 1960, pp. 128-136, Normalized Design of 90° Phase Difference Networks, S. D. Bedrosian).

The exemplary quadrature phase shifter 1300 receives a baseband signal and routs the signal simultaneously to a P-network 1305 and a Q-network 1310, the outputs of the two networks 1305, 1310 being about 90° out of phase with respect to each other. The outputs are each input into a respective multiplier 1315, 1320, each multiplier 1315-1320 mixing the respective input signal with a respective carrier signal. The mixed outputs of the two multipliers 1315, 1320 are combined in a summer 1325 producing a SSB output signal.

As one approaches DC (the lower end of the band) or the upper end of the band, the error increases, which is another reason to minimize/eliminate the energy near the band edges.

In order to operate in the 60 GHz range, a modem must have the ability to generate a 60 GHz carrier signal. Conventional oscillator circuits and crystals cannot generate such a high frequency directly. Typically, a dielectric resonator oscillator (DRO) field-effect transistor (FET) is used to generate a 7.5 GHz signal that is then multiplied by a factor of eight (8) to achieve a 60 GHz carrier signal. Unfortunately, an affordable DRO FET has an accuracy deviation of approximately 0.1% and medium jitter of approximately 5%. When the DRO FET output signal is frequency multiplied by 8 to achieve the desired 60 GHz carrier, the resulting jitter increases by the same factor of 8 to 40%, resulting in an unacceptable amount of phase noise. In another embodiment, a crystal operator operating in the sub-Gigahertz frequency band is directly multiplied up to 60 GHz. This allows for high frequency accuracy but does not solve the phase noise problem.

Jitter essentially causes sine to cosine and cosine to sine conversions in a signal that result in closure of the "eye" diagram. If QAM is used, the resulting data point constellation is significantly distorted by the jitter, reducing the allowable error margin between data points. Thus, the SNR in such a modem must be high to compensate for the "eye" closure.

With 40% jitter, the necessary SNR may be impracticable for a 60 GHz modem that has to go a reasonable distance.

The most expensive component of a modem is typically the power amplifier. At 60 GHz, a reasonably affordable power amplifier produces 1 dB compression at approximately 19 dBm power. Gallium Nitride (GaN) power amplifiers may produce higher power outputs before the 1 dB compression point is reached, however, the cost of making GaN wafers by epitaxy further increases the power amplifier cost. Because conventional 60 GHz wireless modems typically use QAM that is susceptible to signal compression, the output power of these modems has to be effectively reduced by 6-9 dB to stay in the linear range. This is a big penalty and the system can only operate at a 10 dBm power level while paying for a 19 dBm amplifier.

Other requirements on the modem were outlined in the previous section. QAM modems fail most of these requirements.

In a particular embodiment, the foregoing problems associated with current 60 GHz wireless modems are resolved or mitigated using various techniques described as follows. To reduce ISI, binary data bits are initially filtered into approximate Square-Root Nyquist (SRN) pulses with a 20% EB as shown in FIG. 12. Nyquist pulse shaping is achieved by using matched filtering with a respective SRN filter at each of the WAP 210 and STA 215.

Figure 14:
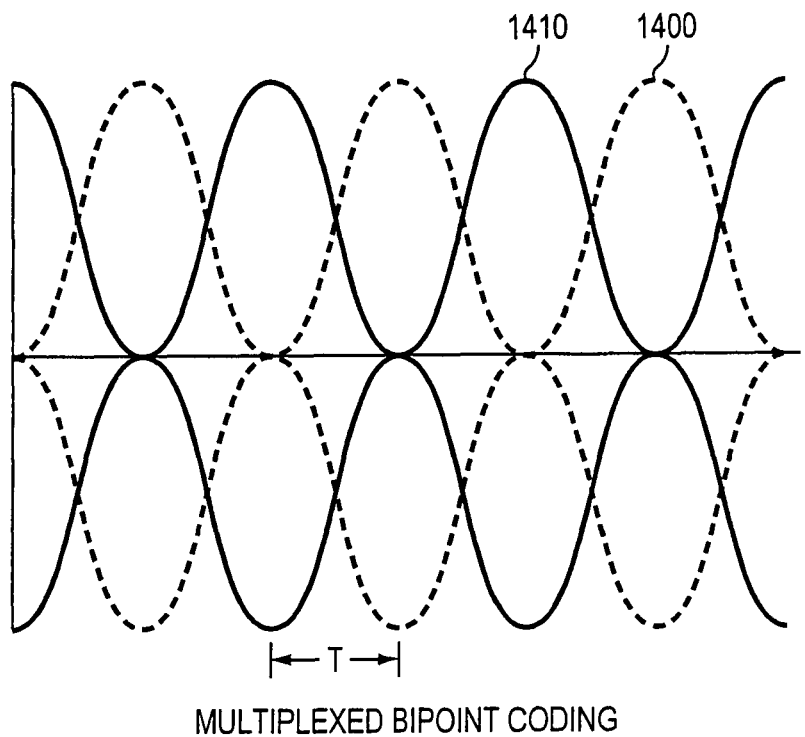
FIG. 14 illustrates an exemplary Dual-Rail Bipolar Coding waveform.
Figure 15:
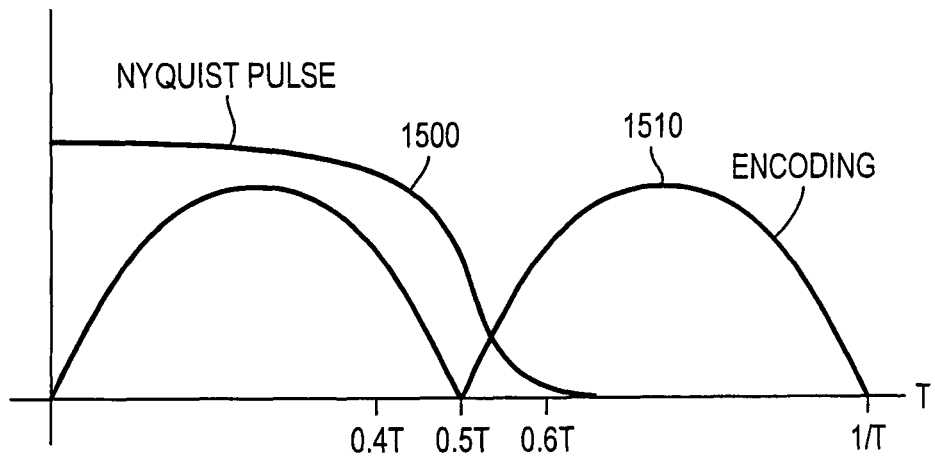
FIG. 15 is a spectral diagram showing the spectra of a Nyquist pulse and a Dual-Rail Bipolar coded signal.
Figure 16:
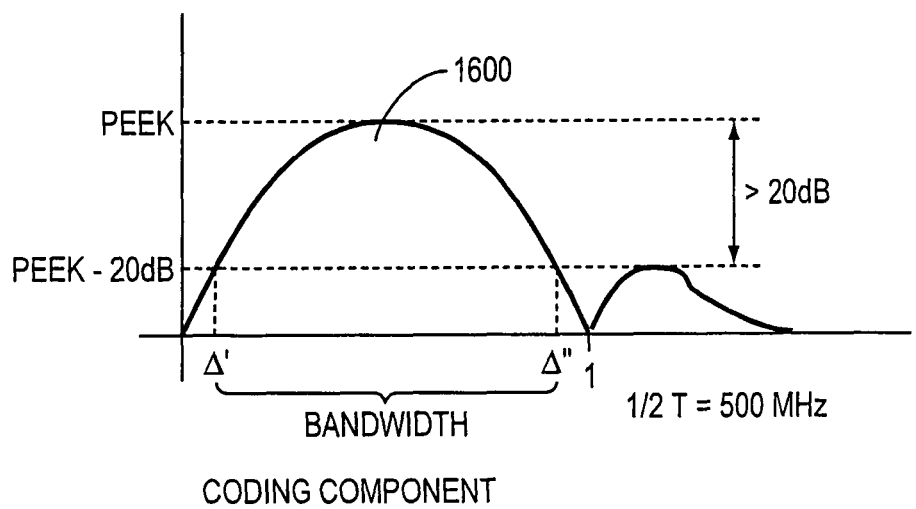
FIG. 16 is a spectral diagram showing the resulting spectrum of the coding of FIG. 15 applied to the Nyquist pulse of FIG. 15.

To eliminate the 9 dBm back-off caused by using QAM, Dual Rail Bipolar (DRB) coding is used instead to create the baseband signal. With DRB, a second Nyquist pulse train is added to data channel as illustrated in FIG. 14, effectively doubling the channel data rate. As shown, two dual rail signals 1400, 1410 are multiplexed together forming a composite DRV waveform. The compression problem associated with QAM is also nearly eliminated using DRB with Automatic Gain Control (AGC) to mitigate non-linear distortion of the baseband signal. the As shown in FIG. 15, shows the spectral contributions of the individual components of the components of the baseband signal. Namely, a Nyquist pulse spectrum 1500 and a coding spectrum 1510 are overlayed. When combined, the resulting spectrum of the encoded signal is illustrated in FIG. 16. The resulting bandwidth has been reduced and substantially contains most of the energy For a data rate of 1 Gbps, using 20% excess Bandwidth Nyquist Pulses, the resulting bandwidth is approximately 600 MHz. Further, as the signal dwindles to zero power at DC and at 500 MHz, the 20 dB down signal occupancy 1600 which contains almost all the signal power is confined to approximately 20-480 MHz. Thus the modem has packed 1 Gbps into 460 MHz of bandwidth resulting in a bit density of about 2.2 bps/Hz, which is better than QPSK (4 QAM) and straight Bipolar transmission.

To transmit the 500 MHz coded baseband information, the signal must be moved to or used to modulate a carrier signal to an IF and, eventually, to the 60 GHz RF modem output. The resulting modulated signal, however, will effectively double the base bandwidth back to 1 GHz due to the modulation process. For example, if the DRB signal is multiplied by a 2 GHz IF signal during the modulation process, the resulting signal will have an upper sideband to 2.48 GHz (2 GHz+0.48 GHz) and a lower sideband at 1.52 GHz (2 GHz−0.48 GHz). The combination of the two approximately 500 MHz sidebands results in an approximately 1 GHz bandwidth signal. The embodiment here employs SSB (or equivalently VSB) to counter the doubling of the DRB bandwidth during modulation by eliminating (or filtering) all (or a significant portion) of one of the signal sidebands before transmission.

Figure 17:
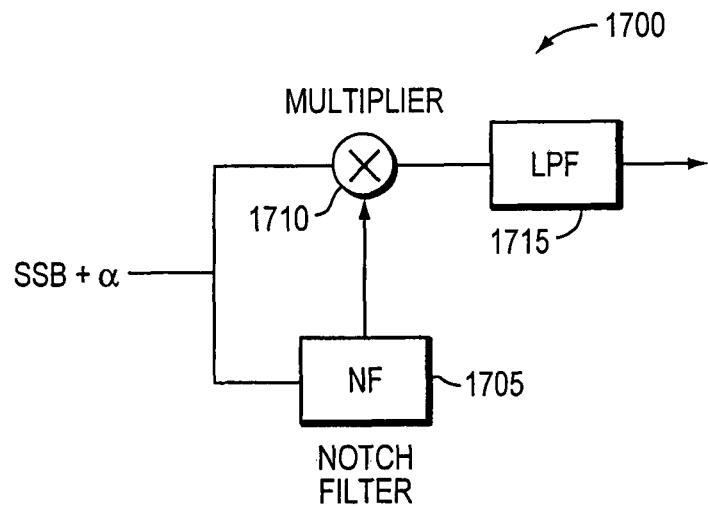
FIG. 17 is a block diagram of SSB demodulator with pilot signal recovery.

SSB (and VSB) requires coherent demodulation at the receiver to recover the baseband signal. When performing coherent demodulation, however, the receiver frequency must match the transmitted carrier frequency to prevent degradation and distortion of the signal. To enable synchronization of the carrier signals between the transmitter and receiver, the transmitter may add a pilot signal ($\alpha_1$) at half the baud rate (500 MHz in the 1 Gbps example) to the remaining SSB or VSB sideband before transmission. The receiver then uses a notch filter to recover the pilot from the received signal that ensures coherency between the carrier at the transmitter and receiver since the pilot and the signal undergo equal phase transformations over the essentially dispersion free channel. After the receiver uses the pilot for coherent demodulation, the receiver recovers the encoded DRB signal in the time domain as shown in FIG. 17. A demodulator 1700 with pilot-signal recovery receives an SSB modulated signal including a pilot signal (x). The signal is directed simultaneously to a notch filter 1705 and to a multiplier 1710. The notch filter 1705 is turned to the pilot signal frequency. An output of the notch filter including the pilot is input to the multiplier 1710. The output of the multiplier 1710 is routed through a low pass filter 1715 providing the received baseband signal.

Figure 18:
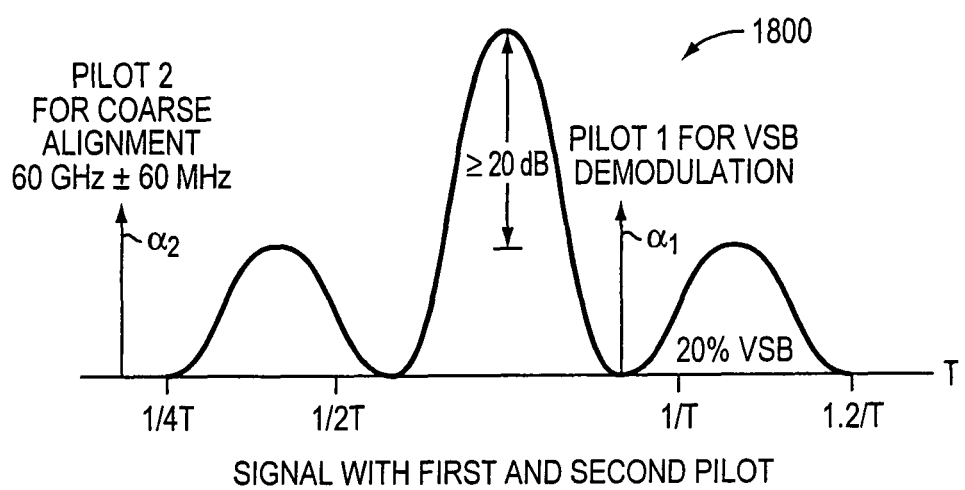
FIG. 18 shows the location of Pilot 1 and Pilot 2 in the frequency domain to enable VSB demodulation.
Figure 19:
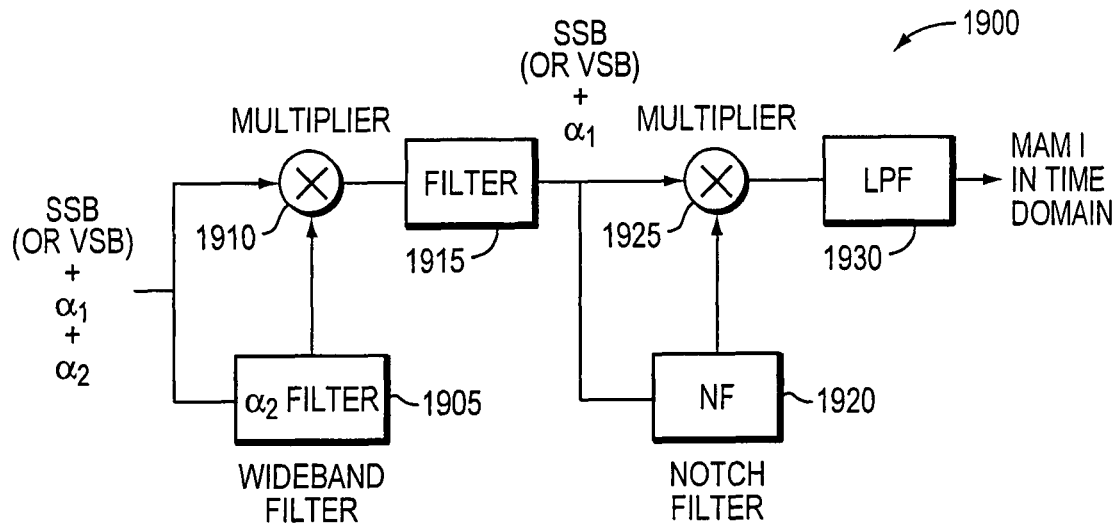
FIG. 19 is a block diagram of SSB or VSB demodulator using two pilots.
Figure 20:
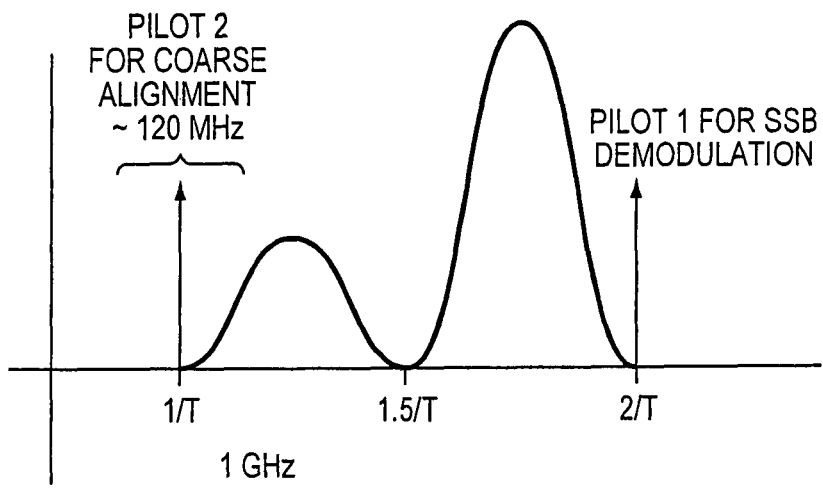
FIG. 20 shows the location of Pilot 1 and Pilot 2 in the frequency domain to enable SSB demodulation.

A second pilot signal ($\alpha_2$) may also be used as shown in FIG. 20 to enable clock and data recovery at the receiver. In this instance, the second pilot, or Pilot 2, is located a frequency corresponding to ½ T at the baseband while the first pilot, or Pilot 1, is located at a frequency corresponding to DC in the baseband signal. FIG. 18 shows an embodiment of an incoming IF signal 1800 having two pilots, the recovery of the first pilot a1 can be accomplished using a notch filter and used in coherent demodulation of the signal. The second pilot is inserted at the transmitter at a well-defined power level relative to the signal. The second pilot $\alpha_2$ is recovered and its power measured. This information can be used to drive an AGC for the received signal. A demodulator 1900 with dual-pilot signal recovery receives an SSB signal including the two pilots $\alpha_1$, $\alpha_2$ (FIG. 18). The received signal is routed to a wideband filter 1925 adapted to filter the second pilot $\alpha_2$ and to one input of a first mixer 1910. The received signal is also coupled to a second input of the first mixer 1910, the output of the mixer being filter 1915 and routed to a second stage including a notch filter 1920, second multiplier 1925 and low pass filter, similar to the demodulator of FIG. 19.

A slicing level used in detection of the data can also be derived from the received power level of the second pilot signal. The receive SRN filter eliminates the second pilot from the AGC'd signal. Detectors typically include a slicer determining received data according to an energy level for example, a slicing level can be derived from the pilot signal of FIG. 20. A Group delay equalizer equalizes the combined group delay of the transmit SRN, The Hilbert Transformer, and the receive SRN. The slicer then slices the two rails using two dual-comparators banks to recover the two rails. One of the dual comparators slice the positive going data bits of a rail while the second comparator slices the negative going data bits of the rail. One bank's positive and negative outputs are latched on the positive going edges of the recovered half Baud rate clock (Pilot 2 based) and the other bank's positive and negative outputs are latched on the negative going edges of the same clock. This recovers the two rails of the DRB signal.

Figure 21:
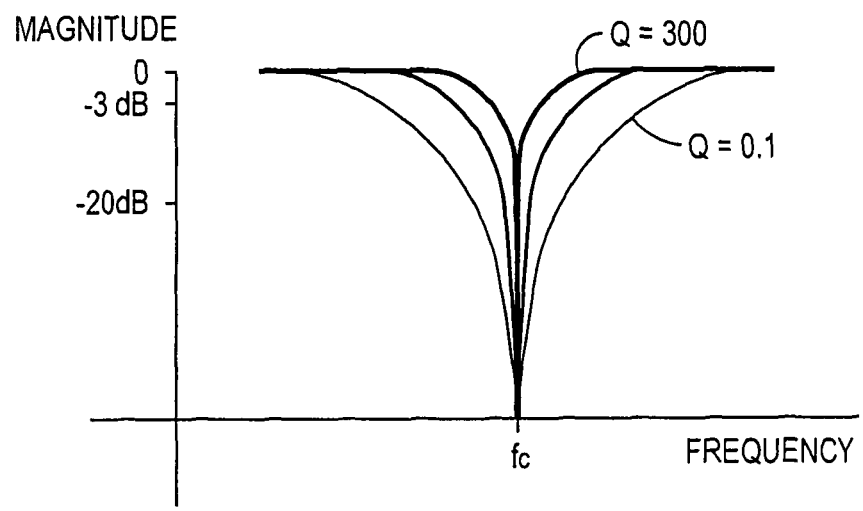
FIG. 21 illustrates the Q characteristics of an exemplary notch filter.
Figure 22:
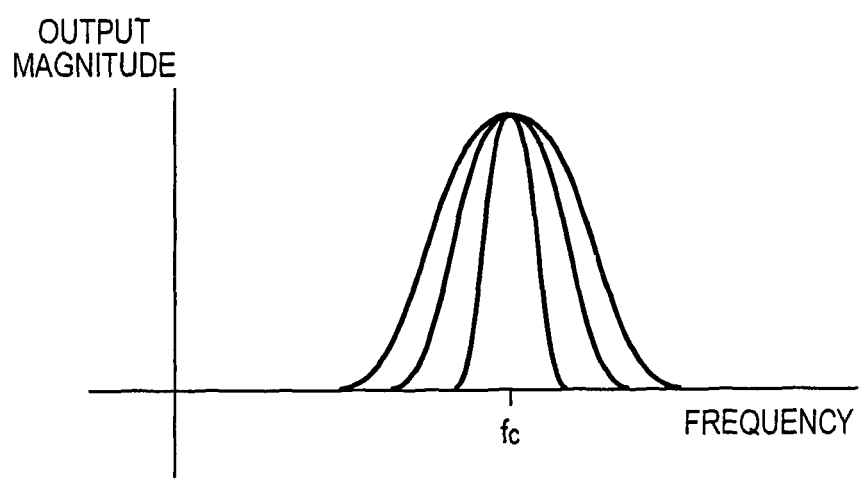
FIG. 22 shows the output magnitude when a notch filter is place in parallel with a circuit load.

One type of notch filter that may be used is based on a ceramic coaxial resonator that has a high Q, defined as the center frequency of the filter divided by the bandwidth between the −3 dB points. The Q of a coaxial resonator is typically 300 to 500 while the center frequency is set by the filter length where L=λ/4 and λ is the wavelength of the center frequency to be filtered. While a notch filter passes all frequencies except those in the stop band centered on the center frequency as shown in FIG. 21, the output signal magnitude is maximized at the center frequency as shown in FIG. 22 because the notch filter is effectively in parallel with the output load.

Figure 23:
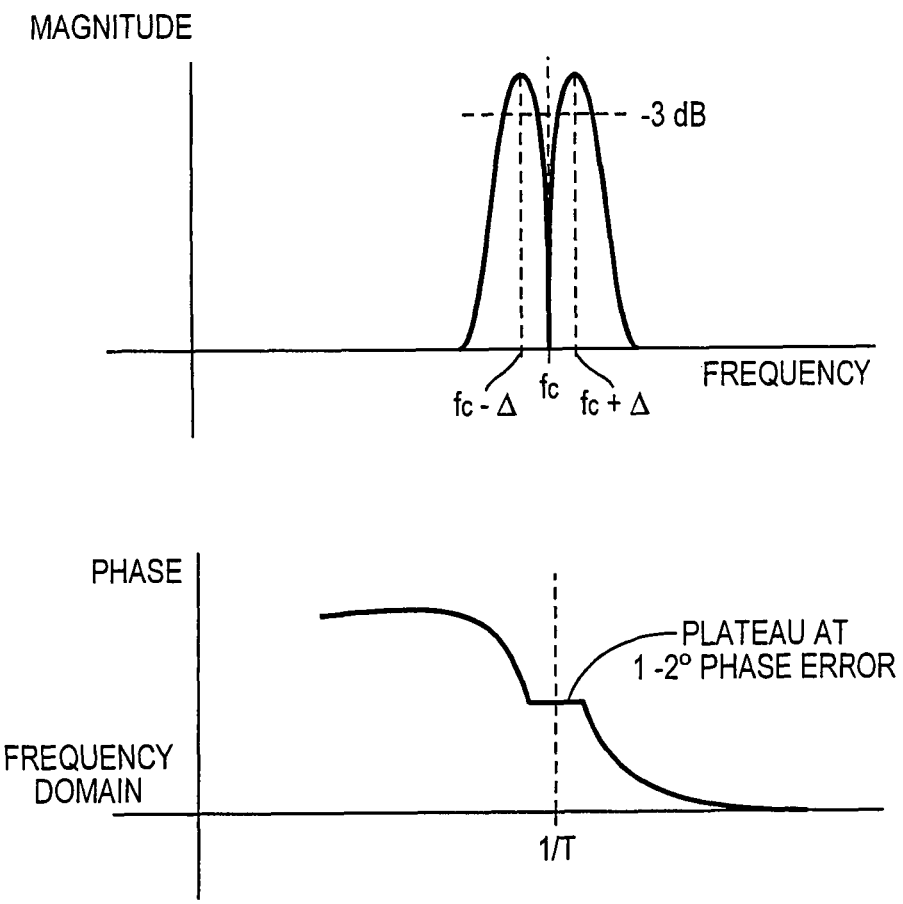
FIG. 23 illustrates magnitude and phase response of two notch filters combined in parallel with each tuned adjacent to a respective side of a center frequency to reduce the sensitivity of the notch filter.

Unfortunately, due to the high Q value, the output of the notch filter may be substantially affected by only small frequency errors (relative to the filter's center frequency) in the incoming signal. The phase response of such a high Q synchronously tuned band pass filter has a very steep slope at the center frequency. Tens of degrees of phase error can be created by a few ppm errors in frequency. This can cause significant problems with coherent demodulation. A novel approach to eliminating this problem is to place two notch filters in series with the center frequency of each filter offset by a respective frequency difference ($\Delta$) above and below the targeted center frequency. The slope of the phase response at the center frequency of such a filter can be considerably reduced relative to the synchronously tuned filter by the right choice of $\Delta$. For example, to filter a center frequency of 1 GHz, the $\Delta$ value may be set at about 50 KHz such that the first and second notch filters have center frequencies of 1.005 GHz and 0.995 GHz respectively, e.g., 100 KHz bandwidth, as shown in FIG. 23. The combination of notch filters effectively lowers the overall phase error across the 50 ppm band to allow for 1-2° phase error.

Figure 24:
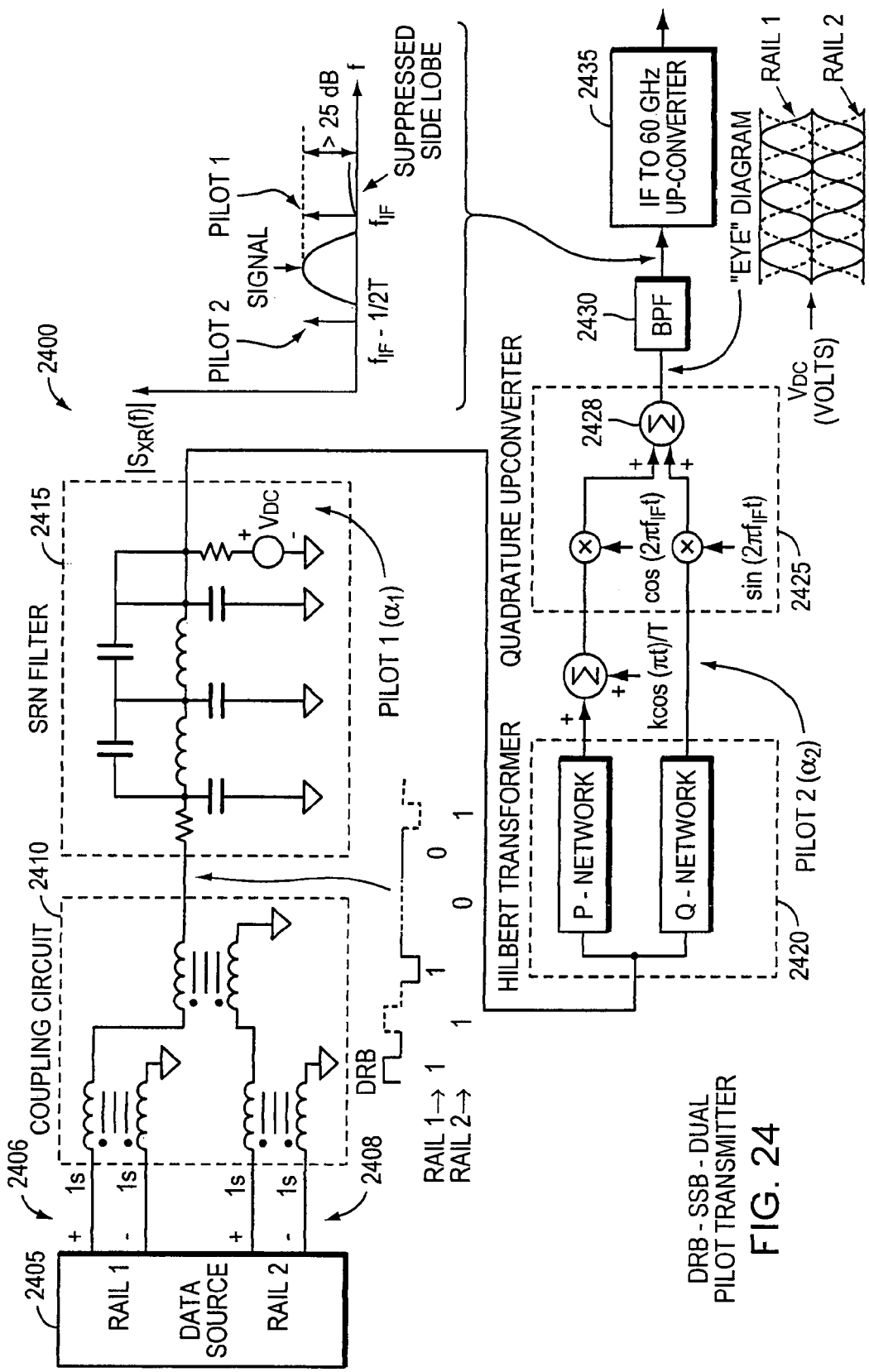
FIG. 24 is a block diagram of an embodiment of a high data rate transmitter using Dual-Rail Bipolar, Single Side Band and dual pilots.

FIG. 24 provides a functional block diagram of one embodiment of a wireless modem transmitter 2400 operating within the 57-64 GHz range that may be implemented within an STA 215 or WAP 210 of the wireless network embodiment described above. While the exemplar transmitter uses SSB, VSB may also be employed by replacing the SSB Hilbert Transformer with a VSB filter. The operation of the IF back end and 60 GHz front end of the transmitter and receiver are described as follows.

A data source 2405 provides data on two rails 2406, 2408 each of which have been separately Bipolar encoded, i.e., alternate 1s have alternating polarity. The positive 1s are put out on one sub-rail while the negative 1s are put out on another sub-rail. The four sub-rails couple the data source 2405 to a coupling circuit 2410 that merges them together to add the two positive 1 sub-rails together and subtract the negative sub-rails resulting in the DRB NRZ pulsed signal ("eye" diagram) as shown. This signal is then filtered by a SRN Filter 2415 and then fed to a Hilbert Transformer 2420 employing two Bedrosian networks: a P-network 2422 and an Q-network 2424 to achieve a relative 90-degree phase between the Q-rail and the P-rail. Pilot two $\alpha_2$ at ½ T Hz is then added to the P-rail output.

The augmented P rail output and the Q rail output are then input into a quadrature up-converter 2425, yielding at its output an SSB signal at the IF frequency. The final SSB signal is then loosely filtered in a bandpass filter 2430 to eliminate the unwanted image of the Pilot 2 frequency ($f_{IF}$+½ T in this example). At the SRN filter 2415, DC is added resulting in the formation of Pilot 1 at the IF frequency after the up-conversion.

While FIG. 24 shows the case where the quadrature up-converter 2425 subtracts the sine rail from the cosine rail to preserve the lower sidelobe, one skilled in the art would recognize that by reversing the operation the upper side lobe could have been preserved instead. In this case the band pass filter 2430 would have suppressed the Pilot 2 image at frequency $f_{IF}$−½ T instead. Finally, the IF is SSB filtered and SSB up-converted to 60 GHz using an up converter 2435 with Band pass filtering which is non-intrusive to the signal band with respect to group delay (big frequency gaps are present to simplify this filtering).

Figure 25:
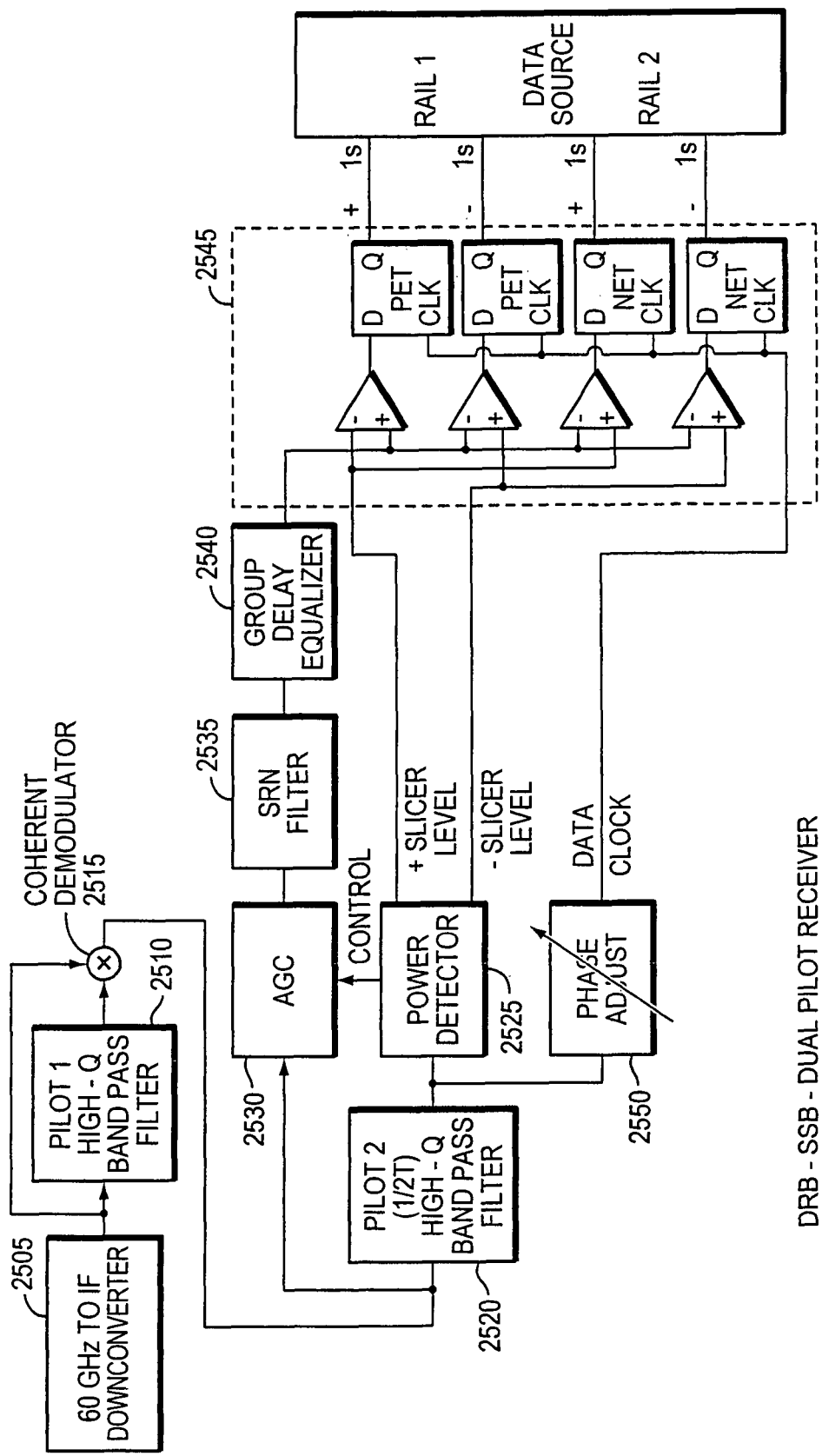
FIG. 25 is a block diagram of an embodiment of a high data rate receiver configured to receive a Dual-Rail Bipolar, Single Side Band having dual pilots.

FIG. 25 demonstrates a possible receiver 2500 for the modem. The operation has been well enough outlined above so that the function of each block should be immediately clear. A millimeter wave signal (e.g. at 50 GHz) is received and down converted to an IF at a down converter 2505. The IF signal is routed to a high-Q filter 2510 and to one input of a multiplier 2515. The output of the filter provides the first pilot signal and is routed to the second input of the multiplier 2515, forming a coherent demodulator. The demodulated signal is routed through a second filter 2520 to filter out the second pilot signal and to an AGG unit 2530. The output of the second filter 2520 is routed to a power detector 2525 and to a phase adjust circuit 2550. One output of the power detector 2525 controls the AGC unit 2530. Two other outputs are routed to a slicer 2545. The output of the phase adjust 2550 clocks data into latches provided within the slicer 2545. Dual-rail bipolar data is available at the output of the slicer 2545. The final output of the slicer 2545 regenerates the four wire digital interface at the data source at the data sink and the modem operation is complete. Using standard communication theory, it can be shown at this modem will operate at approximately $10^{-6}$ error rate at about 13 dB SNR.

FIGS. 26A through 26D illustrate an exemplary realization of the SRN filter 2415, the Hilbert Transformer 2420. The SRN filter 2415 consists of the circuit shown in FIG. 26A coupled to the circuit shown in FIG. 26B. This second circuit is used to correct the sin(x)/x dispersion present in the NRZ pulses put out by the coupling circuit 2410. The SRN filter includes a network of five capacitors C1-C5 and two inductors L1, L2. The circuit 2600 includes an inverting amplifier receiving an input with the amplifier output coupled through a variable potentiometer, a variable inductor L1 and a variable capacitor C1.

Figure 26A:
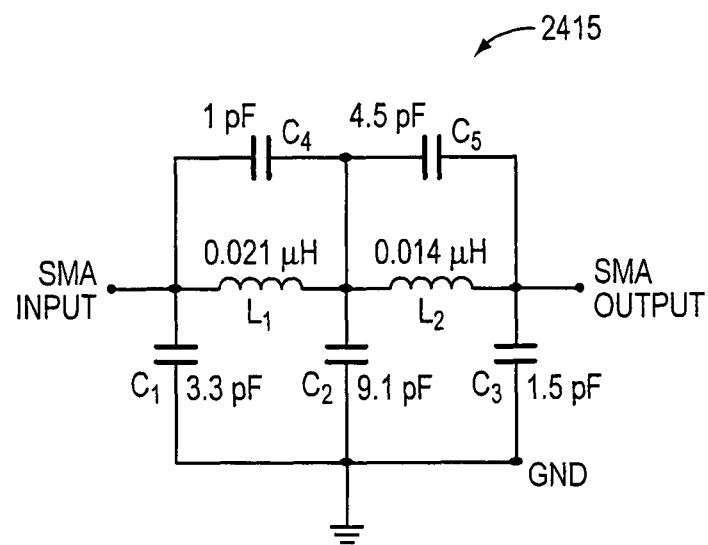
FIG. 26A is an exemplary circuit implementing the SRN filter of the transmitter of FIG. 24.
Figure 26B:
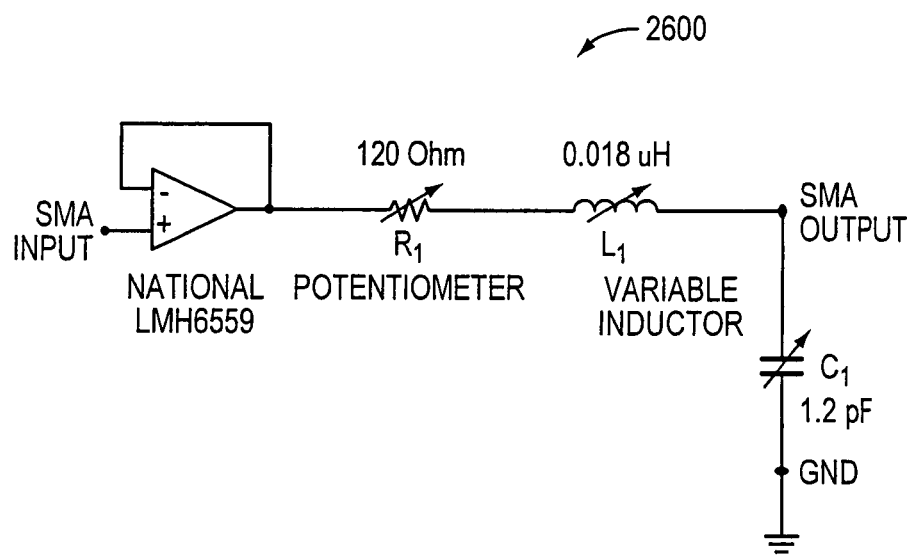
FIG. 26B is an exemplary additional circuit that couples to the circuit of FIG. 26A.
Figure 26C:
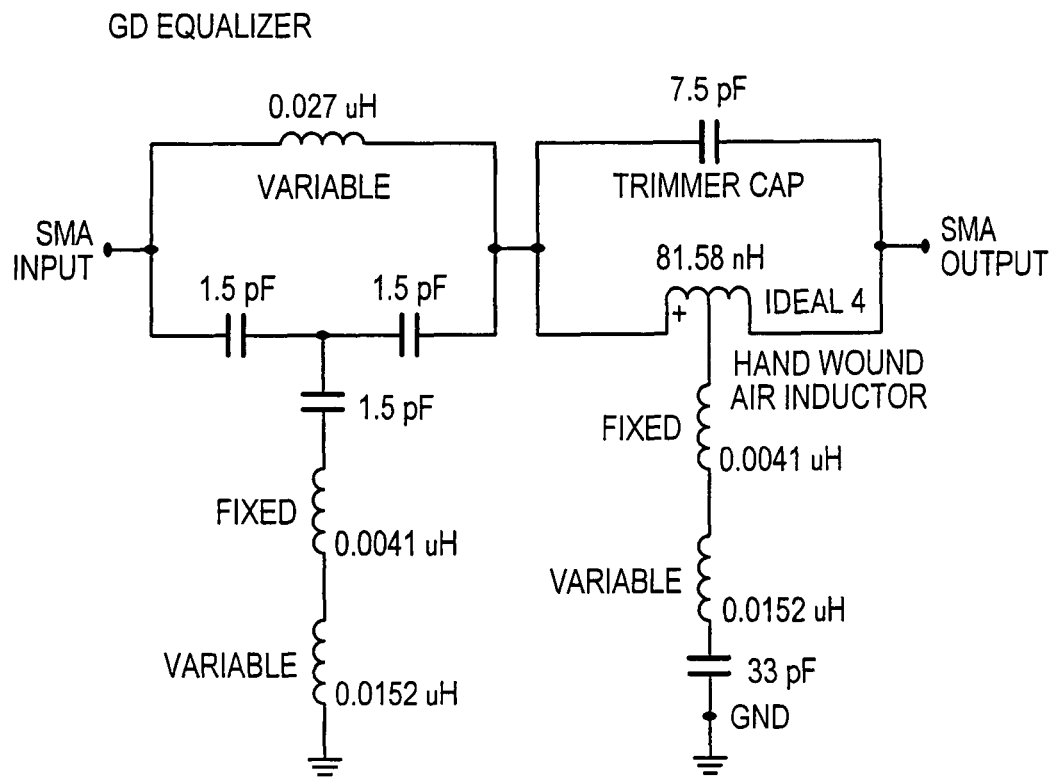
FIG. 26C is an exemplary group delay equalizer that can be used in the receiver of FIG. 25.
Figure 26D:
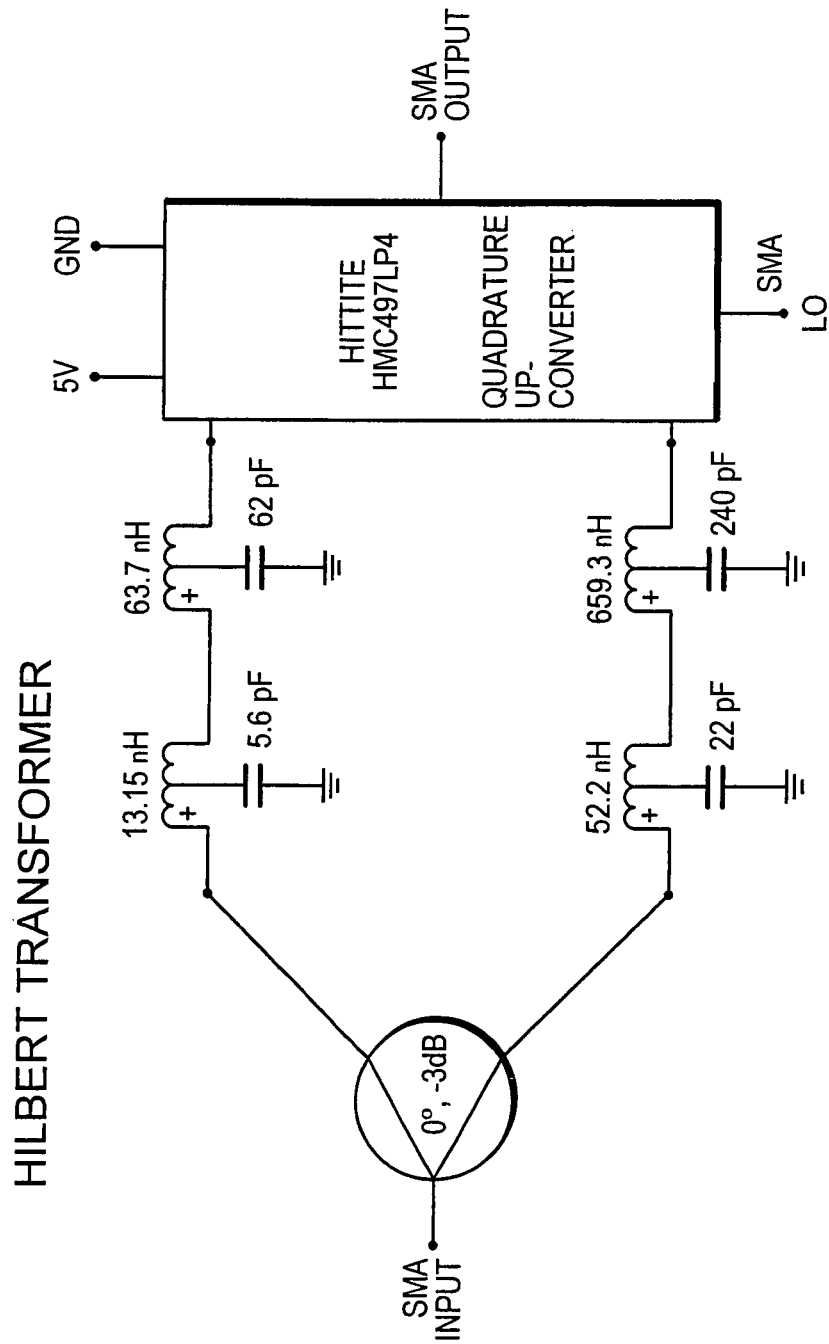
FIG. 26D is an exemplary Hilbert Transformer of the transmitter of FIG. 24.

The GD equalizer of FIG. 26C includes two circuit branches. A first branch receives an input in a mesh circuit including an inductor L1 and two capacitors C1, C2. The first mesh circuit is coupled between the two capacitors to ground through a third capacitor C3, and two inductors L2, L3. A second branch is coupled to the first at one end of the mesh circuit and a second mesh circuit including a transformer M1' and a capacitors C1'. The second mesh circuit is coupled between the transformer to ground through a second capacitor C2', and two inductors L3', L4'.

The Hilbert transformer includes a quadrature up-converter receiving balanced inputs, each input including a network of series transformers each shunted to ground through a respective capacitor.

Figure 27:
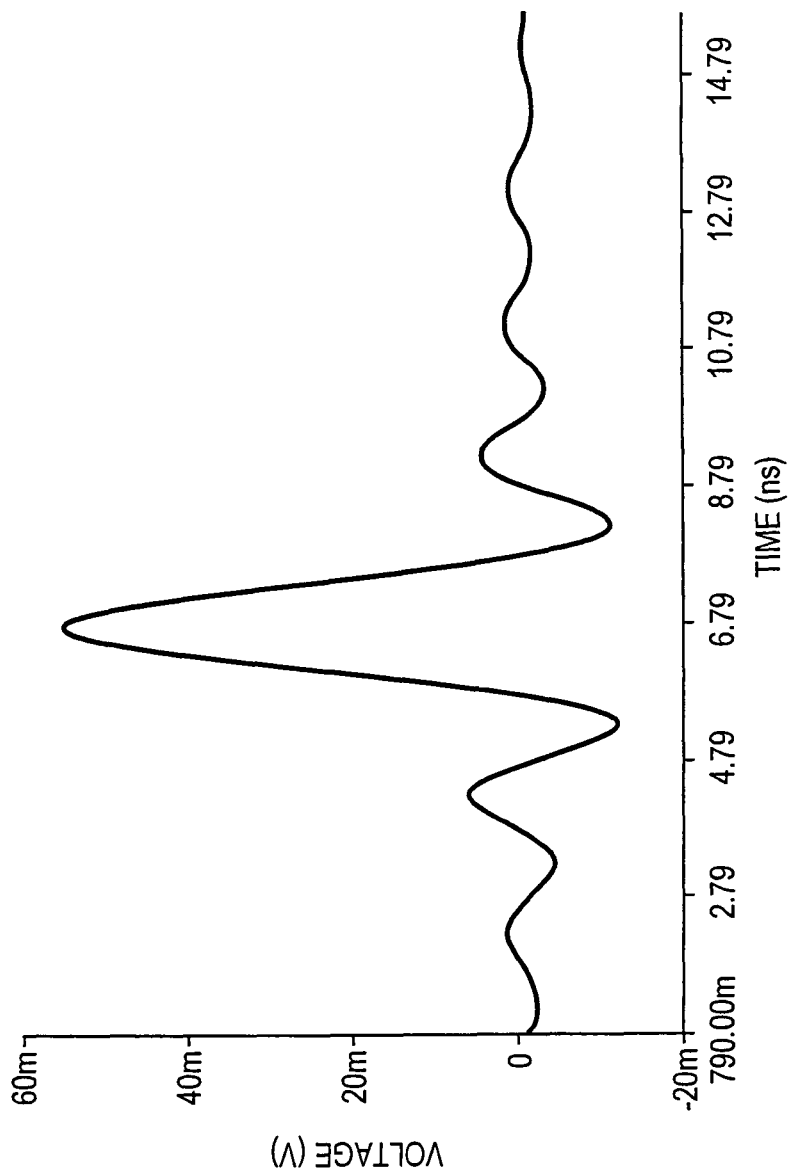
FIG. 27 is an exemplary response of the receiver of FIG. 25 to a logical 1 transmitter from the transmitter of FIG. 24.

FIG. 27 shows an exemplary slicer output in response to a single 1 put into the transmitter. From the 1 ns periodic zero crossings around the peak value it should be clear that the resulting "eye" diagram will exhibit a very open eye and the modem will perform close to theory.

It should be obvious to one of ordinary skill in the art how to construct, implement, integrate, and manufacture the various components of the wireless modem embodiments such as the filters, multipliers, adders, amplifiers, pulse shapers, and other components. Also, the features of the embodiments of the modem apparatus described herein may apply to any bandwidth limited channel operating at a high frequency with a high data rate.

Antenna Design and Configuration

The wireless system employs two distinct antenna types. At the Wireless Access Point (WAP) 210, a cosecant squared ($csc^2$) antenna is used. This provides 90° azimuth coverage and cosecant-squared elevation coverage. This ensures that the signal level anywhere within the 90° sector remains virtually constant. At the station (STA) 215, an 8-sectored antenna is used. This provides 360° azimuth coverage, 45° elevation coverage per antenna element. In order to minimize the reflections from objects within the operating space, circular polarization is used.

(A) WAP Antenna

The challenges for WAP antenna are:

(i) Operating bandwidth in excess of 10%

(ii) The cosecant-squared beam shaping (iii) A ripple free, 90° azimuth pattern (iv) Broadband polarization operation with >15 dB cross polarization isolation (v) Low loss The approach to realizing the WAP antenna utilizes a pillbox style antenna with a polarizer placed at the aperture. A pillbox antenna is an H-plane offset-feed architecture, which avoids aperture blockage and, thus, allows good shaping ($csc^2$) of the elevation far-field pattern. It provides wide bandwidth, side lobe level control in elevation and avoids the aperture phase error that arises in conventional sector horns as the aperture length increases.

The azimuth pattern is controlled by placing choke slots along the aperture and the polarization of the antenna is changed from linear to circular by using a dielectric structure placed in front of the aperture. The circular polarization (CP) can be right hand (RHCP) or left hand (LHCP) depending on the orientation of the dielectric structure.

Elevation Reflector

Figure 28B:
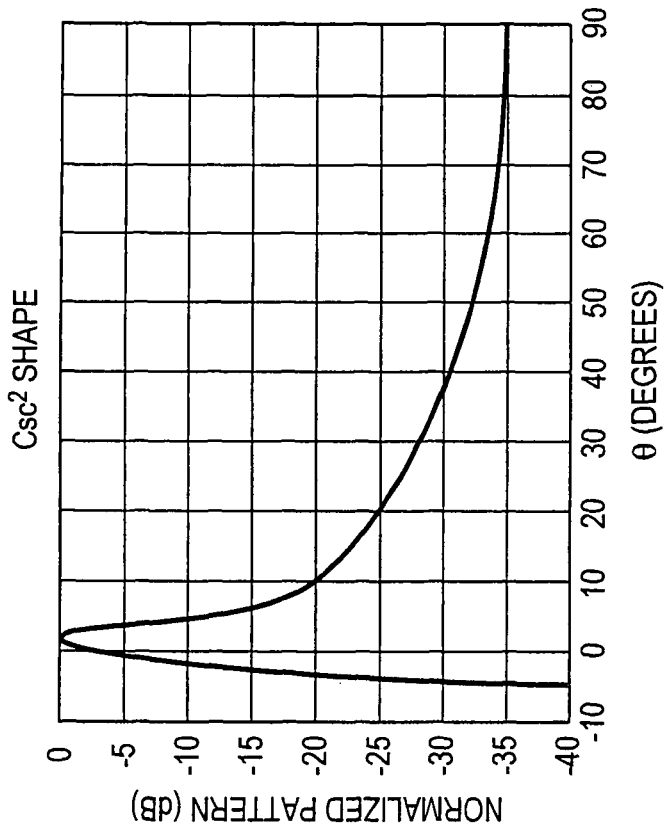
FIGS. 28A and B illustrate an exemplary WAP antenna configuration and elevation patter gain, respectively.
Figure 28A:
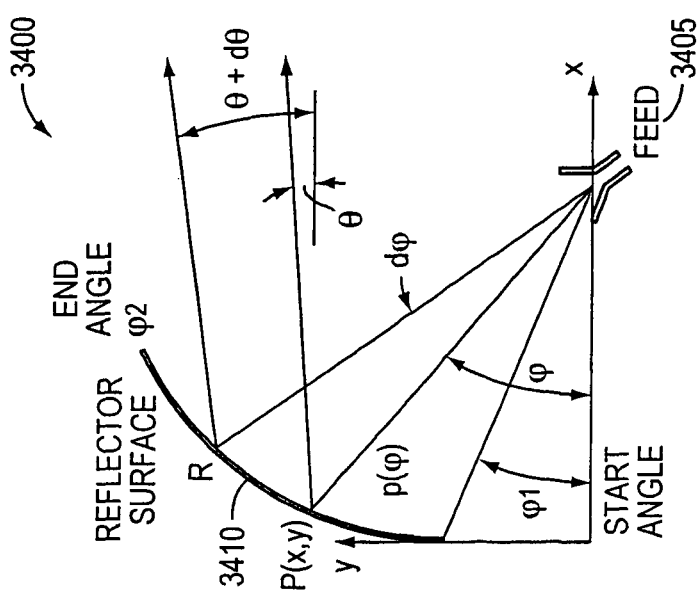

An exemplary WAP antenna 3400 includes a cosecant-squared reflector 3410 fed from an offset feed 3405. An exemplary reflector surface 3410 is shown in FIG. 28A. A normalized patter of the elevation gain is shown in FIG. 28B for the exemplary antenna. The efficiency of the $csc^2$ pattern is about 50% (M. Skolnick, *Introduction to Radar Systems*, McGraw Hill, New York, 1980, p. 259) and it is given by $\text{eff}=2-(\theta_1/\tan\theta_2)$, $\theta_1$ and $\theta_2$ are the reflector angle where the $csc^2$ shape starts and stops respectively. Normally $\theta_1$ and $\theta_2$ are between [2, 5] and [20, 30] degrees respectively. Note that the efficiency decreases as $\theta_2$ gets larger.

The shaped reflector profile is synthesized by using the next two transcendental equations (R. S. Elliot, Antenna Theory and Design, Prentice Hall, Englewood Cliffs, 1981, pp. 298-504). Setting up a table of $\theta$ values, equation (5) gives $\phi$ in the range $[\phi_1, \phi_2]$. Now, using equation (6) a table of $\rho(\phi)$ values is obtained which is the reflector profile. $\rho(\phi)$ is then converted to Cartesian coordinates and used to model the antenna.

$$\frac{\int_{\Phi_1}^{\phi} I(\alpha)d\alpha}{\int_{\Phi_1}^{\Phi_2} I(\alpha)d\alpha} = \frac{\int_{\theta_1}^{\theta} P(\beta)d\beta}{\int_{\theta_1}^{\theta_2} P(\beta)d\beta} \quad (5)$$

$$\frac{\rho(\phi)}{F} = \frac{e^{\int_{\Phi_1}^{\phi} \tan\frac{\theta(\phi)+\alpha}{2}d\alpha}}{\cos\Phi_1} \quad (6)$$

The far-field pattern is determined applying the aperture field method (Elliot, ibid, pp. 508-518) at a reference plane in front of the aperture. The total radiated field, this is given by equation (7), which takes into account the feed back radiation $$E_{total}(\theta) = \quad (7)$$
$$\sqrt{\text{eff}:D_{refl}}\,E_\phi(\theta) + \sqrt{D_{feed}}\,\{\mathfrak{R}[E_{feed}(\theta-\pi)] + j\mathfrak{I}[E_{feed}(\theta-\pi)]\}$$

$D_{feed}$ and $D_{refl}$ are the peak gains of the reflector and feed. See Holzman (Eric L. Holzman, *Pillbox Antenna Design for Millimeter-Wave Base-Station Applications*, IEEE AP Magazine, Vol. 25, No. 1, February 2003, pp. 27-37) for the rest of the definitions. For the reflector case, the directivity is given by:

$$D_{refl}=4\pi[y(\phi_1)-y(\phi_2)](0.866\lambda_0/\theta_{3,dB})/\lambda_0^2 \quad (8)$$

The reflector profile, equations (5) and (6), and the far field pattern equation (7) are determined with a Mathcad routine and the reflector along with the aperture is modeled with a full 3D EM software, CST Microwave Studio.

Azimuth Aperture Design

To reduce the strong edge diffraction along the radiating aperture and to get and acceptable input match, the aperture is flared and ground planes are placed on either side of the aperture. The azimuth pattern beamwidth can be modified by properly placing choke slots, $\sim\lambda_0/4$ deep, parallel to the main aperture. The combination of the diffracted fields at the edges and the main aperture field creates a pattern that is broader than the main aperture and at the same time shape the skirt of the pattern.

Linear-to-Circular Polarizer Design

A linear-to-circular polarization converter can be achieved by different structures; the most common ones are discussed in Johnson (Richard C. Johnson, *Antenna Engineering Handbook*, Third Edition, McGraw Hill, New York, 1993, pp. 23-25 to 23-28). Realizing these structures at millimeter wave frequencies become challenging, besides the dimensions getting too small, they require very tight tolerances or anisotropic materials which increases the mechanical complexity and the manufacturing cost.

Figure 29C:
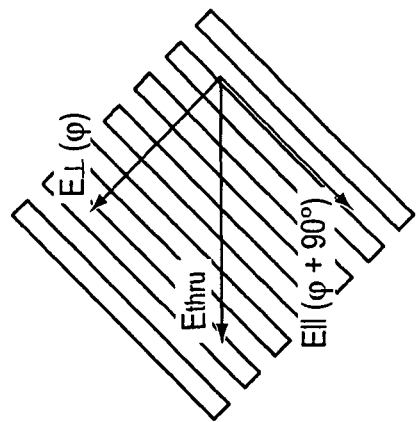
FIG. 29A illustrates an exemplary linear-to-circular polarizer.
FIGS. 29B and C illustrate response of the polarizer of FIG. 29A to an incident E-field.
Figure 29B:
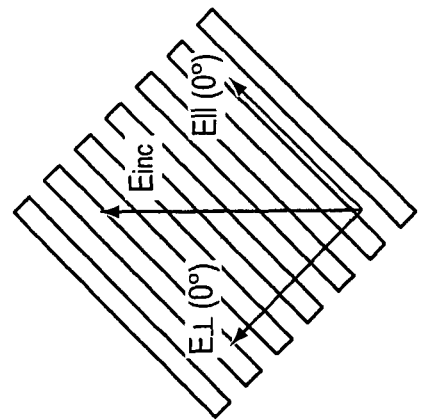
Figure 29A:
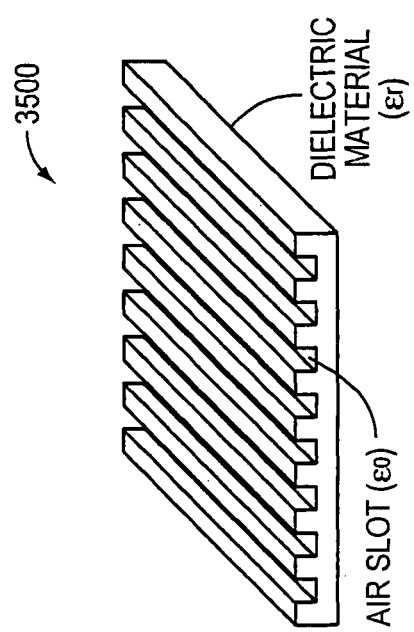

When a linearly-polarized field propagates through the planar structure 3500 in FIG. 29A at a 45° angle relative to the slots, the linear field is decomposed into two orthogonal components, parallel ($E_\parallel$) and perpendicular ($E^\perp$) as shown in FIG. 29B.

Figure 35A:
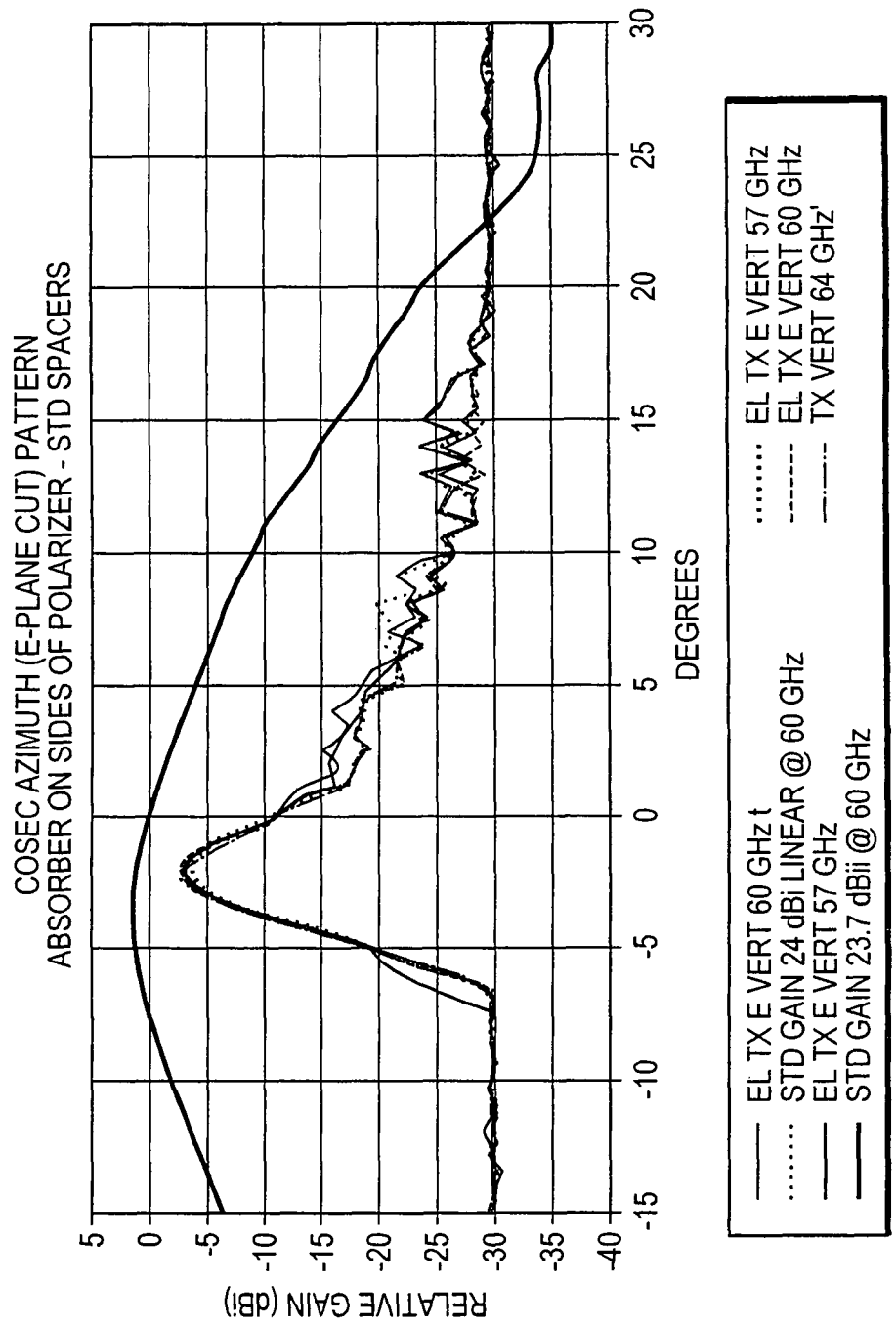
FIGS. 35A and 35B are elevation patterns for different embodiments of a WAP antenna-polarizer combination.

By properly selecting the dimensions of the slots, as shown in FIG. 3A, the $E^{195}$ component is delayed $\phi^\perp$ degrees and the $E_\parallel$ component is advanced $\phi_\parallel$ degrees. In order to get a circularly polarized field the total field difference between the two components must be 90 degrees as shown in FIG. 29C. Using a low dielectric constant material, such as a cross-linked polystyrene microwave plastic (i.e., REXOLITE®, having a relative dielectric constant of about $\epsilon_r$=2.548 available from C-Lec Plastics, Inc. of Philadelphia, Pa.), and the structure in FIG. 35A, it is not possible to achieve a 90° phase difference, to do so, it will require a high dielectric constant material (er~9), which will make the all dimensions smaller, complicating the fabrication of such a device at higher frequencies, such as millimeter-wave applications.

Figure 30B:
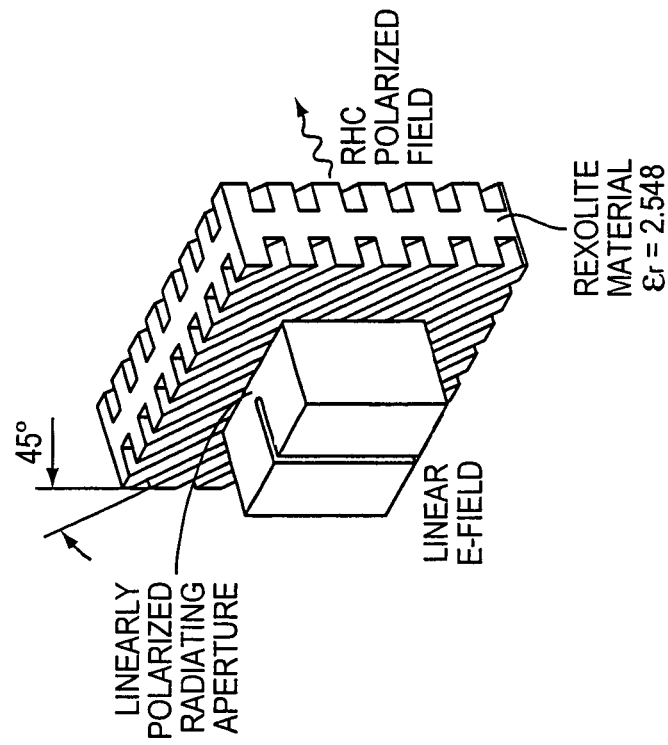
FIGS. 30A and B illustrate an exemplary high-frequency linear-to-circular polarizer.
Figure 30A:
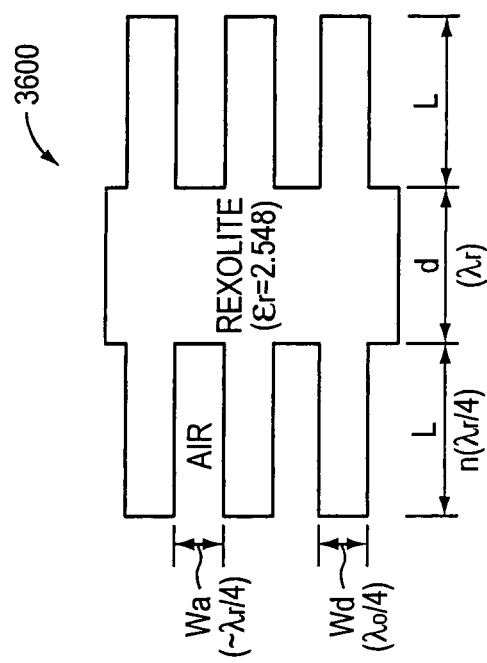

To keep all the dimensions relatively large, so that the manufacturability becomes easier, REXOLITE® dielectric material is used. In order or achieve the 90° phase difference, slots are placed on both sides of a solid piece of dielectric material 3600 whose thickness is $\lambda_r$, as shown in FIG. 30A. The polarizer is designed assuming a far field plane wave but to keep assembly and manufacturing simplicity it is placed $\sim\lambda o$ away from the aperture, which is within the near field range. In simulations and measurements an AR ripple is noticed, this may be due to unaccounted phase error correction due to the proximity of the polarizer to the aperture.

Simulation Results

An exemplary antenna 2400 was designed with the aid of a simulation program, such as CST Microwave available from Computer Simulation Technology of Wellesley Hills, Mass. The reflector 3410 and feed 3405 were first designed as a linearly polarized antenna. The pattern was optimized for beam shape and pattern, particularly in the vertical plane. The polarizer 3600 was designed as a separate element. Due to the size and complexity of the combined linear antenna 2400 and polarizer 2600 only simulations on a short section of the aperture and polarizer was simulated. Simulation results of the linear far-field patterns are provided in FIGS. 31A-C at frequencies 57, 61 and 64 GHz respectively.

TABLE 1

| Frequency GHz | Peak Gain (dB) | EL HPBW (deg) | AZ HPBW (deg) |
|---|---|---|---|
| 57 | 22.5 | 2.1 | 79 |
| 61 | 22.7 | 2.1 | 75 |
| 64 | 22.9 | 2.1 | 73 |

Figure 31D:
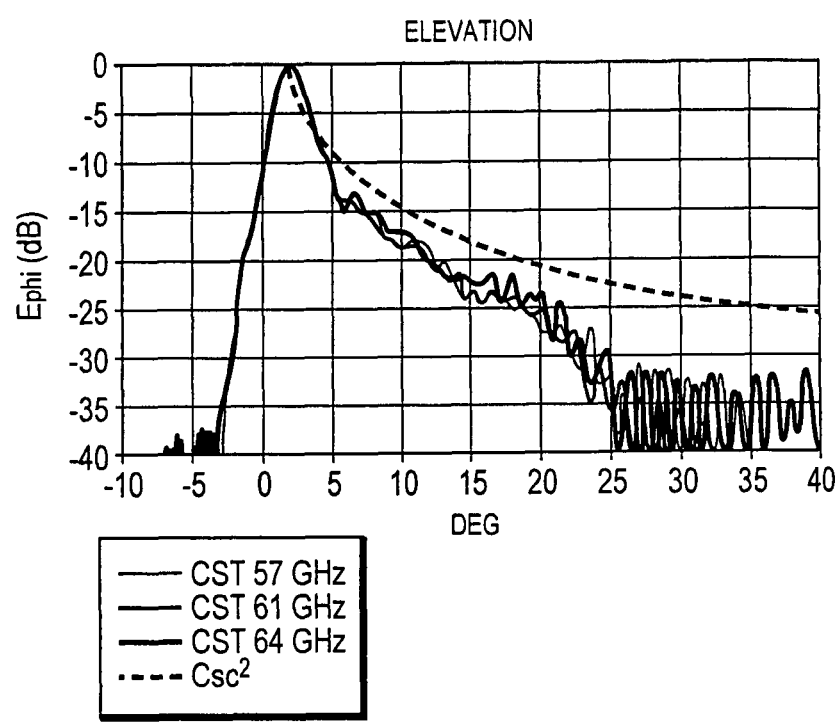

A summary of the simulated patterns is provided in Table 1. Elevation performance simulation results are illustrated in FIG. 31D for the same frequencies.

Figure 32A:
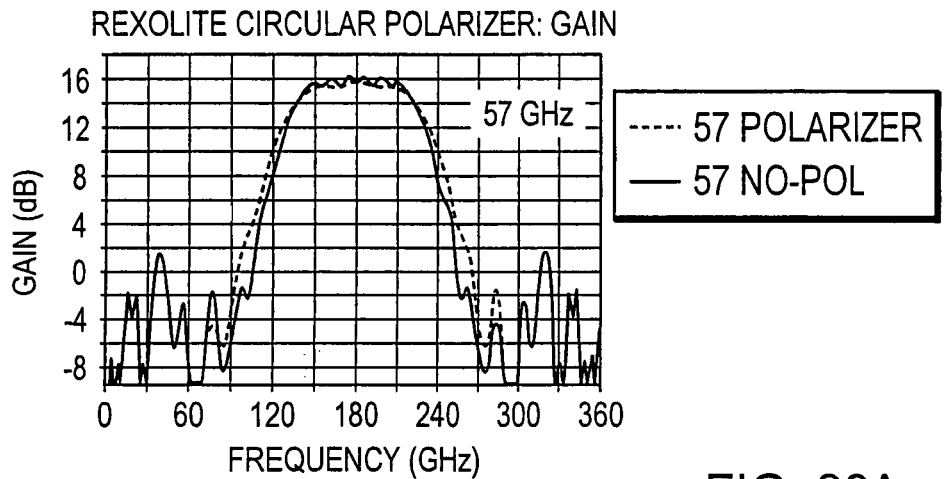
FIGS. 32A-32C illustrate simulated far-field gain patterns for an exemplary WAP antenna combined with the linear-to-circular polarizer of FIG. 30B.
Figure 32B:
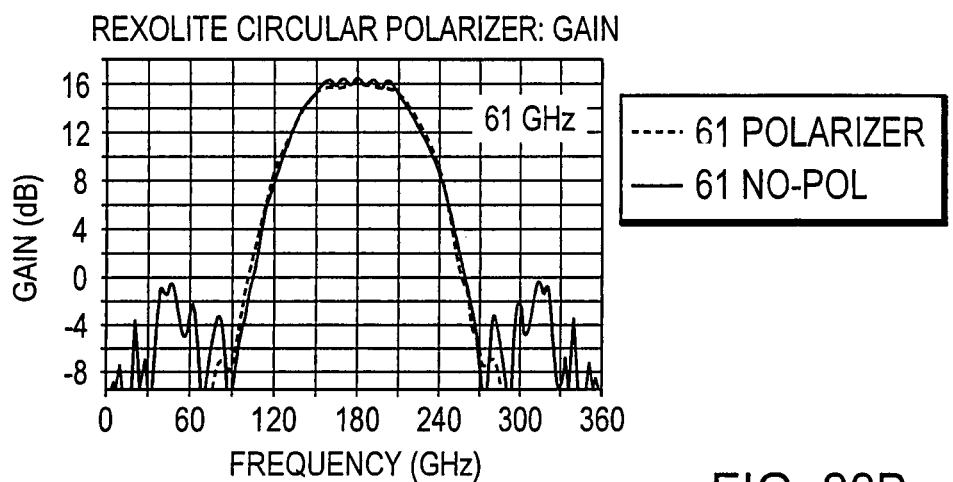
Figure 32C:
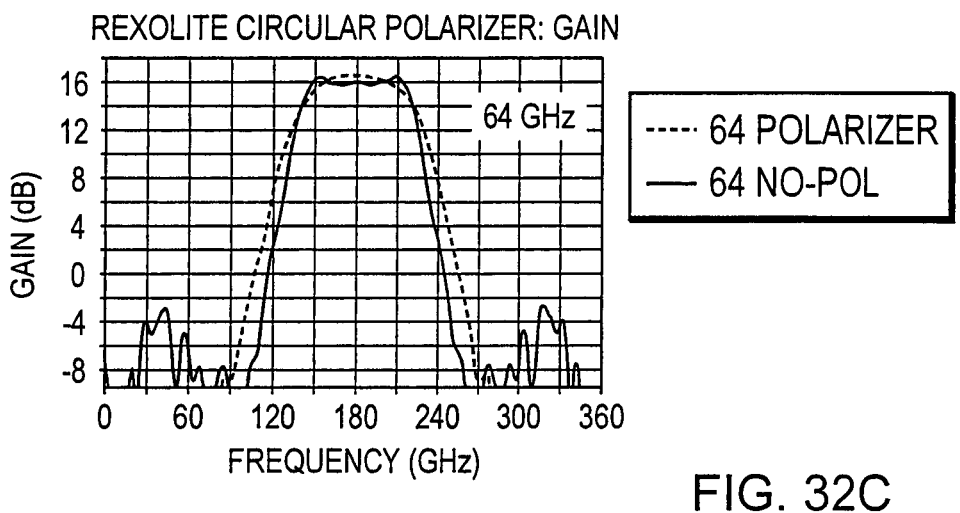

The simulation results of the polarizer for a partial aperture are shown in FIGS. 32A-32C for 57, 61 and 64 GHz.

Figure 33A:
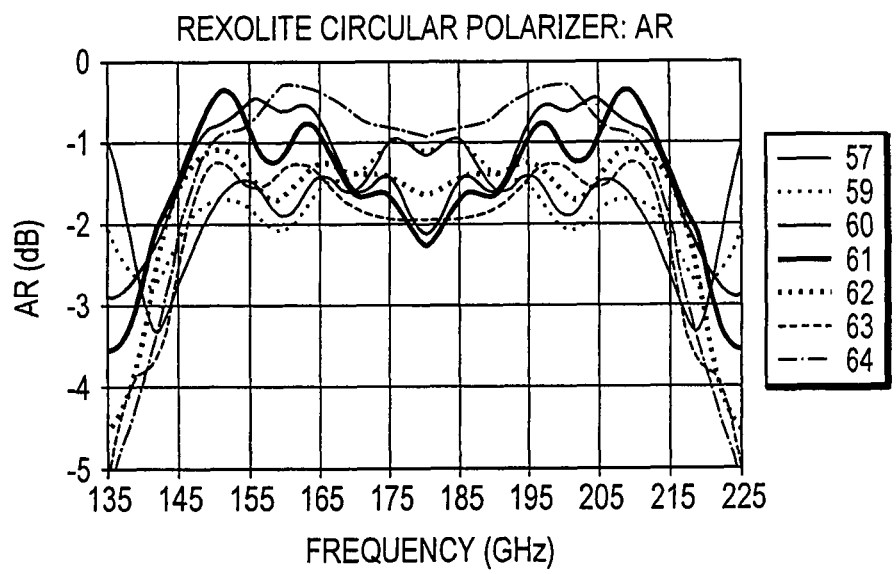
FIGS. 33A and B illustrate aspect ratios at different frequencies for the exemplary WAP antenna-polarizer combination of FIGS. 32A-32C.
Figure 33B:
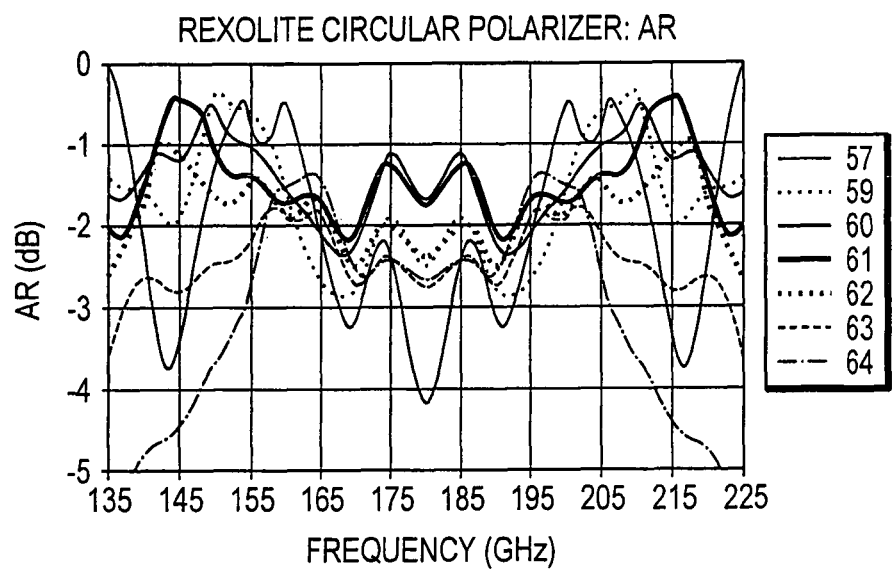
Figure 34:
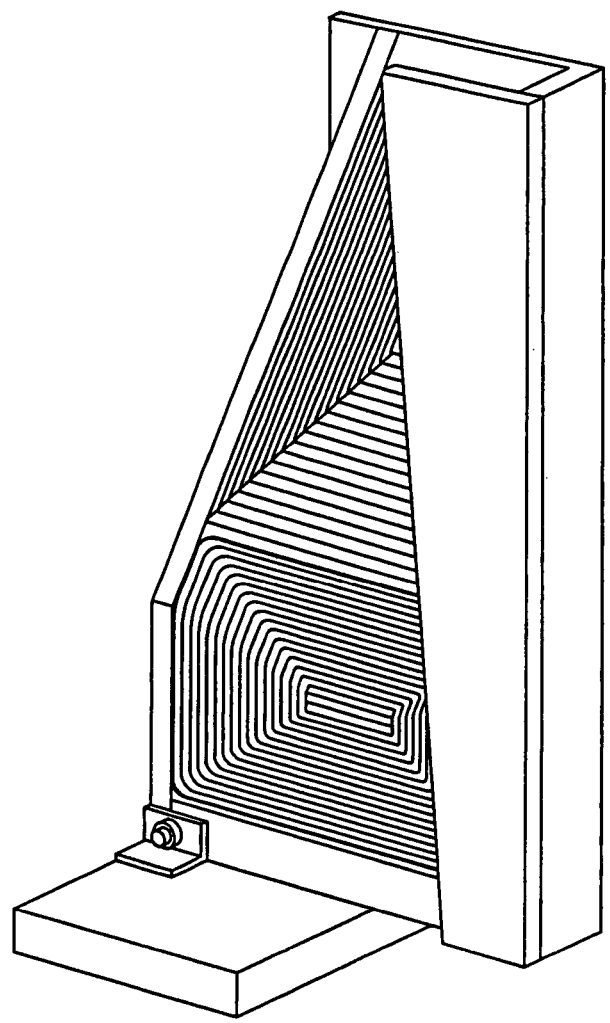
FIG. 34 is a perspective illustration of an embodiment of an exemplary WAP antenna-polarizer combination.
Figure 35B:
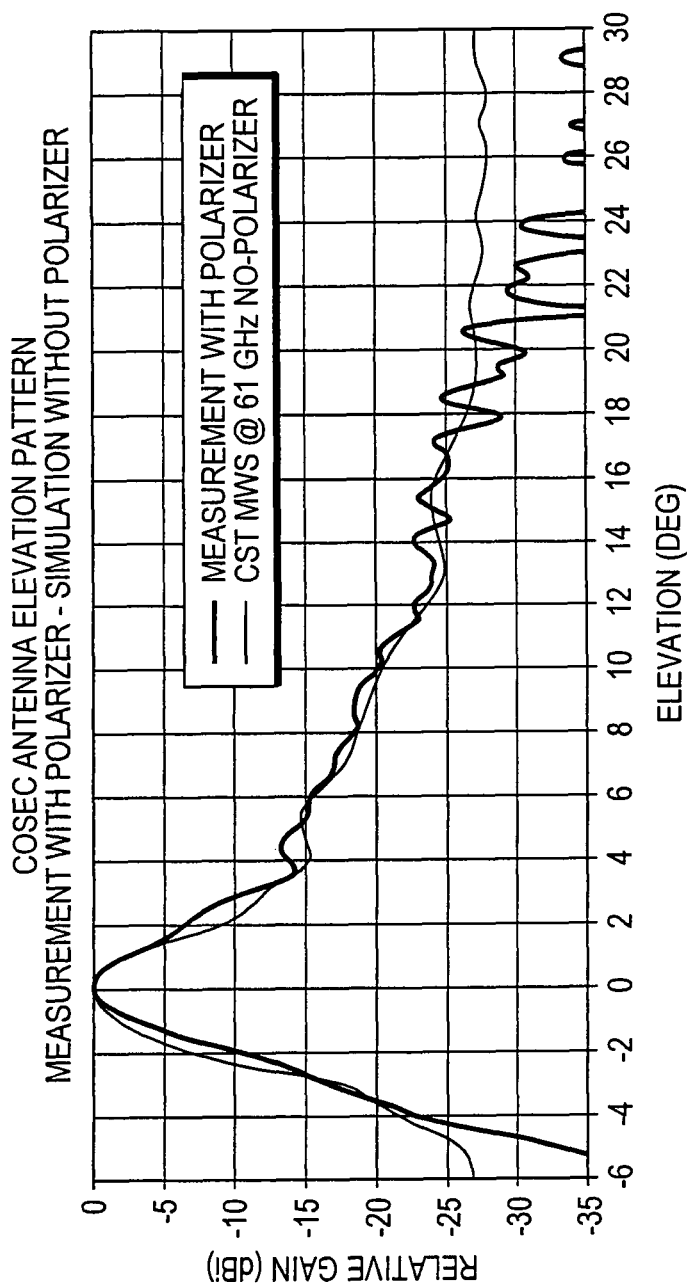

The challenge with a circularly polarized cosec squared antenna is further complicated when the azimuthal beamwidth is in excess of 45 degrees. In the case of the WAP antenna 3400 the 90 degree beamwidth and the operating bandwidth required some compromise. The result however over the bandwidth is good. Two cases are shown in FIGS. 33A and 33 B, one with choking grooves FIG. 33B, which provide improved beamwidth performance and another without choking grooves FIG. 33A, which limit the beamwidth in azimuth. As the groove can later be removed the configuration with grooves was chosen for the first set of measurements Measured Results Construction A test antenna and polarizer was built as shown in FIG. 34. The reflector structure was made as two split blocks containing the feed horn, feed waveguide and reflector surface. This is extremely integrated and lends itself to high-volume, low-cost manufacture using metallized injection molded parts. The polarizer was made from a single piece of machined plastic—again readily capable of being injection molded. Antenna performance was measured using a 57 to 64 GHz, 1 kHz modulated source. Measurement results of the Azimuth and elevation performance are provided in FIGS. 35A and 35B respectively.

Using the outlined procedure, a 60 GHz pillbox antenna and a linear-to-circular polarization converter were designed. The antenna has a csc$^2$ shape in elevation and an azimuth beamwidth of 90° with a peak linear gain of 23 dBi. The polarizer has about 10% BW for an AR≦3 dB over an angular range of ±45', the best AR is presented at the center of the band and slowly degrading at the edges of the band. Easy manufacturability is another main characteristic of the polarizer, which is very attractive at millimeter-wave frequencies. Predicted and measured data has excellent agreement.

Cross Shaped Horn

Figure 36B:
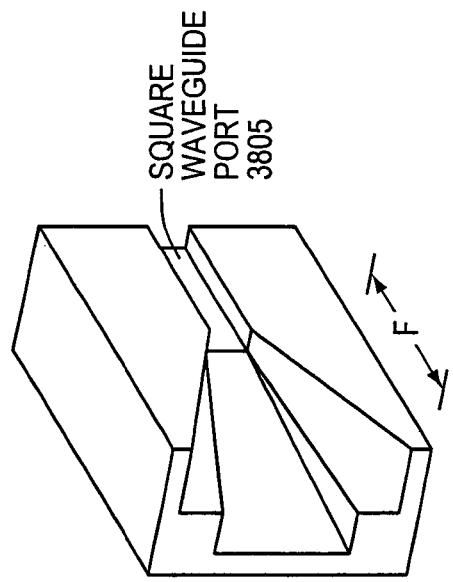
FIG. 36B is a cross section of the waveguide horn antenna of FIG. 36A.
Figure 36A:
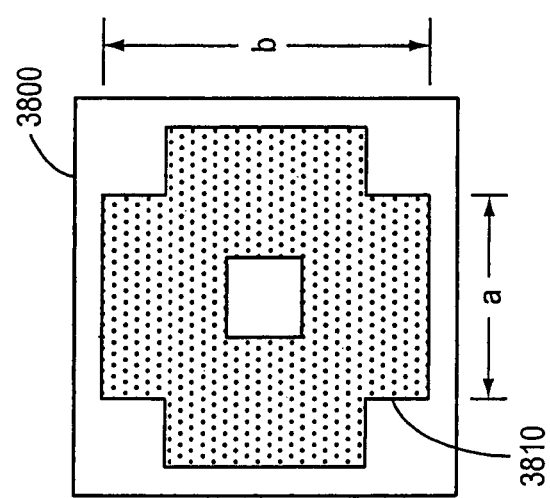
FIG. 36A is an end view of a cross-shaped, square waveguide horn antenna.
Figure 38:
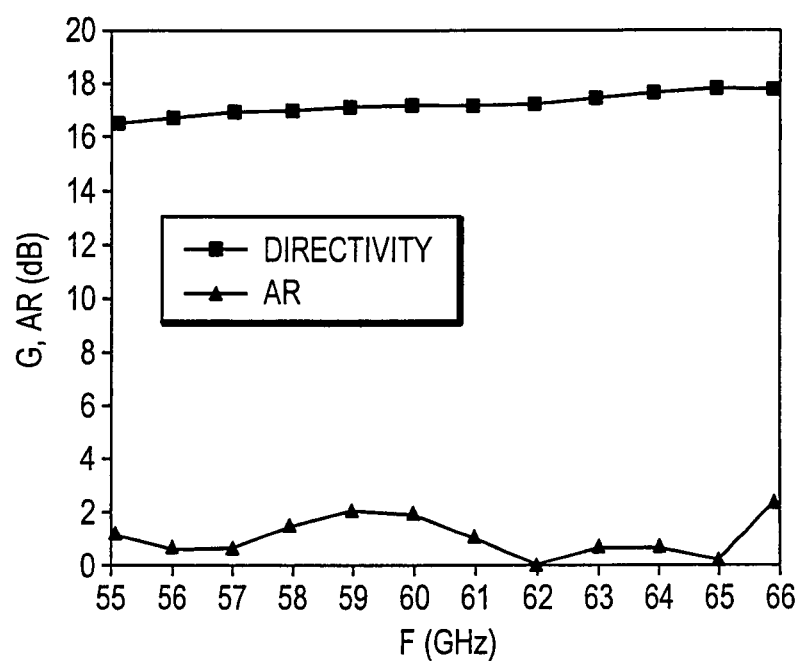
FIG. 38 shows the antenna gain and aspect ratio of a right-hand-circularly polarized cross-shaped, square horn antenna.

A cross-shaped horn 3800 is illustrated in FIGS. 36A and 36B. The horn 3800 has a square waveguide input 3805 and a "cross" aperture shape 3810 as shown in FIG. 1. The aperture field distribution is approximately equal to the dominant TE mode of a cylindrical waveguide (N. Toyama, *A cross-shaped horn and a square waveguide polarizer for a circularly polarized shaped beam antenna for a broadcasting satellite*, IEEE MTT-S International Microwave Symposium, Volume 80, Issue 1, Mary 1980, pp. 299-301).

In order for the antenna to generate a low aspect ratio (AR), without using any phase error correction mechanism, the aperture 3810 should be symmetric on both E-plane and H-plane. To obtain a minimum AR level, a ratio (N. Toyama, *Symmetrical crossed horn for a circularly polarized multibeam reflector antenna*, IEEE AP Transactions, Vol. AP 31, No. 1, January 1983) of the aperture dimensions 'a' and 'b' can be optimized. An optimized ratio was found to be:

$$b/a = 0.18 \tag{9}$$

Selecting a=b, the aperture becomes square and the E-plane beam width is smaller than the H-plane beam width. On the other hand, by selecting a<<b the opposite occurs and symmetry is not achieved. The flare length F must larger than b.

If a standard rectangular waveguide aperture is used as the main radiating aperture, not only would it be bigger than the cross-shaped horn, but a phase correction would be required. The phase correction would be done by using a dielectric lens or some sort of fins configuration. By taking this approach, not only would the whole antenna get bigger but also the assembly would be more involve.

Septum Polarizer

A septum polarizer 3900 is a four-port device, as shown in FIG. 37A. The device 3900 includes a rectangular housing 3902 with a linear septum 3904 at one end and extending partially into the housing. Two rectangular waveguide ports 3905, 3910 (referred to a ports 'L' and 'R') are defined at one end being separated by a septum 3904. A square aperture 3915 is defined at the other end of the device, which supports two orthogonal modes (H. Schrank, *The septum polarizer*, IEEE APS Newsletter, October 1983, pp. 23-24), each mode constitutes one port. Any linearly polarized signal fed into any of the two rectangular ports is equally split into two orthogonal components and the septum length introduces a 90° phase delay on one of these components, creating in this way a circularly-polarized (CP) field in the square waveguide section. The CP field can be RHCP or LHCP if the signal is fed into the port R or L respectively. This mechanism is illustrated in FIG. 37B and 37C and described as follows.

Assuming the square aperture is excited with a field parallel to the septum 3904, the septum 3904 transforms the field into two odd-mode fields. If the square aperture 3915 is excited with a field perpendicular to the septum 3904, the field is transformed into two even-mode components. When the two modes, parallel and perpendicular, simultaneously exist at the square aperture, cancellation at one of the rectangular (i.e., L and R) ports 3905, 3910 occurs only if the amplitudes are the same and the phase difference is either 0° or 180°.

If a RHCP field excites the square aperture 3915, the vertical component will be 90° phase delayed by the septum 3904 relative to the horizontal component, resulting in field cancellation at port L 3905 and adding in phase at port R 3910. The septum polarizer 3904 works as a polarization diplexer if both RHCP and LHCP are present at the square aperture 3915. A rigorous analysis of the septum polarizer in found in Bornemann (J. Bornemann, *Ridge waveguide polarizer with finite and stepped-thickness septum*, IEEE MTT Transactions, Vol. 43, No. 8, August 1995).

Figure 40B:
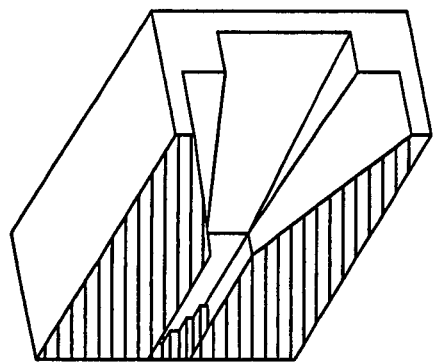
FIG. 40B shows a cross section of the antenna of FIG. 40A.
Figure 40A:
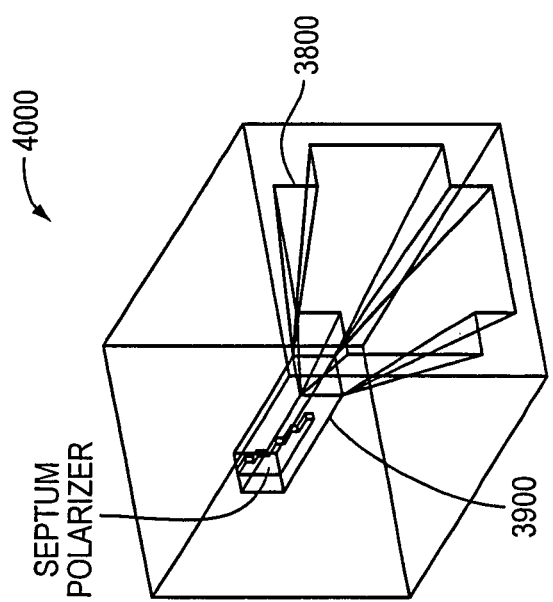
FIG. 40A shows a septum polarizer combined with a cross-shaped horn antenna.

FIGS. 40A and 40B show an antenna configuration 4000 including the cross-shaped horn 3800 combined with the septum polarizer 3900. As illustrated, the septum polarizer 3900 is coupled to the feed point of the horn 3800. As illustrated, the rectangular port 3915 is coupled to the horn 3800.

Simulation Results

A simulation was run for a right-hand circularly polarized, cross-shaped, square horn design using CST Microwave. The simulation results show a directive gain of about 17 dBi, and an Axial Ratio of 2 maximum across the band of 55-66 GHz. This configuration of antenna has very good broadband performance when compared to a patch arrangement. Unfortunately it is more complicated to construct. It is believed that a hybrid can be used which will have the best attributes of both.

Measured Results

Figure 39A:
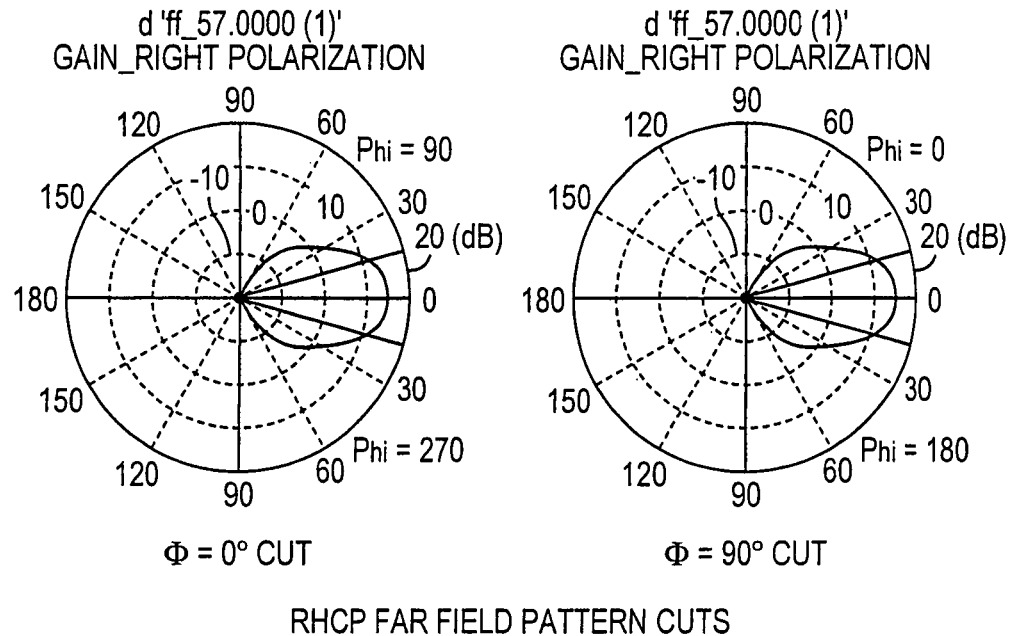
FIGS. 39A and B show exemplary far field antenna patterns for the antenna of FIG. 36A for right-hand circular polarization and left-hand circular polarization, respectively.
Figure 39B:
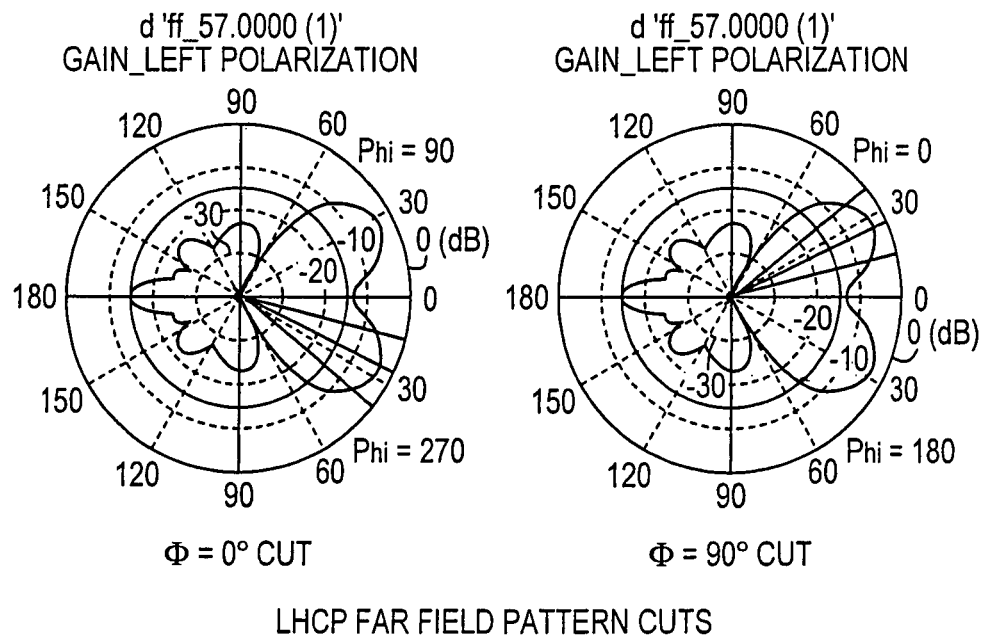

Measured results for a right-hand CB and left-hand CB square cross-shaped horn are provided in FIGS. 39A and 39B respectively show very good agreement with the simulated data. The axial ratio shows some degradation but this may be due partly to the resolution and accuracy of the axial ratio measurement set up.

Figure 42:
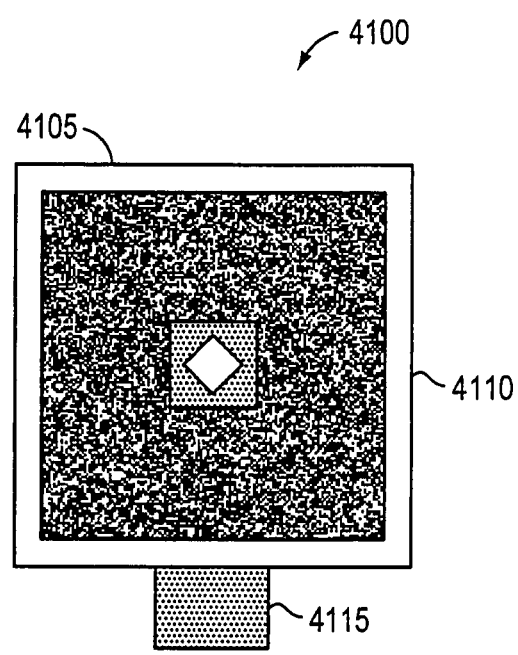
FIG. 42 illustrates an end view of a horn antenna fed with a microstrip patch antenna feed.

Measured gain and aspect ration for the antenna of FIGS. 40A and 40B are provided in FIGS. 41A and 41C at frequency of 57, 60 and 64 GHz respectively 57, 60, and 64 GHz Next Generation of Station Antenna It is believed that a hybrid (waveguide and printed patch) antenna configuration 4100 for the Station side of the link will prove to be the best combination of good gain and axial ratio performance and low cost construction as shown in FIG. 42. The concept is to feed a waveguide crossed horn 4105 with circularly polarized patch antenna 4110 placed at the throat of the horn 4105. The horn 4105 can be very inexpensively constructed using a metallized injection molded part.

Figure 43A:
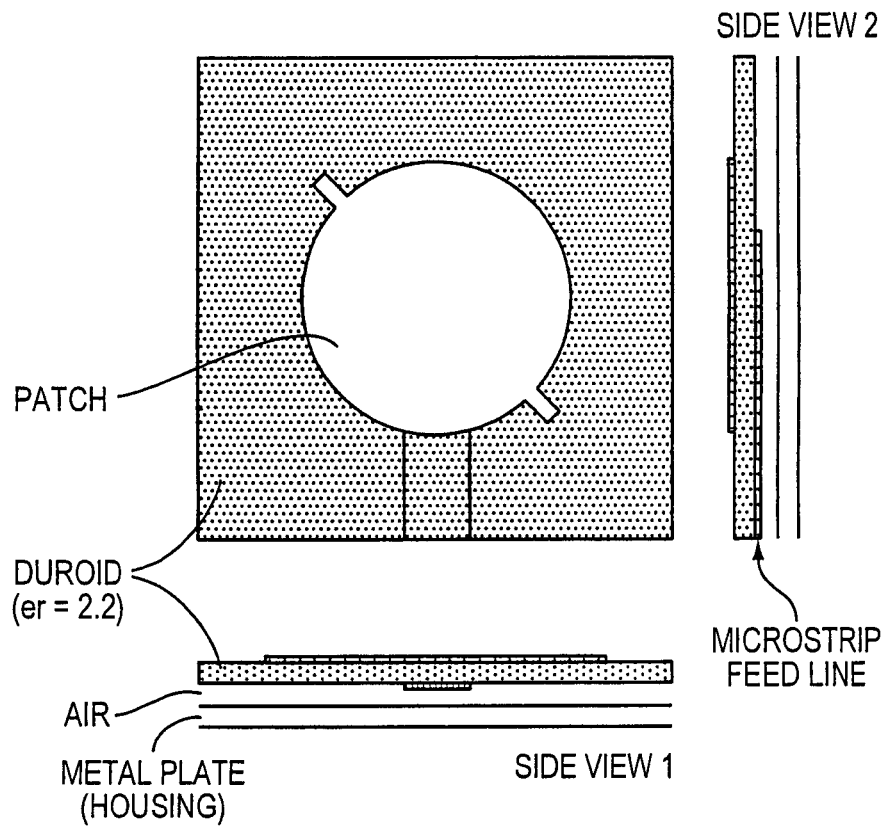
FIG. 43A-43C illustrate circularly polarized patch antennas having an inverted microstrip feed.
Figures 43B, 43C:
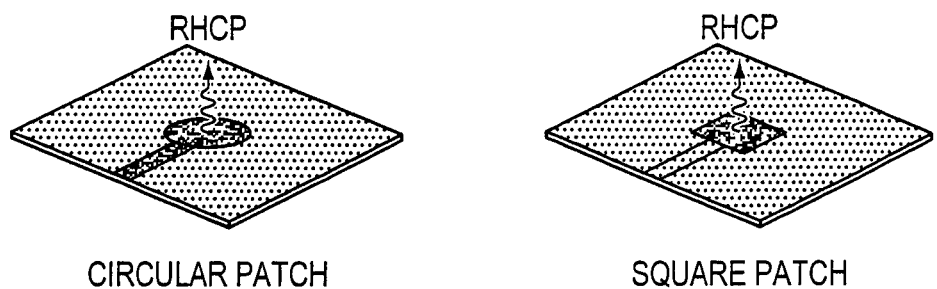

A suspended circularly polarized patch antenna with an inverted microstrip feed is illustrated in FIG. 43A. The patch can be configures as a circle, as shown in FIG. 43B or as a square, as shown in FIG. 43C. The microstrip feed line is located on one side of a dielectric substrate and the patch element located on the opposite side. The dielectric can be a duroid having a relative dielectric constant of about 2.2. Such a design offers lower conductor loss, while also providing increased antenna efficiency. Fabrication is also simplified as a single substrate layer is used for both the patch and the feed line. Some complexity is involved in interfacing the antenna with conventional circuitry and it requires a low-loss transition from a conventional to inverted microstrip line. An exemplary embodiment of a circular patch is illustrated in FIGS. 44A and 44B. The resulting return loss is illustrated in FIG. 44C. FIGS. 45A-45H illustrate exemplary performance parameters of the device of FIGS. 44A and 44B.

Figure 46B:
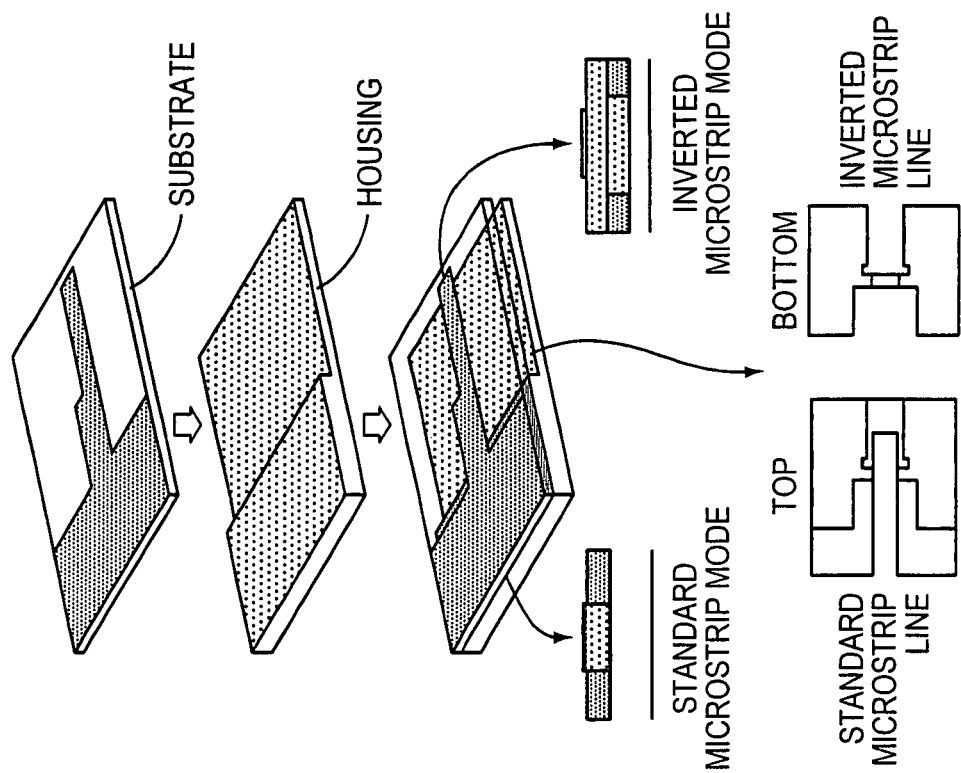
FIG. 46B shows various views of a standard microstrip to inverted microstrip transition.
Figure 46A:
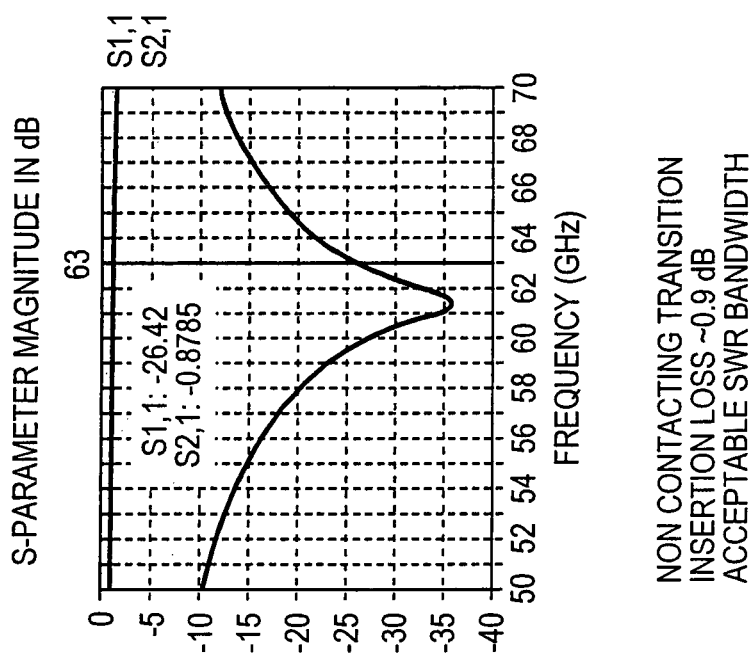
FIG. 46A shows the return loss of the device of FIG. 46B.

FIG. 46B shows an exemplary transition from a standard microstrip to inverted microstrip. Preferably, the transition is non-contacting with an insertion loss of about 0.9 dB and having an acceptable standing-wave ratio bandwidth. FIG. 46A shows exemplary return loss of the device of FIG. 46B.

Figure 47B:
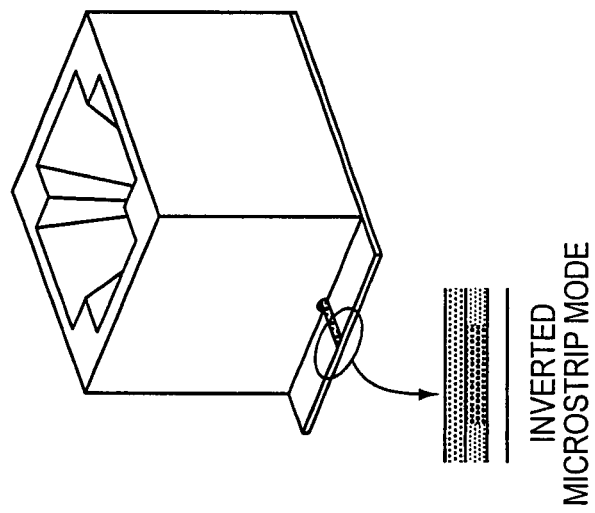
FIGS. 47A and 47B show an exemplary suspended patch antenna with inverted microstrip feed combined with a cross-shaped, square horn antenna.
Figure 47A:
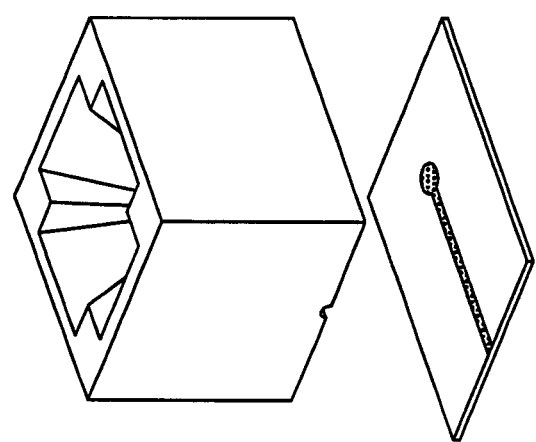

FIGS. 47A and 47B show an exemplary suspended patch antenna with inverted microstrip feed combined with a cross-shaped, square horn antenna. As shown, a patch antenna is placed at the narrow end of the horn antenna, with the patch facing into the cavity of the horn. FIGS. 48A through 48F illustrate exemplary performance parameters of the device of FIGS. 47A and 47B.

In order to support the square or rectangular cell wireless network architecture described earlier while also supporting transmissions at mmwLAN frequencies, certain wireless antenna configuration and design embodiments are described as follows.

To enable the square cell architecture of the wireless network embodiment, each WAP transmitter (Tx) and receiver (Rx) is arranged according to FIG. 2A. Because each WAP 210 is located within a corner of each square cell 200, each WAP 210 has two interface sectors with each sector containing a Tx and Rx. The total coverage of each WAP 210 is greater than 45 degrees. In some embodiments the WAP coverage is about 90 degrees. Thus, with a WAP 210 in each corner of a square cell, the complete area of the cell may be covered by all four WAPs 210. The WAP Tx and receiver Rx antennas are typically bistatic with right hand polarization.

Figure 49A:
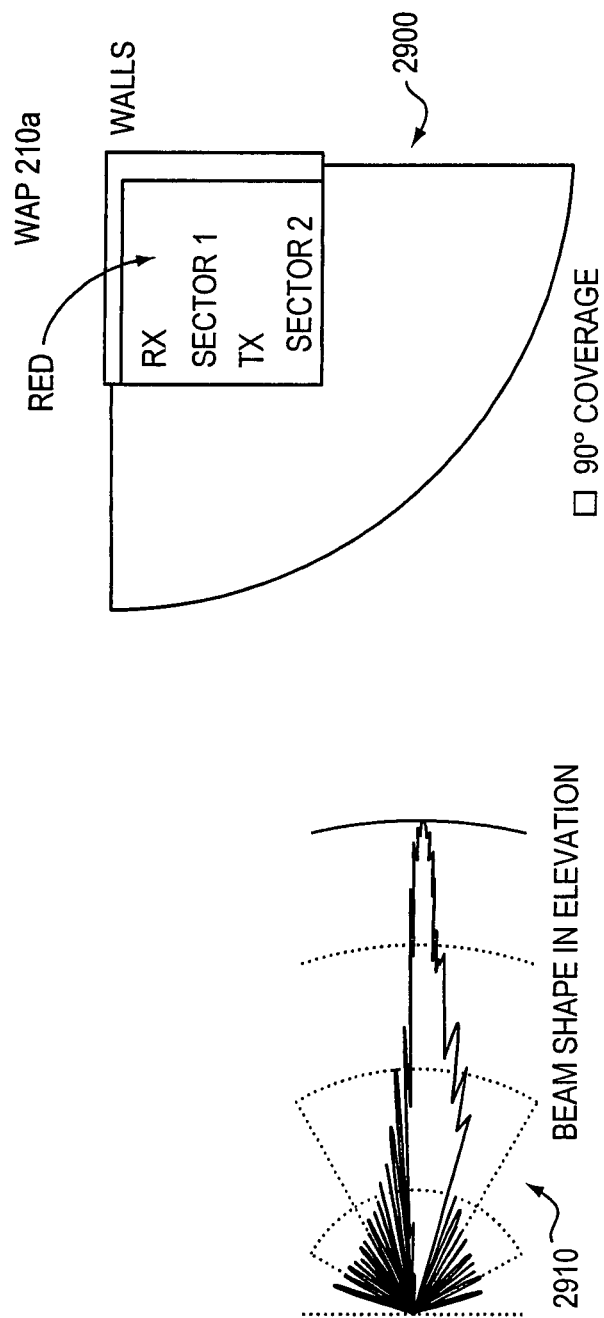
FIGS. 49A and 49B are antenna patterns for an exemplary WAP antenna.
Figure 49B:
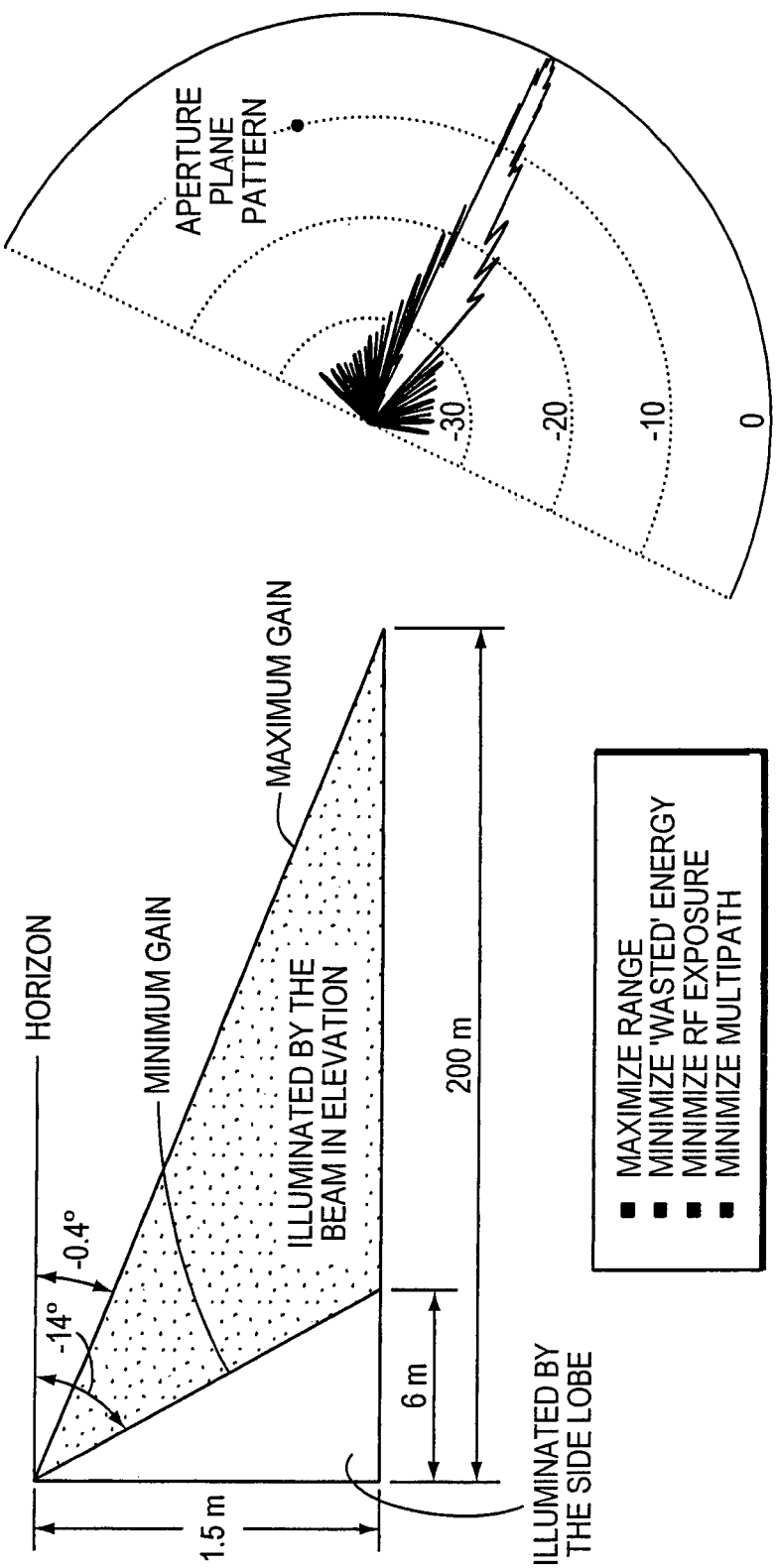

Each WAP antenna may use a cosecant-squared beam shape with an elevation greater than or equal to 1.5 meters vertical distance between the WAP and an STA as shown in FIG. 49. The cosecant-squared beam shape has the advantage of maximizing the transmission range, minimizing wasted energy, and minimizing RF exposure, especially in the mmw-LAN range of frequencies. The beam shape 2910 generated, as also illustrated, possesses a $\theta_{3\ dB}$ AZ=22.5° per sector and $\theta_{3\ dB}$ EZ=12° per sector with main lobe 14° above horizontal (see FIG. 49B). The WAP antenna peak gain is typically 23.5 dBi per sector. The WAP antenna may be implemented as a horn antenna, antenna array, or on a printed circuit. While printed circuit antennae may be lossy, they are easy to interface with mmwLAN circuits.

To interface with a WAP 210 of the wireless network embodiment, each STA modem may use a four sector antenna 5000 of bistatic design as shown in FIG. 50 to provide the STA with 360° coverage. Each STA 215 may use a cosecant-squared beam shape with a $\theta_{3\ dB}$ AZ=90° per sector, 360° per antenna and $\theta_{3\ dB}$ EZ=12° per sector with main lobe 14° above horizontal. The antenna 5000 may be realized as a horn or printed circuit. As described previously, the STA typically searches for all color-coded WAPs and sectors, measures the strength of the signal emanating from each of the four color-coded WAP within a cell, and then selects the two strongest signals for communication with the network.

Figure 51:
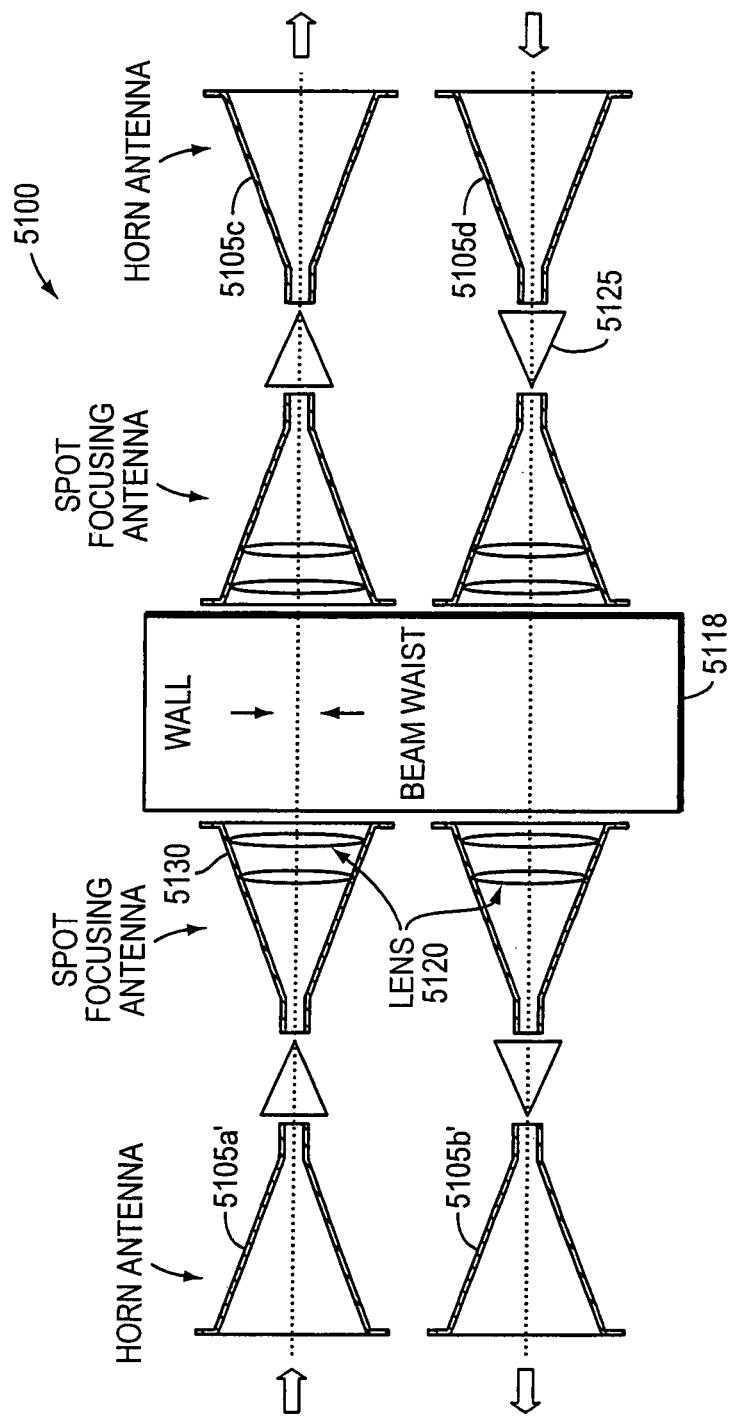
FIG. 51 is cross section of an exemplary WAP extender used through a wall.

In certain circumstances, to counter excessive attenuation caused by an obstacle such as a wall, a wireless Network Extender (Nex) 5100, as illustrated in FIG. 51, may be employed to boost the signal strength and extend the range of a WAP. A Nex 5100 is a physical layer device or set of devices wherein horn antennas are used to penetrate an object such a wall 5110 and then retransmit the original signal on the exiting side of wall. Functionally, each Nex 5100 provides signal repeating, much like an Ethernet repeater, in both directions to and from a WAP 210. To improve signal penetration through an object, the Nex 5100 may utilize one or more lenses 5120 within each spot focusing antenna. Also, one or more amplifier circuits 5125 may be used to boost the received signal from a horn antenna before delivery of the amplified signal to a spot focusing antenna 5130. Two pairs of spot focusing antenna 5130, horn antenna 5105, and amplifier units 5125 may be employed to provide signal amplification and repeating in both directions across an obstacle.

Figure 52:
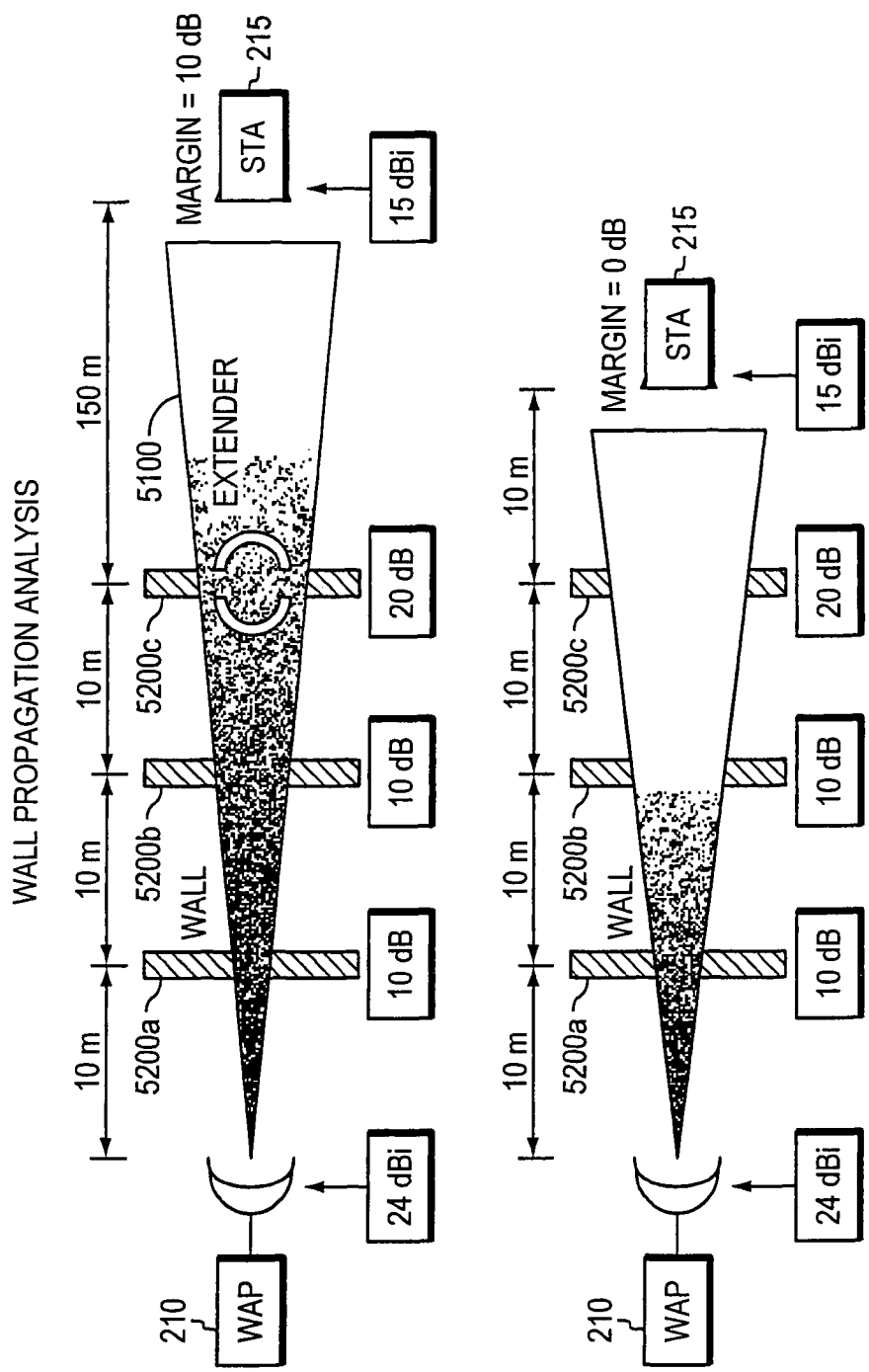
FIG. 52 is an exemplary link configuration comparing performance link performance with and without a WAP extender.

FIG. 52 provides an illustrative example comparing the range extension provided by the WAP extender 5100 to counter the rapid attenuation of signals in the mmwLAN range of frequencies. A signal propagates from a WAP 210 to a STA 215 through three walls 5200a, 5200b, 5200c. Two of the walls provide about 10 dB of attenuation and the third wall provides about 20 dB. The WAP antenna has a gain of about 24 dBi and the STA antenna has a gain of about 15 dBi. Without the extender 5100, the signal travels for a range of about 40 meters with a 0 dB margin. With the extender, however, the signal travels for a range of about 180 meters, while still retaining an additional 10 dB of margin.

It should be obvious to one of ordinary skill in the art how to construct, implement, integrate, and manufacture the various components of the wireless modem antenna components described herein.

With the improvements within the modem embodiments, 23 dBm is realized as opposed to 10 dBm in earlier mmwLAN modems. Using the novel cosecant-squared antenna design, a 41 dB gain is realized at the antenna as opposed to 18 dB in prior unsophisticated antennas. Furthermore, frequency, space, and time diversity provided by the network architecture further improve SNR by approximately 9 dB. Taking the improvement from each of the embodiments as a whole, a wireless communications system is realized with 48 dB gain, possibly enabling up to 600 meters of coverage in the mmwLAN frequency range as shown in FIG. 4.

While this invention has been particularly shown and described with references to example embodiments thereof, it will be understood by those skilled in the art that various changes in form and details may be made therein without departing from the scope of the invention encompassed by the appended claims.

What is claimed is:

1. A digital communications modem that uses analog signal processing to transform an information signal into a combined encoded signal, the modem comprising:
   a pulse-shaping filter receiving the information signal having a baud rate and generating a filtered pulse train having a reduced bandwidth that is less than the baud rate;
   an encoder receiving the filtered pulse train and generating an encoded signal having one of two orthogonal relationships;
   a combiner receiving two encoded signals having different orthogonal relationships and combining them, the resulting combined encoded signal having a signal bandwidth within the reduced bandwidth.

2. The digital communications modem of claim 1, further comprising a modulator modulating a carrier signal with the combined encoded signal, the modulated signal having a signal spectrum within a bandwidth of less than half of the baud rate of the received information signal.

3. The digital communications modem of claim 2, further comprising a frequency translator receiving the modulated signal at a first frequency band and translating it to a different frequency band.

4. The digital communications modem of claim 3, wherein the frequency translator translates the encoded information signal to a millimeter-wave frequency band.

5. The digital communications modem of claim 4, wherein the millimeter-wave frequency band is between about 30 GHz and about 300 GHz.

6. The digital communications modem of claim 4, wherein the millimeter-wave frequency band is between about 50 GHz and about 70 GHz.

7. The digital communications modem of claim 1, wherein the pulse-shaping filter comprises a raised cosine filter.

8. The digital communications modem of claim 1, wherein the pulse-shaping filter comprises a part of a matched filter, the other part of the matched filter provided within a remote receiver.

9. The digital communications modem of claim 1, wherein the encoder comprises a dual-rail binary encoder.

10. The digital communications modem of claim 9, wherein the dual-rail binary encoder comprises a Hilbert Transformer.

11. The digital communications modem of claim 2, wherein the modulator comprises a sideband suppressor suppressing one of two sidebands of the modulated signal.

12. The digital communications modem of claim 11, wherein the sideband suppressor comprises a filter.

13. The digital communications modem of claim 2, wherein the modulator comprises a single side band (SSB) modulator.

14. The digital communications modem of claim 2, wherein the modulator comprises a vestigial side band (VSB) modulator.

15. The digital communications modem of claim 1, further comprising a first pilot signal source combining a first pilot signal with the filtered pulse train, the first pilot signal having a center frequency of about half the baud rate.

16. The digital communications modem of claim 15, further comprising a second pilot signal source combining a second pilot signal with the filtered pulse train, the second pilot signal having a center frequency corresponding to the inverse of twice the baud period at baseband.

17. The digital communications modem of claim 16, wherein the second pilot signal is provided with a well-defined power level.

18. The digital communications modem of claim 1, further comprising a millimeter-wave wireless transmitter, the transmitter transmitting the combined encoded signal wirelessly at a carrier frequency greater than about 30 GHz.

* * * * *